(12) United States Patent
Lee

(10) Patent No.: US 10,611,432 B2
(45) Date of Patent: Apr. 7, 2020

(54) HYDRAULIC AUTOMATIC TRANSMISSION BICYCLE

(71) Applicants: Dong Won Lee, Anyang-si (KR); Youngtack Shim, Port Moody (CA)

(72) Inventor: Dong Won Lee, Anyang-si (KR)

(73) Assignees: Dong Won Lee, Anyang-si (KR); Youngtack Shim, Port Moody (CA)

( * ) Notice: Subject to any disclaimer, the term of this patent is extended or adjusted under 35 U.S.C. 154(b) by 70 days.

(21) Appl. No.: 15/508,006

(22) PCT Filed: Sep. 2, 2015

(86) PCT No.: PCT/KR2015/009238
§ 371 (c)(1),
(2) Date: Mar. 1, 2017

(87) PCT Pub. No.: WO2016/036130
PCT Pub. Date: Mar. 10, 2016

(65) Prior Publication Data
US 2017/0291661 A1   Oct. 12, 2017

(30) Foreign Application Priority Data

Sep. 2, 2014  (KR) .................. 10-2014-0116110
Sep. 2, 2014  (KR) .................. 10-2014-0116163
Sep. 2, 2015  (KR) .................. 10-2015-0124156

(51) Int. Cl.
*B62M 19/00* (2006.01)
*F04B 17/03* (2006.01)
(Continued)

(52) U.S. Cl.
CPC .............. *B62M 19/00* (2013.01); *B62K 19/30* (2013.01); *B62M 6/40* (2013.01); *B62M 25/08* (2013.01);
(Continued)

(58) Field of Classification Search
CPC ........ B62M 19/00; B62M 25/08; B62M 6/40; B62M 19/30; F16H 61/46; F16H 61/435;
(Continued)

(56) References Cited

U.S. PATENT DOCUMENTS 4,942,936 A * 7/1990 Gardner, Jr. ............. B62M 6/40
                                                            180/206.1
5,346,234 A    9/1994 Kadaja .......................... 280/216
(Continued)

FOREIGN PATENT DOCUMENTS

CN          2181455 Y     11/1994
CN          1433922 A      8/2003
(Continued)

OTHER PUBLICATIONS

Chinese Office Action dated Oct. 22. 2018, issued to Chinese Application No. 201580059109.5.
(Continued)

*Primary Examiner* — Joseph M Rocca
*Assistant Examiner* — Felicia L. Brittman
(74) *Attorney, Agent, or Firm* — Stein IP, LLC

(57) ABSTRACT

This disclosure generally relates to an automatic bicycle, particularly to a hydraulic automatic transmission bicycle which can automatically and adaptively change gear ratios. More particularly, this disclosure relates to those hydraulic automatic transmission bicycles which use fluid pressure to change such gear ratios, and which include various hydraulic automatic transmissions which may be provided in various configurations and may operate in various methods and sequences to provide automatic and infinitely variable gear ratios.

17 Claims, 12 Drawing Sheets

(51) Int. Cl.
| | |
|---|---|
| *F04C 2/344* | (2006.01) |
| *F04C 2/324* | (2006.01) |
| *F04C 2/08* | (2006.01) |
| *F04B 23/04* | (2006.01) |
| *F04C 14/26* | (2006.01) |
| *F03C 1/26* | (2006.01) |
| *F16H 61/42* | (2010.01) |
| *F04C 14/04* | (2006.01) |
| *F04C 14/22* | (2006.01) |
| *B62K 19/30* | (2006.01) |
| *B62M 6/40* | (2010.01) |
| *B62M 25/08* | (2006.01) |
| *F16H 39/02* | (2006.01) |
| *F16H 61/435* | (2010.01) |
| *F16H 61/46* | (2010.01) |

(52) U.S. Cl.
CPC ............... *F03C 1/26* (2013.01); *F04B 17/03* (2013.01); *F04B 23/04* (2013.01); *F04C 2/08* (2013.01); *F04C 2/324* (2013.01); *F04C 2/3442* (2013.01); *F04C 14/04* (2013.01); *F04C 14/223* (2013.01); *F04C 14/26* (2013.01); *F16H 39/02* (2013.01); *F16H 61/42* (2013.01); *F16H 61/435* (2013.01); *F16H 61/46* (2013.01)

(58) Field of Classification Search
CPC .......... F16H 39/02; F16H 61/42; F04C 14/04; F04C 14/26; F04C 14/223; F04C 2/3442; F04C 2/08; F04C 23/04; F04C 17/03; F04C 2/324; F03C 1/26

USPC ...... 280/216; 475/72, 73, 74, 75, 76, 77, 78, 475/79, 80, 81, 82, 83, 84, 85, 86, 87, 88, 475/89, 90

See application file for complete search history.

(56) References Cited

U.S. PATENT DOCUMENTS

| | | | |
|---|---|---|---|
| 5,387,000 A * | 2/1995 | Sato | B62M 19/00 280/216 |
| 6,032,968 A | 3/2000 | Chattin | 280/216 |
| 6,537,169 B1 * | 3/2003 | Morii | F16H 3/721 475/10 |
| 8,764,125 B2 | 7/2014 | Vezzoli et al. | 303/10 |
| 2016/0121969 A1 * | 5/2016 | Sebhatu | B62M 19/00 60/370 |

FOREIGN PATENT DOCUMENTS

| | | |
|---|---|---|
| CN | 101290008 A | 10/2008 |
| JP | H 06-40374 A | 2/1994 |
| KR | 10-1998-0048367 B1 | 4/1999 |
| KR | 10-1998-0005991 B1 | 9/1999 |
| KR | 10-2001-0026661 A | 4/2001 |
| KR | 10-0896651 B1 | 5/2009 |
| KR | 10-1174673 B1 | 8/2012 |
| KR | 10-1214112 B1 | 12/2012 |
| KR | 10-1259290 B1 | 5/2013 |

OTHER PUBLICATIONS

Korean Office Action dated Oct. 27, 2016, issued to Korean Application No. 10-2015-0124156.

* cited by examiner

HYDRAULIC AUTOMATIC TRANSMISSION BICYCLE

CROSS-REFERENCE TO RELATED APPLICATIONS

This application is a national stage of International Application No. PCT/KR2015/009238, filed Sep. 2, 2015, which claims the benefit of priority to Korean Application No. 10-2015-0124156, filed Sep. 2, 2015, Korean Application No. 10-2014-0116110, filed Sep. 2, 2014, and Korean Application No. 10-2014-0116163, filed Sep. 2, 2014 in the Korean Intellectual Property Office, the disclosures of which are incorporated herein in their entireties by reference.

This disclosure generally relates to an automatic bicycle, particularly to a hydraulic automatic transmission bicycle which can automatically and adaptively change gear ratios. More particularly, this disclosure relates to those hydraulic automatic transmission bicycles which use fluid pressure to change such gear ratios, and which include various hydraulic automatic transmissions which may be provided in various configurations and may operate in various methods and sequences to provide automatic and infinitely variable gear ratios.

BACKGROUND OF THE INVENTION

A conventional bicycle includes a chain gear between its front wheel and a rear wheel in order to allow a user to manually change gear ratios (or simply "change gears"). However, some circumstances render it very difficult for a user to change gears when a road condition changes so rapidly, and to maintain a proper speed even when the user succeeds in changing gears. An electrical bicycle may overcome such problems to some extent. However, the electrical bicycle requires expensive sensors to measure an rpm of a wheel, to monitor a slope of a road, and the like, and may also suffer from frequent malfunctions of such sensors, not to mention their high cost.

SUMMARY OF THE INVENTION

Various "hydraulic automatic transmission bicycles" (to be abbreviated as "HAT bicycles" hereinafter) of this disclosure include various "hydraulic automatic transmission" (to be referred to as "HAT" hereinafter) which may be provided in various configurations and which may operate in various mechanisms and sequences. Accordingly, a user of this HAT bicycle can change gear ratios and speeds of the bicycle without having to rely on prior art mechanical chain gears. A HAT bicycle may also minimize malfunctions of conventional mechanical chain gears, accidents caused by slipping chains or by jammed chains due to user's pants, and grease stains ruing pants of a user.

A hydraulic automatic transmission (HAT) bicycle of this disclosure may also include a HAT which in turn includes a hydraulic pump. The HAT may be configured to dispose all (or at least a substantial number of) elements of its driving part inside a housing of the HAT. Therefore, the HAT bicycle can minimize erosion or corrosion of such elements of the driving part caused by an environment (e.g., a rain, a snow, or salt spread on a road), and can also prevent dirt from entering the driving part, thereby minimizing malfunctions caused thereby. Because all (or most) elements of a driving part of the HAT are disposed inside a housing of the HAT, a user can also prevent his or her pants from contacting such elements of the driving part and from jamming the driving part. The HAT also includes a hydraulic motor which is driven by pressurized fluid which in turn is discharged from an outlet of a hydraulic pump, where all (or at least a substantial number of) elements of a driving part of such a hydraulic motor may similarly be disposed inside a housing of the HAT.

In addition, a hydraulic automatic transmission (HAT) bicycle of the disclosure may include a HAT which can automatically change gear ratios and which does not require manual manipulation by a user. Therefore, as the HAT bicycle may automatically and adaptively change gear ratios (or speed ratios) in response to changes in road conditions during operation, without requiring any manual manipulation from a user. Because such a HAT bicycle can change gear ratios automatically without requiring user manipulations to cope with such changes in road conditions, the HAT bicycle may minimize user inconveniences which may happen when the user misses an optimum timing of changing gears and cannot ride up a hill.

A hydraulic automatic transmission (HAT) bicycle of this disclosure also includes a HAT which may provide infinitely variable gear ratios. As a result, a user does not have to shift a gear to a $1^{st}$ gear ratio in response to a change in road condition, and then has to shift to another $2^{nd}$ gear ratio as the road condition changes again, for a HAT may automatically and adaptively shift a HAT bicycle to a certain gear ratio which is optimum to a certain road condition at that time and then shift to another gear ratio which is also optimum to a new road condition. Accordingly, a user may ride a HAT bicycle, without having to worry about responding to the road conditions which may change forever. Because a HAT bicycle provides infinitely variable gear ratios, such a bicycle neither has to mark or display a fixed number of multiple gear ratios, nor has to include a separate gear shift indicator representing a list of such fixed gear ratios. Accordingly, a user can ride a HAT bicycle without having to manipulate such gear ratios or gears at all.

A hydraulic automatic transmission (HAT) of a HAT bicycle of this disclosure may have a very short reaction time or a very short response time, for the HAT is manipulated by fluid pressure and, therefore, capable of shifting gears (or changing gear ratios) almost in real time in response to such changes in road conditions. It is appreciated that a pressure of fluid inside a HAT is generally synchronized with a pressure of fluid in a tube connected to the HAT in (almost) real time, as long as the tube does not include any valve or any part which block pressure communication therealong. Therefore, in contrary to conventional electrical automatic transmissions which at best electrically respond to changes in road conditions only after monitoring such conditions, the HAT of this disclosure can shift gears (or change gear ratios) using such fluid pressure and allow a user to ride a HAT bicycle with optimum gear ratios, while responding to changes in road conditions (almost) in real time. It is appreciated that a HAT with almost no response time may respond to changes in road conditions, mechanical load or mechanical resistance so rapidly such that a user may feel uneasy or uncomfortable. To obviate this problem, a HAT bicycle of this disclosure may dampen the timings or extents of such gear shifting (or gear ratio changing) e.g., by controlling fluid flow along the tube or by impeding such fluid flow, thereby increasing a response (or reaction) time beyond a certain threshold value.

A hydraulic automatic transmission (HAT) of this disclosure may also include a conventional hydraulic pump (or motor) or may instead include a hydraulic pump (or motor) which is a variation or modification of such a prior art hydraulic pump (or motor) as will be described below. Accordingly, the HAT bicycle which includes such a HAT can be mass-produced at a low cost and the HAT bicycle may not require any hydraulic pump (or motor) which operates under a brand new operating mechanism.

A hydraulic automatic transmission (HAT) bicycle of this disclosure may include a HAT which can perform various functions as described above or below but which may include a hydraulic pump (or motor) which can be used in a low rpm range. In particular, such a hydraulic pump (or motor) may be configured to operate in a low rpm range by slightly modifying or improving a configuration of a prior art hydraulic pump (or motor). As a result, a user may select optimum gear ratios and may ride a bicycle at a low range of rpms (e.g., 600 rpm, 400 rpm, and the like) which may match his or her body or health conditions.

In general, a hydraulic pump may be classified based on driving pressure such that a hydraulic pump operating in or beyond about 250 atm (atmosphere) is referred to as a "high-pressure hydraulic pump," that a hydraulic pump operating between about 125 atm and about 250 atm is referred to as a "mid-pressure hydraulic pump," and that a hydraulic pump operating in or under about 125 atm is referred to as a "low-pressure hydraulic pump." In this respect, a HAT bicycle of this disclosure may typically include a low-pressure hydraulic pump or a mid-pressure hydraulic pump operating in a relatively low pressure range. Therefore, a HAT operating in a low to medium pressure range may reduce energy loss due to relatively low friction of various elements of a driving part of a HAT, and may therefore increase a driving efficiency of the HAT bicycle. Accordingly, a user may ride a HAT bicycle in gear ratios which match his or her physical or health conditions as well as which match varying road conditions, without exerting excessive force thereonto. Because a user does not exert excessive force thereon, a HAT bicycle may be free from excessive friction in its driving part and may also minimize malfunctions caused by erosion or fatigues. A HAT bicycle operating in a relatively low pressure range may only need a relatively thin housing such that a HAT bicycle may be made compact and light, at a low cost as well.

As a result, a hydraulic automatic transmission (HAT) bicycle of this disclosure may include a compact or light HAT. For example, such a HAT may be configured to have a size which is below a certain ratio (or percentage) of a size of a body (or a frame) of the HAT bicycle, or to have a weight which is below a certain ratio (or percentage) of a weight of a body (or a frame) thereof. Conversely, when a HAT bicycle is a heavy-duty bicycle, such a HAT bicycle may be configured to have a size or a weight which may exceed a certain ratio (or percentage) of a size of a body (or a frame) of a HAT bicycle or a weight thereof. In addition, a seat or a pedal of a HAT bicycle may be configured to match certain body parts of a user, while requiring a size or a weight of such a seat or pedal to be less than (or to exceed) a certain ratio (or percentage) of a size or a weight of a part of a HAT bicycle (or a user) as well. As a result, a HAT bicycle may be manufactured to have a size or a weight which may be comparable with those of a prior art bicycle with a chain gear, while improving a driving efficiency.

Although a hydraulic automatic transmission (HAT) bicycle of this disclosure may automatically shift gears and change gear ratios, such a HAT bicycle may be also configured to change a gear ratio as well, e.g., [1] when a magnitude of mechanical energy supplied to a HAT bicycle by a user exceeds a threshold value, [2] when mechanical load (or resistance) exerted onto a driving wheel (e.g., a front wheel, a rear wheel or both wheels) exceeds a threshold value, regardless of such mechanical energy applied by a user to the HAT bicycle, [3] when mechanical energy supplied by a user to a HAT bicycle in response to such mechanical load exceeds a threshold value, regardless of a magnitude of such mechanical resistance exerted onto the HAT bicycle, or [4] when mechanical energy supplied to fluid by a battery-operating electrical motor exceeds a threshold value.

A HAT bicycle may also be configured to change gear ratios, e.g., [1] when a fluid pressure inside a certain portion of a HAT bicycle exceeds a threshold value due to mechanical energy supplied thereto by a user, [2] when a fluid pressure inside a certain portion of a HAT bicycle exceeds a threshold value due to mechanical load (or resistance) exerted onto the driving wheel, regardless of such mechanical energy applied by a user to the HAT bicycle, [3] when a fluid pressure in a certain portion of a HAT bicycle exceeds a threshold value due to mechanical energy supplied by a user in response to the mechanical load, regardless of a magnitude of such mechanical resistance exerted onto the HAT bicycle, or [4] when a fluid pressure inside a certain portion of a HAT bicycle exceeds a threshold value due to such mechanical energy supplied to fluid by a battery-operating electrical motor.

A hydraulic automatic transmission (HAT) may also include various mechanical shift adjustors each of which may allow a user to manually control the above threshold value of a mechanical load, mechanical energy, or fluid pressure. Accordingly, a user may manipulate a shift adjustor in such a way that a HAT bicycle may change a gear ratio [1] when such mechanical load (or resistance) exceed a certain user-selected threshold, or [2] when a pressure of fluid entering a HAT (or inside a HAT) exceeds a certain user-selected threshold due to such mechanical load.

Using such a shift adjustor properly, a user may render a HAT bicycle to shift gears on a hill when a user supplies only a certain amount of mechanical energy which matches his or her physical or health condition.

As described in the preceding paragraph, a HAT bicycle of this disclosure allows a user to manually exert a force onto a shift adjustor and to adjust such a threshold value. Alternatively and as will be explained below in greater detail, a HAT bicycle may allow a user to use an electrical unit to control such a shift adjustor and to select a desired threshold value, thereby shifting gears based on such a value. With this electrical device or with manual manipulation as described in the preceding paragraph, a user may control the shift adjustor in such a way that a HAT bicycle may change gears even with a small amount of mechanical energy which is applied by a senior person or by a young patient. In addition, the above electrical device may allow a user to replace a previously selected threshold value with a new value before or while riding a HAT bicycle for the convenience on the part of a user.

A user may instead manipulate the above shift adjustor of a HAT bicycle to change a gear ratio when such mechanical energy, mechanical load or pressure may exceed a certain maximum threshold value or, in the alternative, may fall below a certain minimum threshold value. Accordingly, when a user wants to improve his or her strength, the user may manipulate a HAT bicycle to shift gears only when the load, energy, or pressure exceeds the maximum threshold value. Conversely, when a user preferentially wants to use a HAT bicycle for commute, he or she may set up a HAT bicycle to shift gears as long as such a load, energy or pressure stays below a minimum threshold value.

A hydraulic automatic transmission (HAT) of this disclosure may also include a variable-volume (or a fixed-volume) hydraulic pump, and a variable-volume (or a fixed-volume) hydraulic motor. When a hydraulic pump unit of a HAT includes at least one variable-volume hydraulic pump, a hydraulic motor unit of the same HAT may include at least one variable-volume (or a fixed-volume) hydraulic motor therein. To the contrary, when a hydraulic pump unit of a HAT includes at least one fixed-volume hydraulic pump, a hydraulic motor unit of the same HAT may then include at least one variable-volume hydraulic motor so as to perform such automatic or adaptive transmission. Such a HAT may also include a variable-volume hydraulic pump as well as a variable-volume hydraulic motor, thereby expanding or maximizing a range of such gear ratios, where such a range typically spans from a minimum gear ratio to a maximum gear ratio.

A hydraulic automatic transmission (HAT) bicycle of this disclosure may include a hydraulic brake capable of stopping the bicycle or decreasing its speed, e.g., by stopping flow of a certain (or an entire) portion of fluid flowing into or out of a hydraulic pump, into or out of a hydraulic motor, or in other tubes. More particularly, such a hydraulic brake is configured to entirely or partially block a flow of fluid in an upstream of a hydraulic pump or motor, in a downstream thereof, of inside of such a hydraulic pump or motor. A HAT bicycle may use a hydraulic brake as the only brake or may use the hydraulic brake in conjunction with a conventional mechanical brake, where a user may optionally use such hydraulic and mechanical brakes concurrently or one at a time. Alternatively, a HAT bicycle may include both of the hydraulic and mechanical brakes and a user may recruit such brakes in such a way that, e.g., [1] when a user first activates a mechanical brake, a hydraulic brake may start to operate concurrently therewith or after a certain temporal gap or [2] when a user first activates a hydraulic brake, a mechanical brake may start to operate concurrently therewith or after a certain temporal gap. Thus, a user may have options of using one brake or both brakes concurrently or one after another depending upon situations, thereby stopping a HAT bicycle safely and efficiently.

A hydraulic automatic transmission (HAT) of this disclosure may be fabricated to be easily incorporated to a conventional bicycle. For example and as described above, such a HAT may be shaped or sized in a certain weight each of which may be comparable with that of a prior art bicycle and, therefore, may be conveniently mounted onto a prior art bicycle. In addition, a hydraulic pump unit and a hydraulic motor unit of a HAT may be fabricated to be implementable, e.g., between a pedal axis and a rotation axis of a rear wheel of a prior art bicycle. Therefore, mechanical energy supplied by a user into a pedal is transferred to a hydraulic pump of a hydraulic pump unit, and the hydraulic pump may pressurize a variable volume of fluid and deliver such fluid to a hydraulic motor unit. As a result, such a HAT may embody automatic and infinitely variable gear ratios. In addition, a hydraulic pump unit (or motor unit) may replace a pedal axis, a chain of a rear wheel, gear, or a rotation axis of a rear wheel, depending upon relative sizes or configurations thereof.

A hydraulic automatic transmission (HAT) bicycle of this disclosure may use a pedal or a pedal axis which may be identical to those of a prior art bicycle, and may also include a prior art chain gear which connects a rear wheel to the pedal axis. Accordingly, when a HAT bicycle employs a prior art pedal axis, the HAT bicycle may [1] mechanically couple a driving axis of a hydraulic pump unit (or its hydraulic pump) with the pedal axis either directly or indirectly, or [2] mechanically couple a driving axis of a hydraulic motor unit (or its hydraulic motor) either directly or indirectly. When a HAT bicycle employs a prior art chain (or its chain gear), the HAT bicycle may [1] mechanically couple a pedal axis with a driving axis of a hydraulic pump unit (or its hydraulic pump) with a prior art chain (or a chain gear), [2] mechanically couple a driving axis of a hydraulic motor unit (or its hydraulic motor) with a prior art chain (or a chain gear), or [3] mechanically couple a driving axis of a hydraulic pump unit (or its hydraulic pump) with a driving axis of a hydraulic motor unit (or its hydraulic motor) with a prior art chain (or a chain gear).

A hydraulic automatic transmission (HAT) of this disclosure may also be configured to be driven [1] solely by mechanical energy provided to its pedal by a user or [2] by such mechanical energy provided by the user and mechanical energy provided by an electrical motor which operates on a battery (or on an electrical generator which is operated by a user) concurrently, individually or one at a time. This arrangement allows a user to drive a HAT bicycle in a mechanical, manual driving mode or in an electrical driving mode, to switch from one mode to another mode, and the like, depending on user's need or road conditions.

A hydraulic automatic transmission (HAT) of this disclosure may also be fabricated as a unitary article, as a semi-unitary article, or as an assembly of multiple parts. In one example, a HAT may include a hydraulic pump unit (or its hydraulic pump), a hydraulic motor unit (or its hydraulic motor), and all (or at least a substantial number of) various tubes inside a cover of a HAT, thereby providing the single, unitary article. In another example, a HAT may include a substantial portion of a hydraulic pump unit (or its hydraulic pump), a substantial portion of a hydraulic motor unit (or its hydraulic motor), and a substantial portion but not all tubes inside the cover of the HAT, thereby providing a semi-unitary article. When the cover is made of or includes sturdy material or when the cover is fabricated in a sturdy configuration, these configurations offer a benefit of mechanically protecting such units, motors, pumps or tubes contained inside the cover from external shocks or impacts.

Accordingly, various hydraulic automatic transmission (HAT) bicycles of this disclosure may be provided in various configurations as described hereinabove and hereinafter, and may be operated or used in various methods as described hereinabove and hereinafter. As a result, such HAT bicycles of this disclosure offer a user with various benefits or advantages such as, e.g., enhanced convenience, improved safety, and the like.

A hydraulic automatic transmission bicycle (HAT bicycle) of this disclosure includes therein various hydraulic automatic transmissions (HATs) in order to solve various problems or shortcomings associated with prior art bicycles by incorporating various configurations thereinto or by operating such HATs in various methods. Following portions of this disclosure provide further configurations of such HATs and bicycles incorporating such HATs, further methods of constructing such HATs and HAT bicycles, and further methods of using such HATs and HAT bicycles.

It is appreciated that a hydraulic automatic transmission (HAT) bicycle of this disclosure may be embodied in various exemplary "aspects" or may incorporate at least one of such "aspects" therein. It is also appreciated that each of such exemplary "aspects" may be embodied in various exemplary "embodiments" or may also incorporate at least one of such "embodiments" therein. It is further appreciated that each of such exemplary "embodiments" may be practiced in various "detailed examples (or simply 'examples')" or may also include at least one of such "examples" therein. Accordingly, following portions of this disclosure enumerate each of such exemplary aspects along with their exemplary embodiments, and those examples for each of such embodiments.

In one exemplary aspect A' (i.e., an Aspect A') of this disclosure, a HAT bicycle may include therein at least one hydraulic motor unit, at least one hydraulic pump unit, and at least one control unit, and is configured to change a gear ratio automatically (or adaptively) in response to an external mechanical load exerted onto at least a portion of such a HAT. As used herein, a "hydraulic pump (or motor) unit" collectively refers to a hydraulic motor unit or a hydraulic pump unit hereinafter. More particularly, such a hydraulic motor unit may pressurize fluid which is contained therein (up) to a certain pressure (to be referred to as a "motor pressure" hereinafter) in response to an (external) mechanical load which typically depends upon a road condition.

A hydraulic pump unit may pressurize fluid contained therein to a certain pressure which exceeds the above motor pressure (to be referred to as a "pump pressure" hereinafter) using mechanical energy provided thereto by a user. The hydraulic pump unit may then discharge such pressurized fluid to a hydraulic motor unit indirectly or directly, where the hydraulic pump unit may variably control a discharging volume (or a discharging flow rate) of such pressurized fluid depending upon at least one of various factors such as, e.g., the above mechanical energy, such motor pressure, such pump pressure, an rpm of the hydraulic motor unit, or an rpm of other units coupling with the hydraulic motor unit. A control unit may also control at least one of such motor pressure, such pump pressure, and variable discharging volume (or flow rate) of the hydraulic pump unit (or its hydraulic pump). Because the hydraulic motor unit may then take in the pressurized fluid from the hydraulic pump unit in such a variable discharging volume, an rpm of the hydraulic motor unit can be different from an rpm of the hydraulic pump unit, whereby the hydraulic pump unit and the hydraulic motor unit may provide such infinitely variable gear ratios.

In another exemplary aspect A" (i.e., an Aspect A") of this disclosure which corresponds to a variation of the above exemplary Aspect A', a HAT bicycle may include at least one hydraulic motor unit, at least one hydraulic pump unit, at least one control unit, and at least one HAT, where the HAT is configured to change a gear ratio based on at least one of such external mechanical load, an rpm of the hydraulic motor unit, or an rpm of other parts coupling with the hydraulic motor unit. More particularly, the hydraulic motor unit may pressurize fluid contained therein to the motor pressure, while the hydraulic pump unit may pressurize fluid contained therein to the pump pressure which exceeds the motor pressure using mechanical energy provided by a user, and may then discharge the pressurized fluid to the hydraulic motor unit, where the hydraulic pump unit may variably control a discharging volume (or flow rate) of the pressurized fluid based on at least one of various factors such as, e.g., the above mechanical energy, such motor pressure, such pump pressure, an rpm of the hydraulic motor unit, or an rpm of other units coupling with the hydraulic motor unit. The hydraulic motor unit, the hydraulic pump unit, or the control unit is configured to directly or indirectly couple with a body of the bicycle.

Accordingly, the hydraulic motor unit may take in a variable volume of the fluid discharged by the hydraulic pump and drives itself, thereby automatically changing a gear ratio from a $1^{st}$ rpm of the hydraulic motor unit and another 2nd rpm of the hydraulic pump unit which is different from the $1^{st}$ rpm.

As defined herein, an exemplary aspect A collectively refers to such an Aspect A' as well as such an Aspect A", and various embodiments of the Aspect A are as follows.

In one exemplary embodiment A-1 of this exemplary aspect A, a HAT or its hydraulic pump (or motor) unit may be configured as a light-weight HAT (or unit) or a heavy weight HAT (or unit) in proportion to a weight of a user, or that of a frame of a HAT bicycle. In one example, a HAT or its hydraulic pump (or motor) unit may be configured to weigh [1] less than about 13 kg, 11 kg, 9 kg, 7 kg, 5 kg or 3 kg, or [2] less than about 160%, 140%, 120%, 100%, 90%, 80%, 70%, 60%, 50%, 40% or 30% of a weight of the frame of the HAT bicycle. When the frame is made of or includes a light metal or a light composite material, the weight of the HAT or its hydraulic pump (or motor) unit may be less than about 230%, 210%, 190%, 170%, 150%, 130%, 110% or 90% of a weight of the frame of the HAT bicycle. Other details of a weight of the HAT or its hydraulic pump (or motor) unit may also be similar or identical to those of various embodiments of other aspects of this disclosure.

In another exemplary embodiment A-2 of this exemplary aspect A, a HAT or its hydraulic pump (or motor) unit may be configured as a large-sized transmission (or unit), as a medium-sized transmission (or unit), or as a small-sized transmission (or unit), in proportion to a size (e.g., a length or a height) of a user or a frame of a HAT bicycle. For example, a driving part of the hydraulic pump (or motor) unit may have a size which may be less than about 33 cm, 30 cm, 27 cm, 24 cm, 21 cm, 18 cm, 15 cm or 12, or may instead have a smaller size which may be less than about 13 cm, 11 cm, 9 cm, 7 cm or 5 cm when the HAT or its hydraulic pump (or motor) may be provided as a small-sized transmission (or unit). When the hydraulic pump (motor) unit may include a vane pump (or motor), a diameter of a rotor of the vane pump (or motor) may be less than about 32 cm, 29 cm, 26 cm, 23 cm, 20 cm, 17 cm, 14 cm, 11 cm, or 8 cm. However, when the hydraulic pump (or motor) unit may include a piston pump (or motor), a displacement of its driving part (i.e., its piston) may be less than about 32 cm, 29 cm, 26 cm, 23 cm, 20 cm, 17 cm, 14 cm, 11 cm, or 8 cm. In addition, when the hydraulic pump (or motor) unit includes a light-weight vane pump (or motor) or a light-weight piston pump (or motor), a diameter or a displacement of its driving part may be less than about 12 cm, 10 cm, 8 cm, 6 cm or 4 cm.

It is appreciated in the above paragraph that a size of the hydraulic pump (or motor) unit and its hydraulic pump (or motor) may correspond to its length or height depending upon an orientation of its installation and, therefore, the size may correspond to a long axis of the hydraulic pump (or motor). In addition, a thickness of the HAT, its hydraulic pump (or motor) unit or its hydraulic pump (or motor) may be less than about 130%, 110%, 90%, 70%, or 50% of a width of a seat of the HAT bicycle. A thickness of the HAT, its hydraulic pump (or motor) unit, or its hydraulic pump (or motor) may instead be less than about 150%, 130%, 110%, 100%, 90%, 80%, 70%, or 60% of a maximum distance between the pedals of the HAT bicycle. Details of such a size, a length, a height, or a thickness of the HAT or its hydraulic pump (or motor) unit may be similar or identical to those of various embodiments of other aspects of this disclosure.

In another exemplary embodiment A-3 of this exemplary aspect A, a HAT or its hydraulic pump (or motor) unit may be configured to have various volumes (or flow rates) in proportion to a body constitution of a user or to a mechanical load imposed by various road conditions. In addition and based thereon, the HAT or its hydraulic pump (or motor) unit may be classified into a high-volume HAT (or unit), a mid-volume HAT (or unit) or a low-volume HAT (or unit).

Alternatively, a HAT or its hydraulic pump (or motor) unit may be classified into a high-volume ratio HAT (or unit), a mid-volume ratio HAT (or unit) or a low-volume ratio HAT (or unit) according to a mechanical load which may be imposed by a road condition or which may be determined by a physical condition of a user. As used herein, a "volume ratio" is to be defined as a ratio of an intake (or discharging) volume of a fluid by (or out of) a hydraulic motor unit (or its hydraulic motor) to an intake (or discharging) volume of a fluid by (or out of) a hydraulic pump unit (or its hydraulic pump). When a hydraulic pump (or motor) may be a variable-volume type, a maximum volume (or volume ratio) and a minimum volume (or volume ratio) may also be calculated. For example, the HAT or its hydraulic pump (or motor) unit is configured to have such a volume ratio which may be less than about 10.0 or, more particularly, less than about 5.0, about 4.0, about 3.0, between about 1.0 and about 2.0, between about 0.5 and about 1.0, between about 0.2 and about 0.5, between about 0.1 and 0.2, and the like. The HAT bicycle may also configure its hydraulic pump unit (or its hydraulic pump) or its hydraulic motor unit (or its hydraulic motor) to have relatively big volumes depending upon needs of a user.

In another exemplary embodiment A-4 of this exemplary aspect A, a HAT including one of such HATs may include a hydraulic pump (or motor) unit or its driving part capable of rotating in a high speed, a medium speed, or a low speed, according to the mechanical load or mechanical energy provided by a user. In one example, such a hydraulic pump (or motor) unit or its driving part may rotate at about 600 rpm in a very high speed riding, at about 200 rpm, 300 rpm, 400 rpm or 500 rpm in a high speed riding, between about 60 rpm and 200 rpm in a normal riding, and the like.

In another exemplary embodiment A-5 of this exemplary aspect A, a HAT or its hydraulic pump (or motor) unit may be classified into a high-pressure HAT (or unit), a mid-pressure HAT (or unit) or a low-pressure HAT (or unit) according to fluid pressure inside such a HAT (or unit) or pressure of a fluid discharging out of such a HAT (or unit) which may be determined according to such mechanical load, such mechanical energy, a weight of a user, and the like. For example, the HAT or its hydraulic pump (or motor) unit may operate in a range of pressure which may be less than about 130 atm, about 110 atm, about 90 atm, or about 70 atm.

In another exemplary embodiment A-6 of this exemplary aspect A, a HAT including one of such HATs may operate using mechanical energy provided by a user or mechanical energy supplied from an electrical motor. More particularly, when the HAT may include a control unit, its shift adjustor may be manipulated by mechanical energy provided by a user (e.g., manually by a user) or by mechanical energy (provided from a battery through an electrical motor). In addition, a user may operate the HAT bicycle with mechanical energy provided to a pedal by a user. When the HAT bicycle includes an electrical motor and a battery, a user may operate the HAT bicycle using such mechanical energy and using mechanical energy which is provided from the electrical motor operating on the battery. To this end, the HAT bicycle may include at least one switch which allows a user to select one of a "manual driving mode" and an "electrical driving mode" and to switch from one mode to another.

In another exemplary embodiment A-7 of this exemplary aspect A, a HAT bicycle with a HAT may include a cruise controller which may work in conjunction with an electrical motor and a battery. Accordingly, when a user is tired of manually rotating a pedal to supply mechanical energy thereto or when a user cannot keep up uphill to maintain a desired speed, a user may switch from a manual driving mode to an electrical driving mode, where an electrical motor drives the HAT bicycle without user's mechanical energy in such an electrical driving mode. To this end, a cruise controller may include a cruise switch which can turn on or off the cruise controller, a speed setting switch with which a user may select a driving speed, a reset switch with which a user may adjust a speed, and the like.

In another exemplary embodiment A-8 of this exemplary aspect A, when a HAT bicycle including one of such HATs includes a battery and an electrical motor, the bicycle may include a prior art electrical generator, a prior art secondary battery, and the like. Therefore, when the battery is a rechargeable battery, the HAT bicycle may supply an electrical current or electrical voltage to recharge the battery while a user is riding the bicycle. In addition, the bicycle may use electrical energy from the generator or rechargeable battery in controlling various valves, pistons or switches of a control unit as described hereinabove and hereinafter. It is appreciated that the rechargeable battery may include a $1^{st}$ switch with which a user can turn such a battery on or off, a $2^{nd}$ switch with which a user can provide a certain portion of mechanical energy which he or she provides to the battery, and the like.

In another exemplary embodiment A-9 of this exemplary aspect A, a HAT bicycle including one of the above HATs may include a "forward clutch." It is appreciated that, when a user may rotate a pedal in a forward direction (i.e., a "forward rotation") in a HAT bicycle wihch does not include any forward clutch, fluid is pressurized in a hydraulic pump by mechanical energy which is supplied by a user and flows to a hydraulic motor. Therefore, the HAT bicycle may move in the forward direction. When a user rotates the pedal in an opposite, backward direction (i.e., a "backward rotation"), however, the fluid may not move in the backward direction and, therefore, the HAT bicycle may not move at all. In contrary, when a user rotates a pedal in the backward direction in a HAT bicycle with the forward clutch, such a forward clutch may prevent mechanical energy from being delivered to the hydraulic pump and, therefore, may allow a user to move a HAT bicycle in the forward direction. Such a forward clutch may be implemented into various locations of the HAT bicycle, where typical examples of the locations may include a driving axis of a hydraulic pump, a driving axis of a hydraulic motor, and the like.

Such a forward clutch may also be implemented to other locations of a HAT bicycle. In one example, the HAT bicycle may include at least one valve in or along one of various (fluid) tubes of the bicycle, where such a valve may allow a fluid to flow in one direction but may prevent the fluid flow in an opposite direction, and where examples of such valves may include a one-way valve, a check valve, and the like. Therefore, such a valve may function as the forward clutch as described above. In general, such a valve may be implemented into an inlet or an outlet of a hydraulic pump unit (or its hydraulic pump), an inlet or outlet of a hydraulic motor unit (or its hydraulic motor), and the like, and function as the aforementioned forward clutch.

In another exemplary embodiment A-10 of this exemplary aspect A, a HAT bicycle with one of the above HATs may include at least one hydraulic brake in various locations of the bicycle and use the brake to slow down or to stop the bicycle. In one example, the HAT bicycle may implement at least one valve along at least one of various fluid tubes, along an inlet (or an outlet) of a hydraulic pump unit (or its hydraulic pump), along an inlet (or an outlet) of a hydraulic motor unit (or its hydraulic motor), and the like, and may utilize such a valve as the hydraulic brake, where examples of such valves may include a stop valve, a cock valve or other control valves capable of adjusting or blocking a fluid flow therethrough. In another example, the HAT bicycle may accomplish such braking in other means and utilize such means as the hydraulic brake in such a way that, e.g., the HAT bicycle may rapidly decrease fluid pressure in any portion of the HAT and may rapidly slow down or stop itself by rapidly bypassing pressurized fluid to a fluid tank from a tube, from a hydraulic pump (or motor) unit, or from a hydraulic pump (or motor).

It is appreciated that almost all of various valves described in the above embodiments are on-off valves or shut-off valves which may generally switch between an open position and a closed position and which may [1] allow fluid to flow therethrough or [2] stop such fluid flow. In contrary, a HAT bicycle may instead recruit various prior art control valves instead of such on-off or shut-off valves and utilize such control valves as a hydraulic brake so that the control valves may adjust (or control) a flow rate therethrough, where examples of such control valves may include a butterfly valve, a needle valve or other conventional valves which may operate not only in an open or closed position but also in at least one intermediate position. The HAT bicycle may also enhance braking by employing not only a prior art mechanical brake but also the above hydraulic brake. The HAT bicycle may also [1] manipulate the mechanical and hydraulic brakes to work concurrently with each other (e.g., when a user provides mechanical energy to one of such brakes, another brake also begins to work concurrently), or [2] manipulate one of such mechanical and hydraulic brakes to work first, and then manipulate another of such brakes to begin to work after a certain period of time. In addition, the HAT bicycle may configure such brakes to work concurrently or sequentially but in such a way that [1] both of such brakes may exert an identical or similar amount of mechanical energy to slow down or to stop the HAT bicycle, or [2] one of such brakes first begins to operate with a $1^{st}$ amount of mechanical energy, and then another of such brakes begins to operate with a $2^{nd}$ amount of mechanical energy which is greater than the $1^{st}$ amount.

In another exemplary embodiment A-11 of this exemplary aspect A, a hydraulic pump (or motor) unit of a HAT may recruit various types of conventional pumps (or motors) such as, e.g., a vane pump (or motor), a gear pump (or motor), a piston pump (or motor), a screw pump (or motor), and the like. The hydraulic pump unit and a hydraulic motor unit may include an identical or similar type of a pump and a motor in such a way that, e.g., [1] the hydraulic pump unit may include a vane pump, while the hydraulic motor unit may include a vane motor, [2] the hydraulic pump unit may include a gear pump, while the hydraulic motor unit may include a gear motor, [3] the hydraulic pump unit may include a variable-volume vane pump, while the hydraulic motor unit may include a fixed-volume vane pump, and the like. Conversely, the hydraulic pump unit and the hydraulic motor unit may include a different type of a pump and a motor such that, e.g., the hydraulic pump unit may include a piston pump, while the hydraulic motor unit may include a gear motor.

In another exemplary embodiment A-12 of this exemplary aspect A, at least one of a hydraulic pump unit and a hydraulic motor unit may include at least one variable-volume pump or motor of various types. As a result, the hydraulic pump unit and the hydraulic motor unit may respectively include the variable-volume hydraulic pump and the variable-volume hydraulic motor. Conversely, the hydraulic pump unit may include a variable-volume hydraulic pump, while the hydraulic motor unit may include a fixed-volume hydraulic motor. Alternatively, the hydraulic pump unit may include a fixed-volume hydraulic pump, while the hydraulic motor unit may include a variable-volume hydraulic motor.

Other configurational or operational details of each of the above exemplary embodiments A-1 to A-12 of the exemplary aspect A may be similar or identical to those of other exemplary embodiments of this aspect A, or to those of other related exemplary embodiments of other aspects of this disclosure to be provided below.

In another exemplary aspect B' (i.e., an Aspect B') of this disclosure, a HAT bicycle may include at least one hydraulic motor unit, at least one hydraulic pump unit, and at least one control unit, thereby automatically changing gear ratios in response to mechanical load which is imposed by an external road condition. More particularly, the hydraulic motor unit may include at least one variable-volume (or fixed-volume) hydraulic motor each of which may apply mechanical energy onto fluid contained therein and to pressurize the fluid to the motor pressure in response to the mechanical load. The hydraulic pump unit may include at least one variable-volume hydraulic pump which may be configured to apply mechanical energy onto fluid contained therein, to pressurize the fluid to the pump pressure which may exceed the motor pressure, and then to discharge the pressurized fluid to the hydraulic motor, where a fluid volume which is discharged from the hydraulic pump unit (i.e., a discharging volume) may be manipulated or varied based on the mechanical load, the motor pressure or the mechanical energy. A HAT (or a user) may provide the control unit with at least one (control) set-point, where the control unit may vary such a discharging volume based on the set-point as well as based on at least one of the mechanical load, the motor pressure, the mechanical energy applied by a user, the pump pressure, an rpm of the hydraulic motor unit (or an rpm of its driving part), or an rpm of other parts coupled to the hydraulic motor unit, an rpm of the hydraulic motor (or an rpm of its driving part), as well as the set-point. Accordingly, the hydraulic motor unit may take in the fluid in an amount of the variable discharging volume which is discharged from the hydraulic pump unit, and may pressurize the fluid as described above, whereby such different rpms of the hydraulic pump unit and hydraulic motor unit may embody such automatic transmission (e.g., automatic gear ratio changing).

In another exemplary aspect B" (i.e., an Aspect B") of this disclosure which is a variation or a modification of the above Aspect B', a HAT bicycle may include at least one hydraulic motor unit, at least one hydraulic pump unit, and at least one control unit, thereby automatically changing gear ratios in response to at least one of mechanical load imposed by an external road condition, an rpm of the hydraulic motor unit (or its driving part), and an rpm of another part coupling with the hydraulic motor unit. More particularly, such a hydraulic motor unit may include at least one hydraulic motor, where the hydraulic motor may pressurize fluid contained therein to the motor pressure in response to such mechanical load. The hydraulic pump unit may include at least one variable-volume hydraulic pump which may pressurize fluid contained therein to the pump pressure which exceeds the motor pressure using the mechanical energy supplied by a user and may discharge the pressurized fluid to the hydraulic motor, where a discharging volume of such pressurized fluid may be variable and depend upon at least one of the mechanical load, the motor pressure, the mechanical energy, an rpm of the hydraulic motor unit (or its hydraulic motor), an rpm of another part coupling with the hydraulic motor unit (or its hydraulic motor), and the like. The control unit may have its (control) set-point and may control such discharging volume based on at least one of the mechanical load, the motor pressure, the mechanical energy, the pump pressure, an rpm of the hydraulic motor unit (or its hydraulic motor), and an rpm of another part coupling with the hydraulic motor unit (or its hydraulic motor), as well as the set-point. In addition, at least one of the hydraulic motor unit, the hydraulic pump unit, and the control unit may be directly or indirectly couple with a body of the HAT bicycle. Accordingly, the hydraulic motor unit may take in a variable volume of the pressurized fluid and operate itself, thereby accomplishing such automatic gear changes due to different rpms of the hydraulic motor unit and the hydraulic pump unit.

As defined herein, an exemplary aspect B collectively refers to such an Aspect B' as well as such an Aspect B", and various embodiments of such an aspect B are as follows.

In one exemplary embodiment B-1 of this exemplary aspect B, a HAT bicycle including one of such HATs may configure the above control unit such that a user may not adjust or change a (control) set-point (e.g., a non-adjustable control set-point) or that a user may adjust such a (control) set-point (e.g., an adjustable control set-point). In another exemplary embodiment B-2 of this exemplary aspect B, the hydraulic pump (or motor) unit, its hydraulic pump (or motor) or the HAT may be configured as a light-weight unit (or HAT), as a regular-weight unit (or HAT), or a heavy-weight unit (or HAT) in proportion to a weight of a user or a frame of the HAT bicycle, as described above.

In another exemplary embodiment B-3 of this exemplary aspect B, the hydraulic pump (or motor) unit, the hydraulic pump (or motor), or the HAT may be configured to have a size (e.g., its length or height) to form a large-sized unit (or HAT), a medium-sized unit (or HAT), or a small-sized unit (or HAT), in proportion to a size (e.g., a length or a height) of a user or a frame of the HAT bicycle. For example, the hydraulic pump (or motor) unit, its hydraulic pump (or motor), or the HAT may be shaped or sized in a certain size or percentage as exemplified in the exemplary embodiment A-2 of the exemplary Aspect A. Alternatively and in another exemplary embodiment B-4 of this exemplary aspect B, the hydraulic pump (or motor) unit, the hydraulic pump (or motor), or the HAT may define an internal or external volume which may be classified into a high-volume unit (or HAT), a mid-volume unit (or HAT), or a low-volume unit (or HAT) based on various physical conditions of a user or a mechanical load imposed by a road condition. Alternatively, the hydraulic pump (or motor) unit, the hydraulic pump (or motor), or the HAT may instead be classified into a high-volume ratio unit (or HAT), a mid-volume ratio unit (or HAT), or a low-volume ratio unit (or HAT).

In another exemplary embodiment B-5 of this exemplary aspect B, a HAT bicycle including one of the above HATs may configure a driving part of its hydraulic pump (or motor) unit, of its hydraulic pump (or motor), or of its HAT to rotate in a high speed, in a medium speed, or in a low speed, based on such mechanical energy provided by a user, such mechanical load imposed by a road condition, and the like. For example, an rpm of the hydraulic pump (or motor) unit, of the hydraulic pump (or motor), or of the HAT may be similar or identical to those exemplified in the embodiment A-4 of the exemplary Aspect A. Alternatively and in another exemplary embodiment B-6 of this exemplary aspect B, a HAT bicycle including one of such various HATs may configure the hydraulic pump (or motor) unit, the hydraulic pump (or motor), or the HAT to operate as a high-pressure unit (or HAT), a mid-pressure unit (or HAT) or a low-pressure unit (or HAT) based on fluid pressure inside such a unit (or HAT) or fluid pressure discharged out of the unit (or HAT), a weight of a user, such mechanical energy or such mechanical load.

In another exemplary embodiment B-7 of this exemplary aspect B, a HAT bicycle as well as its HAT may be configured to operate with mechanical energy provided by a user or with mechanical energy supplied from at least one battery through an electrical motor, where further details of such a HAT bicycle or its HAT may be similar or identical to those exemplified in the embodiment A-6 of the exemplary Aspect A. Alternatively and in another exemplary embodiment B-8 of this exemplary aspect B, a HAT bicycle including one of the above HATs may include a "cruise controller" along with an electrical motor and a battery, where further details of such a HAT and its cruise controller may be similar or identical to those exemplified in the embodiment A-7 of the exemplary Aspect A. Alternatively and in another exemplary embodiment B-9 of this exemplary aspect B, a HAT bicycle including one of such various HATs may include an electrical motor and a battery or may also include an electrical generator or a rechargeable battery.

In another exemplary embodiment B-10 of this exemplary aspect B, a HAT bicycle including one of the HATs may also include one of a mechanical forward clutch or a hydraulic forward clutch as previously exemplified in the embodiment A-9 of the exemplary Aspect A. Alternatively and in another exemplary embodiment B-11 of this exemplary aspect B, a HAT bicycle including one of such HATs may include at least one hydraulic brake in various tubes, or in various inlets (or outlets) of the above units or pumps (or motors), thereby slowing down or stopping the HAT bicycle.

In another exemplary embodiment B-12 of this exemplary aspect B, a hydraulic pump (or motor) unit may include various types of pumps (or motors), where further details of such pumps (or motors) may be similar or identical to those of the exemplary embodiment A-11 of the exemplary Aspect A. In addition, a HAT bicycle or its HAT of this exemplary embodiment (as well as other embodiments) of this exemplary Aspect B may include at least one variable-volume pump (or motor) in its hydraulic pump (or motor) unit.

Other configurational or operational details of each of the above exemplary embodiments B-1 to B-12 of the exemplary aspect B may be similar or identical to those of other exemplary embodiments of this aspect B, or to those of other related exemplary embodiments of other aspects of this disclosure provided hereinabove or to be provided hereinafter.

In another exemplary aspect C' (i.e., an Aspect C') of this disclosure, a HAT may incorporate at least one hydraulic pump, at least one hydraulic motor, and at least one control unit, and may automatically change its gear ratios according to mechanical load exerted from an exterior. More particularly, the hydraulic motor may pressurize fluid contained therein to the motor pressure according to the external mechanical load. The hydraulic pump may be one of a variable-volume vane pump, a variable-volume gear pump, or a variable-volume piston pump, each of which may vary its driving volume such that, e.g., a volume of fluid contained therein, a volume of fluid taken thereinto or discharged therefrom may vary, and the like. The hydraulic pump may pressurize fluid contained therein up to the pump pressure (which exceeds the motor pressure) with the mechanical energy, and then discharge the pressurized fluid to the hydraulic motor. The control unit may define a (control) set-point, and manipulate (or adjust) such a driving volume of the hydraulic pump based on at least one of the mechanical load, the motor pressure, the mechanical energy, the pump pressure, an rpm of the hydraulic motor, or an rpm of another part coupling with the hydraulic motor as well as based on the control set-point, thereby manipulating (or changing) a discharging volume from the hydraulic pump. As a result, the hydraulic motor takes in the pressurized fluid in a variable volume, and drives (or rotates) itself in an rpm which may be different from an rpm of the hydraulic pump, thereby automatically changing gear ratios.

In another exemplary aspect C" (i.e., an Aspect C") of this disclosure which is a variation or a modification of the above Aspect C', a HAT bicycle may include at least one hydraulic pump, at least one hydraulic motor, and at least one control unit, where a HAT of the HAT bicycle may automatically change its gear ratios based on at least one of mechanical load exerted from an environment (e.g., an external rod condition), an rpm of its hydraulic motor, or an rpm of another part coupling with the hydraulic motor. More particularly, the hydraulic motor may pressurize fluid contained therein to the motor pressure according to the mechanical load. The hydraulic pump may be a variable-volume vane pump, a variable-volume gear pump, or a variable-volume piston pump, each of which has a driving volume which may vary. The hydraulic pump may pressurize fluid contained therein with the mechanical energy supplied by a user to the pump pressure which exceeds the motor pressure, and discharge such pressurized fluid to the hydraulic motor. The control unit may define a (control) set-point, and may vary a driving volume of the hydraulic pump based on at least one of the mechanical load, the motor (or pump) pressure, the energy, an rpm of the hydraulic motor, or an rpm of another part coupling with the hydraulic motor, as well as based on the control set-point, thereby variably controlling the discharging volume of the hydraulic pump. The hydraulic motor, the hydraulic pump, and the control unit may also be directly or indirectly couple with a body of the HAT bicycle.

Accordingly, the hydraulic motor may take in the pressurized fluid from the hydraulic pump in a varying amount (or volume) and drive itself, and the rpm of the hydraulic motor (or unit) may become different from an rpm of the hydraulic pump (or unit), thereby automatically changing gear ratios while a user drives the HAT bicycle.

As defined herein, an exemplary aspect C collectively refers to such an Aspect C' as well as such an Aspect C", and various embodiments of such an aspect C are as follows.

In one exemplary embodiment C-1 of this exemplary aspect C, a control unit may not allow a user to vary its (control) set-point (i.e., an invariable or constant control set-point), or may allow a user to change such a (control) set-point (i.e., a variable control set-point). Alternatively and in another exemplary embodiment C-2 of this exemplary aspect C, a HAT bicycle may configure the hydraulic pump, the hydraulic motor, or the HAT as a light-weight pump, motor, or HAT, a medium-weight pump, motor, or HAT or a heavy weight pump, motor, or HAT, in proportion to a weight of a user, that of a frame of a HAT bicycle, and the like.

In another exemplary embodiment C-3 of this exemplary aspect C, a HAT bicycle may configure its hydraulic pump (or motor) or HAT to have a size (e.g., a length or a height) such as a large-sized pump (or motor) or HAT, as a medium-sized pump (or motor) or HAT, or as a small-sized pump (or motor) or HAT, in proportion to a size (e.g., a length or a height) of a user or a frame of a HAT bicycle or as a percentage of such a size of the user or the frame. Alternatively and in another exemplary embodiment C-4 of this exemplary aspect C, a HAT bicycle may configure its hydraulic pump (or motor) or its HAT to have an internal or external volume such as a large-volume (or large-volume ratio) pump (or motor) or HAT, a medium-volume (or medium-volume ratio) pump (or motor) or HAT, or a small-volume (or small-volume ratio) pump (or motor) or HAT, in proportion to a size (e.g., a length or a height) of a user or the mechanical load exerted by a road condition.

In another exemplary embodiment C-5 of this exemplary aspect C, a HAT bicycle may configure its hydraulic pump (or motor) or its HAT as a high-speed pump (or motor) or HAT, a medium-speed pump (or motor) or HAT, or a low-speed pump (or motor) or HAT, based on an rpm of such a pump (or motor) or HAT attained by the mechanical energy or the mechanical load. Alternatively and in another exemplary embodiment C-6 of this exemplary aspect C, a HAT bicycle may configure its hydraulic pump (or motor) or its HAT a high-pressure pump (or motor) or HAT, a medium-pressure pump (or motor) or HAT, or a low-pressure pump (or motor) or HAT, based on the pressure of the fluid contained therein or the pressure of the fluid discharged from the hydraulic pump (or motor) unit, from the hydraulic pump (or motor) or from the HAT, a weight of a user, the mechanical energy or the mechanical load.

In another exemplary embodiment C-7 of this exemplary aspect C, a HAT may be configured to operate with mechanical energy supplied by a user or with mechanical energy supplied from an electrical motor operating on a battery. A HAT bicycle with a HAT may similarly operate with mechanical energy supplied by a user or with mechanical energy supplied from an electrical motor operating on a battery. Alternatively and in another exemplary embodiment C-8 of this exemplary aspect C, a HAT bicycle with a HAT may include a cruise controller along with an electrical motor and a battery therefor. Alternatively and in another exemplary embodiment C-9 of this exemplary aspect C, a HAT bicycle with a HAT may also include an electrical motor and a battery, along with an optional generator or a rechargeable battery.

In another exemplary embodiment C-10 of this exemplary aspect C, a HAT bicycle with a HAT may include at least one forward clutch. Alternatively and in another exemplary embodiment C-11 of this exemplary aspect C, a HAT bicycle with a HAT may include at least one hydraulic brake incorporated into various areas or locations thereof in order to slow down or stop the bicycle during operation.

In another exemplary embodiment C-12 of this exemplary aspect C, a HAT may include various pumps (or motors) in its hydraulic pump (or motor) unit. Alternatively and in another exemplary embodiment C-13 of this exemplary aspect C, a hydraulic pump unit or a hydraulic motor unit of a HAT may include at least one variable-volume pump or motor.

In another exemplary aspect D' (i.e., an Aspect D') of this disclosure, a HAT of a HAT bicycle may include at least one vane pump, at least one hydraulic motor, and at least one control unit, and may automatically change gear ratios based on at least one of external mechanical load exerted thereonto. More particularly, a hydraulic motor may pressurize fluid contained therein to the motor pressure according to the external mechanical load. A vane pump may be disposed inside an outer cam ring, and may include a rotor which rotates about the driving axis and which is movable. The vane pump may pressurize fluid contained therein with the mechanical energy supplied by a user to the pump pressure exceeding the motor pressure, and discharge to a hydraulic motor the pressurized fluid in an amount which corresponds to a volume between the outer cam ring and the rotor. The control unit may define a (control) set-point, and may vary a discharging volume of the vane pump by manipulating a distance between a center of the outer cam ring and the driving axis of the vane pump, based on at least one of the mechanical load, the motor (or pump) pressure, the mechanical energy, and an rpm of the vane motor, as well as based on the control set-point. Thus, the hydraulic motor may take in the fluid discharged from the vane pump and automatically change gear ratios based on the difference between an rpm of the hydraulic pump unit and an rpm of the hydraulic motor, where the hydraulic motor may be another vane motor or of a different type.

In another exemplary aspect D" (i.e., an Aspect D") of this disclosure which is a variation or a modification of the above Aspect D', a HAT of a HAT bicycle may include at least one vane pump, at least one hydraulic motor, and at least one control unit, and may automatically change gear ratios based on at least one of external mechanical load exerted thereonto, an rpm of the hydraulic motor, and an rpm of another part coupling with the hydraulic motor. In particular, a hydraulic motor may pressurize fluid contained therein to the motor pressure according to the external mechanical load. A vane pump may be disposed inside an outer cam ring, and may include a rotor which rotates about the driving axis and which is movable. The vane pump may pressurize fluid contained therein with the mechanical energy supplied by a user to the pump pressure exceeding the motor pressure, and discharge to a hydraulic motor the pressurized fluid in an amount which corresponds to a volume between the outer cam ring and the rotor. The control unit may define a (control) set-point, and may vary a discharging volume of the vane pump by manipulating a distance between the outer cam ring and the driving axis of the vane pump, based on at least one of the mechanical load, the motor (or pump) pressure, the mechanical energy, an rpm of the vane motor, and an rpm of at least one part coupling with the hydraulic motor, as well as based on the control set-point. In addition, at least one of the hydraulic motor, the vane pump, and the control unit may be directly or indirectly coupled to a frame of the HAT bicycle. Thus, the hydraulic motor may take in the fluid discharged from the vane pump and automatically change gear ratios based on the difference between an rpm of the hydraulic pump unit and an rpm of the hydraulic motor, where the hydraulic motor may be another vane motor or of a different type.

As defined herein, an exemplary aspect D collectively refers to such an Aspect D' as well as such an Aspect D", and various embodiments of such an aspect D are as follows.

In one exemplary embodiment D-1 of this exemplary aspect D, a control unit may not allow a user to vary its (control) set-point (i.e., an invariable or constant control set-point), or may allow a user to change such a (control) set-point (i.e., a variable control set-point). Alternatively and in another exemplary embodiment D-2 of this exemplary aspect D, a HAT bicycle may configure the vane pump, the hydraulic motor, or the HAT as a light-weight pump, motor, or HAT, a medium-weight pump, motor, or HAT or a heavy weight pump, motor, or HAT, in proportion to a weight of a user, that of a frame of a HAT bicycle, and the like.

In another exemplary embodiment D-3 of this exemplary aspect D, a HAT bicycle may configure its vane pump, its hydraulic motor, or HAT to have a size (e.g., a length or a height) such as a large-sized pump, motor, or HAT, as a medium-sized pump, motor, or HAT, or as a small-sized pump, motor, or HAT, in proportion to a size (e.g., a length or a height) of a user or a frame of a HAT bicycle or as a percentage of such a size of the user or the frame.

In another exemplary embodiment D-4 of this exemplary aspect D, a HAT bicycle may configure its vane pump, its hydraulic motor, or its HAT to have an internal or external volume such as a large-volume (or large-volume ratio) pump, motor, or HAT, a medium-volume (or medium-volume ratio) pump, motor, or HAT, or a small-volume (or small-volume ratio) pump, motor, or HAT, in proportion to a size (e.g., a length or a height) of a user or the mechanical load exerted by a road condition. Alternatively and in another exemplary embodiment D-5 of this exemplary aspect D, a HAT bicycle may configure its vane pump, motor, or its HAT as a high-speed pump, motor, or HAT, a medium-speed pump, motor, or HAT, or a low-speed pump, motor, or HAT, based on an rpm of such a pump, motor, or HAT attained by the mechanical energy or the mechanical load.

In another exemplary embodiment D-6 of this exemplary aspect D, a HAT bicycle may configure its vane pump, motor, or its HAT a high-pressure pump, motor, or HAT, a medium-pressure pump, motor, or HAT, or a low-pressure pump, motor, or HAT, based on the pressure of the fluid contained in the pump, motor or HAT, the pressure of the fluid which is discharged from such a pump, motor, or HAT, a weight of a user or a frame, the mechanical energy or the mechanical load. Alternatively and in another exemplary embodiment D-7 of this exemplary aspect D, a HAT may be configured to operate with mechanical energy supplied by a user or with mechanical energy supplied from an electrical motor operating on a battery or a generator. A HAT bicycle with a HAT may also operate with mechanical energy supplied by a user or with mechanical energy supplied from an electrical motor operating on a battery or a generator.

In another exemplary embodiment D-8 of this exemplary aspect D, a HAT may be configured to operate with mechanical energy supplied by a user or with mechanical energy supplied from an electrical motor operating on a battery. A HAT bicycle with a HAT and a cruise controller may similarly operate with mechanical energy supplied by a user or with mechanical energy supplied from an electrical motor operating on a battery. In the alternative and in another exemplary embodiment D-9 of this exemplary aspect D, a HAT bicycle with a HAT may include a cruise controller along with an electrical motor and a battery therefor.

In another exemplary embodiment D-10 of this exemplary aspect D, a HAT bicycle including one of such various HATs may include various forward clutches. Alternatively and in another exemplary embodiment D-11 of this exemplary aspect D, a HAT bicycle including one of such various HATs may include at least one mechanical or hydraulic brake to slow down or stop the HAT bicycle, where such a brake may be included in various locations along a path of fluid as exemplified above.

In another exemplary embodiment D-12 of this exemplary aspect D, a hydraulic pump (or motor) unit of a HAT may include various pumps (or motors) as exemplified above. Alternatively and in another exemplary embodiment D-13 of this exemplary aspect D, at least one hydraulic pump (or motor) unit of a HAT may include a variable-volume pump (or motor).

In another exemplary aspect E' (i.e., an Aspect E') of this disclosure, a HAT bicycle may include at least one hydraulic pump unit, at least one hydraulic motor unit, and at least one controller unit, and may automatically change gear ratios in response to external mechanical load exerted thereonto. More particularly, a hydraulic motor unit may pressurize fluid contained therein to the motor pressure based on the external mechanical load, and discharge the pressurized fluid to a hydraulic motor, where the discharged volume is referred to as a motor discharging volume. The hydraulic pump unit may also pressurize fluid contained therein using mechanical energy provided by a user up to the motor pressure which exceeds the motor pressure and discharge the pressurized fluid to hydraulic motor unit, where the discharged volume is referred to as a pump discharging volume. The control unit may control at least one of the motor (or pump) pressure, the motor discharging volume, and the pump discharging volume. At least one of the hydraulic motor unit and the hydraulic pump unit may variably adjust its discharging volume based on at least one of the mechanical load, the motor (or pump) pressure, the mechanical energy, an rpm of a driving axis of the hydraulic motor unit, an rpm of another part coupling with the hydraulic motor unit, an rpm of a driving axis of the hydraulic pump unit, and an rpm of yet another part coupling with the hydraulic pump unit. Accordingly, an rpm of the hydraulic motor unit may become different from an rpm of the hydraulic pump unit, and the HAT bicycle can automatically change gear ratios based on the discharging volume of the hydraulic motor and pump units.

In another exemplary aspect E" (i.e., an Aspect E") of this disclosure which is a variation of the above aspect E', a HAT bicycle may include at least one hydraulic pump unit, at least one hydraulic motor unit, and at least one control unit, and may automatically change gear ratios based on at least one of external mechanical load, an rpm of a driving axis of the hydraulic motor unit, an rpm of another part coupling with the hydraulic motor unit, and the like.

More particularly, the hydraulic motor unit may pressurize fluid contained therein to the motor pressure in response to the mechanical load, and discharge the pressurized fluid in an amount corresponding to the motor discharging volume. The hydraulic pump unit may also pressurize fluid contained therein to the pump pressure which exceeds the motor pressure using the mechanical energy supplied by a user, and discharge the pressurized fluid to the hydraulic motor unit in an amount corresponding to the pump discharging volume. In another example, the control unit may control at least one of the motor (or pump) pressure, the motor discharging volume, and the pump discharging volume. At least one of the hydraulic motor unit and the hydraulic pump unit may variably adjust its discharging volume based on at least one of the mechanical load, the motor (or pump) pressure, the mechanical energy, an rpm of a driving axis of the hydraulic motor unit, an rpm of another part coupling with the hydraulic motor unit, an rpm of a driving axis of the hydraulic pump unit, and an rpm of yet another part coupling with the hydraulic pump unit. More particularly, the hydraulic motor unit, the hydraulic pump unit, and the control unit may couple with a frame of the HAT bicycle indirectly or directly. Accordingly, an rpm of the hydraulic motor unit may become different from an rpm of the hydraulic pump unit, and the HAT bicycle can automatically change gear ratios based on the discharging volume of the hydraulic motor unit and the hydraulic pump unit.

As defined herein, an exemplary aspect E collectively refers to such an Aspect E' as well as such an Aspect E", and various embodiments of such an aspect E are as follows.

In one exemplary embodiment E-1 of this exemplary aspect E, a HAT bicycle may configure its hydraulic pump (or motor) unit, its hydraulic pump (or motor), or its HAT as a light-weight unit, pump (or motor), or HAT, as a regular-weight unit, pump (or motor), or HAT, or a heavy-weight unit, pump (or motor), or HAT based on a weight of a user or a frame of the HAT bicycle, as described above. In another exemplary embodiment E-2 of this exemplary aspect E, a HAT bicycle may configure its hydraulic pump (or motor) unit, its hydraulic pump (or motor), or its HAT as a large-sized unit, pump (or motor), or HAT, a medium-sized unit, pump (or motor), or HAT, or a small-sized unit, pump (or motor), or HAT, based on a size (e.g., a length or a height) of a user or a frame of the HAT bicycle or as a percentage thereof. In another exemplary embodiment E-3 of this exemplary aspect E, a HAT bicycle may configure its hydraulic pump (or motor) unit, its hydraulic pump (or motor), or its HAT as a high-volume unit, pump (or motor), or HAT, a mid-volume unit, pump (or motor), or HAT, or a low-volume unit, pump (or motor), or HAT, based on various physical conditions of a user or a mechanical load imposed by a road condition. Alternatively, the hydraulic pump (or motor) unit, the hydraulic pump (or motor), or the HAT may instead be classified into a high-volume ratio unit, pump (or motor), or HAT, a mid-volume ratio unit, pump (or motor), or HAT, or a low-volume ratio unit, pump (or motor), or HAT.

In another exemplary embodiment E-4 of this exemplary aspect E, a HAT bicycle may configure its hydraulic pump (or motor) unit, its hydraulic pump (or motor), or its HAT to rotate in a high speed, in a medium speed, or in a low speed, based on such mechanical energy provided by a user, such mechanical load imposed by a road condition, and the like. Alternatively and in another exemplary embodiment E-5 of this exemplary aspect E, a HAT bicycle may configure its hydraulic pump (or motor) unit, its hydraulic pump (or motor), or its HAT to operate as a high-pressure unit, pump (or motor), or HAT, a mid-pressure unit, pump (or motor), or HAT, or a low-pressure unit, pump (or motor), or HAT, based on fluid pressure inside such a unit, pump (or motor), or HAT, fluid pressure discharged out of the unit, pump (or motor), or HAT, a weight of a user, such mechanical energy or such mechanical load.

In another exemplary embodiment E-6 of this exemplary aspect E, a HAT bicycle including such a HAT may be configured to operate with mechanical energy provided by a user or with mechanical energy supplied from at least one electrical motor operating on a battery or a generator. In another exemplary embodiment E-7 of this exemplary aspect E, a HAT bicycle including one of the above HATs may include a cruise controller along with an electrical motor and a battery. Alternatively and in another exemplary embodiment E-8 of this exemplary aspect E, a HAT bicycle including one of such various HATs may include an electrical motor and a battery or may also include an electrical generator or a rechargeable battery.

In another exemplary embodiment E-9 of this exemplary aspect E, a HAT bicycle including one of the HATs may include one of various mechanical or hydraulic forward clutches. In another exemplary embodiment E-10 of this exemplary aspect E, a HAT bicycle including one of various HATs may slow down or stop itself by incorporating at least one hydraulic brake in various tubes, or in various inlets (or outlets) of the above units or pumps (or motors). In another exemplary embodiment E-11 of this exemplary aspect E, a HAT of a HAT bicycle may include at least one of various types of pumps (or motors) in the hydraulic pump (or motor) unit. In another exemplary embodiment E-12 of this exemplary aspect E, the hydraulic pump (or motor) unit may include at least one variable-volume pump (or motor).

In another exemplary aspect F' (i.e., an Aspect F') of this disclosure, a HAT of a HAT bicycle may include at least one hydraulic pump, at least one hydraulic motor, and at least one control unit, and may change gear ratios automatically in response to external mechanical load which is exerted onto the HAT bicycle. More particularly, the hydraulic motor may pressurize fluid contained therein to the motor pressure based on the mechanical load. The hydraulic pump may define an internal driving volume, pressurize fluid contained therein up to the pump pressure (which exceeds the motor pressure) by operating its driving part with the mechanical energy supplied by a user, and discharge the pressurized fluid to the hydraulic motor unit in an amount corresponding to the driving volume (which may also correspond to the above pump discharging volume). The control unit may control the driving volume or the discharging volume from the hydraulic pump (or motor), by performing at least one of a linear (or translational) movement, a curved movement, or a rotational movement with respect to the driving part of the hydraulic pump (or motor) in synchronization with at least one of the mechanical load, the motor (or pump) pressure, the mechanical energy, an rpm of the hydraulic motor, or an rpm of another part coupling with the hydraulic motor. Because the hydraulic motor may take in the pressurized fluid discharged from the hydraulic pump, an rpm of the hydraulic motor may become different from an rpm of the hydraulic pump, and the HAT bicycle can automatically change gear ratios.

In another exemplary aspect F'' (i.e., an Aspect F'') of this disclosure which is a variation of the above aspect F', a HAT of a HAT bicycle may include at least one hydraulic pump, at least one hydraulic motor, and at least one control unit, and may automatically change gear ratios based on at least one of mechanical load exerted by an external source (e.g., a road condition), an rpm of a driving axis of the hydraulic motor, and an rpm of another part coupling with the hydraulic motor. More particularly, the hydraulic motor may pressurize fluid contained therein to the motor pressure in response to the mechanical load. The hydraulic pump may define an internal driving volume, pressurize fluid contained therein up to the pump pressure (which exceeds the motor pressure) by operating its driving part with the mechanical energy supplied by a user, and discharge the pressurized fluid to the hydraulic motor unit in an amount corresponding to the driving volume (which may also correspond to the above pump discharging volume). The control unit may control the driving volume or the discharging volume from the hydraulic pump (or motor), by performing at least one of a linear movement, a curved movement, or a rotational movement with respect to the driving part of the hydraulic motor (or pump) in synchronization with at least one of the mechanical load, the motor (or pump) pressure, the mechanical energy, an rpm of the hydraulic motor, or an rpm of another part coupling with the hydraulic motor. The hydraulic motor, the hydraulic pump, or the control unit may be directly or indirectly couple with a frame of the HAT bicycle. Accordingly, the hydraulic motor may take in the pressurized fluid discharged from the hydraulic pump, and an rpm of the hydraulic motor may become different from an rpm of the hydraulic pump. As a result, the HAT bicycle can automatically change gear ratios.

As defined herein, an exemplary aspect F collectively refers to such an Aspect F' as well as such an Aspect F'', and various embodiments of such an aspect F are as follows.

In one exemplary embodiment F-1 of this exemplary aspect F, a HAT bicycle may set the above control unit such that a user may not adjust or change a (control) set-point (e.g., a non-adjustable control set-point) or that a user may adjust the (control) set-point (e.g., an adjustable control set-point). In another exemplary embodiment F-2 of this exemplary aspect F, a HAT bicycle may configure the hydraulic pump (or motor) or the HAT as a light-weight pump, motor, or HAT, as a regular-weight pump, motor, or HAT, or a heavy-weight pump, motor, or HAT, based upon a weight of a user or a frame of the HAT bicycle. In another exemplary embodiment F-3 of this exemplary aspect F, a HAT bicycle may configure the hydraulic pump (or motor) or the HAT to have a certain size (e.g., a length, a height or a width) such as a large-sized pump, motor, or HAT, a medium-sized pump, motor, or HAT, or a small-sized pump, motor, or HAT, based on a size (e.g., a length or a height) of a user or that of a frame of the HAT bicycle, or based on percentages therebetween.

In another exemplary embodiment F-4 of this exemplary aspect F, a HAT bicycle may configure the hydraulic pump (or motor) or the HAT to define an internal or external volume which may be classified into a high-volume pump, motor, or HAT, a mid-volume pump, motor, or HAT, or a low-volume pump, motor, or HAT based upon various physical conditions of a user or a mechanical load imposed by a road condition. In the alternative, the hydraulic pump (or motor) or the HAT may be classified into a high-volume ratio pump, motor, or HAT, a mid-volume ratio pump, motor, or HAT, or a low-volume ratio pump, motor, or HAT. In another exemplary embodiment F-5 of this exemplary aspect F, a HAT bicycle may configure such driving parts of the hydraulic pump (or motor) or the HAT to rotate in a high speed, in a medium speed, or in a low speed, based on such mechanical energy provided by a user, or such mechanical load imposed by a road condition.

In another exemplary embodiment F-6 of this exemplary aspect F, a HAT bicycle may configure the hydraulic pump (or motor) or the HAT to operate as a high-pressure pump, motor, or HAT, a mid-pressure pump, motor, or HAT, or a low-pressure pump, motor, or HAT, based on fluid pressure inside such a pump, motor, or HAT, fluid pressure discharged out of the pump, motor, or HAT, a weight of a user, such mechanical energy or such mechanical load. In another exemplary embodiment F-7 of this exemplary aspect F, a HAT may operate with the mechanical energy provided by a user or with mechanical energy supplied from at least one electrical motor operating on a battery or a generator. In addition, the HAT bicycle including one of the above HATs may also operate with the mechanical energy from a user or the mechanical energy from an electrical motor.

In another exemplary embodiment F-8 of this exemplary aspect F, a HAT may operate with the mechanical energy provided by a user or with mechanical energy supplied from at least one electrical motor operating on a battery. In addition, the HAT bicycle including one of such HATs may operate with at least one of such energies. In another exemplary embodiment F-9 of this exemplary aspect F, a HAT bicycle including one of the above HATs may include a cruise controller along with an electrical motor and a battery In another exemplary embodiment F-10 of this exemplary aspect F, a HAT bicycle including one of the HATs may include one of various mechanical or hydraulic forward clutches. In another exemplary embodiment F-11 of this exemplary aspect F, a HAT bicycle including one of various HATs may slow down or stop itself by incorporating at least one hydraulic brake in various locations such as, e.g., in one of such tubes, in various inlets (or outlets) of such pumps (or motors), and, the like.

In another exemplary embodiment F-12 of this exemplary aspect F, a HAT bicycle may include at least one of various types of pumps and at least one of various types of motors as its hydraulic pump and its hydraulic motor. In another exemplary embodiment F-13 of this exemplary aspect F, at least one of the hydraulic pump and the hydraulic motor may include at least one variable-volume pump or motor.

Other configurational or operational details of such HAT bicycles or their HATs of such exemplary aspects A to F may be similar or identical to those of such HAT bicycles or HATs of other exemplary embodiments of the same aspect or those of the HAT bicycles or HATs of other exemplary embodiments of different aspects. Variations or modifications of such configurations or operations of such HAT bicycles or their HATs of such exemplary aspects A to F may further be similar or identical to those of such HAT bicycles or their HATs of other exemplary aspects described hereinabove or to be explained hereinafter. In addition, at least a portion of such configurations or operations of such HAT bicycles or their HATs of such exemplary aspects A to F may replace, may be replaced by, may be combined into, or may be used with at least another portion of such HAT bicycles or their HATs of other exemplary aspects described hereinabove or to be explained hereinafter.

In another exemplary aspect H' (i.e., an Aspect H') of this disclosure, a HAT bicycle may include at least one frame and at least one HAT as described hereinabove. The frame may be shaped and sized to couple with at least one front wheel and at least one rear wheel, where the front wheel rotates about its axis of rotation, where the rear wheel rotates about its axis of rotation, and where the frame may also include at least two pedals which may be rotated about its axis of rotation by a user. The HAT may include at least one hydraulic pump, at least one hydraulic motor, and at least one control unit, and may automatically change gear ratios in response to external mechanical load. More particularly, the hydraulic motor may include a driving axis and a driving part, where the motor driving part may pressurize fluid contained in the hydraulic motor to the motor pressure by rotating about an axis of the motor driving part based on the mechanical load, and where the hydraulic motor may discharge the pressurized fluid in an amount of a motor discharging volume. The hydraulic pump may include a driving axis and a driving part, where the pump driving part may pressurize fluid contained in the hydraulic pump up to the pump pressure (which exceeds the motor pressure) by rotating about an axis of the pump driving part with the mechanical energy supplied by a user or with mechanical energy provided by an electrical motor operating on a battery, and may discharge the pressurized fluid to the hydraulic motor in an amount which is a pump discharging volume. The control unit may control the motor pressure, the pump pressure, or the discharging volume discharged from the hydraulic pump or from the hydraulic motor. The hydraulic motor or the hydraulic pump may variably adjust its discharging volume based on at least one of the mechanical load, the motor (or pump) pressure, the mechanical energy, and an rpm of the driving axis of the hydraulic motor. Accordingly, the hydraulic motor may take in the pressurized fluid discharged from the hydraulic pump, and an rpm of the hydraulic motor may become different from an rpm of the hydraulic pump. As a result, the HAT bicycle can automatically change gear ratios.

In another exemplary aspect H" (i.e., an Aspect H") of this disclosure which is a variation of the above aspect H', a HAT bicycle may also include at least one frame and at least one of various HATs as described hereinabove or as will be described hereinafter. The frame may be shaped and sized to couple with at least one front wheel and at least one rear wheel, where the front wheel rotates about its axis of rotation, where the rear wheel rotates about its axis of rotation, where the frame may also include at least two pedals which may be rotated about its axis of rotation in response to the mechanical energy supplied thereto by a user, and where one of the axes of rotation of the front wheel and the rear wheel may correspond to a driving axis of the HAT bicycle. In addition, the HAT may change gear ratios by variably adjusting an rpm of the driving axis of the HAT bicycle in response to the mechanical load, and may include a cover into which at least 50% of a volume of the HAT may be incorporated.

As defined herein, an exemplary aspect H collectively refers to such an Aspect H' as well as such an Aspect H", and various embodiments of such an aspect H are as follows.

In one exemplary embodiment H-1 of this exemplary aspect H, the HAT may include at least one cover, where such a cover may include or encompass therein at least 50% of a volume of the hydraulic pump, at least 50% of a long axis of the hydraulic pump, at least 50% of a volume of the hydraulic motor, or at least 50% of a long axis of the hydraulic motor, thereby protecting the hydraulic pump or the hydraulic motor from external shocks or impacts. In one example, a length of the cover may be less than about 75% of the long axis of the frame. The HAT may include multiple tubes therein, where the cover may include therein at least 50% of a total internal or external volume of such tubes, at least 50% of a total length of such tubes, and the like, thereby protecting such tubes from external impacts or shocks. The cover may also include at least substantial (or entire) portions of the hydraulic pump (or motor), thereby protecting the hydraulic pump (or motor) from external shocks or impacts.

The HAT may include at least one hydraulic pump and at least one hydraulic motor, where the hydraulic motor may define a driving axis and include a motor driving part. The motor driving part may rotate about its driving axis for pressurizing fluid contained therein to the motor pressure, and discharge the fluid therefrom in an amount of the motor discharging volume in response to the mechanical load. The hydraulic pump may define a pump driving axis and include a pump driving part, where the pump driving part may rotate about the pump driving axis in response to the mechanical energy, while pressurizing fluid contained therein to the pump pressure which exceeds the motor pressure, and where the pump driving part may discharge the fluid to the hydraulic motor in an amount of the pump discharging volume. At least one of the hydraulic motor and the hydraulic pump may variably adjust its discharging volume based on at least one of the mechanical load, the motor (or pump) pressure, the mechanical energy, and an rpm of the driving axis of the hydraulic motor. The HAT may then automatically change such gear ratios based upon a difference between an rpm of the hydraulic motor and another rpm of the hydraulic pump which may in turn be determined by the motor discharging volume and the pump discharging volume.

The hydraulic pump may be a vane pump, a gear pump, or a piston pump, while the hydraulic motor may be a vane motor, a gear motor, or a piston motor. The hydraulic pump may also be a variable-volume hydraulic pump, and the hydraulic motor may be one of a fixed-volume hydraulic motor or a variable-volume hydraulic motor. Conversely, the hydraulic pump may be one of a fixed-volume hydraulic pump or a variable-volume hydraulic pump, while the hydraulic motor may be a variable-volume hydraulic motor. The hydraulic pump and the hydraulic motor may be aligned in a direction of a long axis of a frame of the HAT bicycle or may instead be aligned transverse to the long axis of the frame. The HAT may include at least one control unit which control the motor pressure, the pump pressure, or the discharging volume discharged from the hydraulic pump or from the hydraulic motor based on at least one of the mechanical load, the motor (or pump) pressure, the mechanical energy, and an rpm of the driving axis of the hydraulic motor. Therefore, a user may manipulate the control unit to manually control the discharging volume of the hydraulic motor (or pump) or an extent of such automatic gear shifting (or changing).

In one exemplary embodiment H-2 of this exemplary aspect H, a HAT bicycle may configure the driving axis of the hydraulic pump to be the pedal axis, where the HAT bicycle may include at least one chain which mechanically couples the driving axis of the hydraulic motor with the rotation axis of the rear wheel. In another exemplary embodiment H-3 of this exemplary aspect H, a HAT bicycle may configure the driving axis of the hydraulic motor to be the rotation axis of the rear wheel, where the HAT bicycle may include at least one chain which mechanically couples the driving axis of the hydraulic pump with the pedal axis.

In another exemplary embodiment H-4 of this exemplary aspect H, a HAT bicycle may configure its HAT to have a length which may be less than about 50%, 60%, 70%, 80%, 90% or 100% of a length of the frame of the HAT bicycle. In another exemplary embodiment H-5 of this exemplary aspect H, a HAT bicycle may also be configured to have a length which may be less than about 50%, 60%, 70%, 80%, 90% or 100% of a distance from the rotation axis of the front wheel to the rotation axis of the rear wheel.

In another exemplary embodiment H-6 of this exemplary aspect H, the control unit may define at least one (control) set-point, and may variably control the discharging volume discharged from the hydraulic pump (or motor) based on the (control) set-point as well as based on at least one of the mechanical load, the motor (or pump) pressure, and the mechanical energy. The HAT bicycle may also allow a user to adjust the (control) set-point when desirable.

Each of various hydraulic pumps, hydraulic motors or HATs of this exemplary aspect H may be configured to have the weight, the size (e.g., a height, a length, or a width), the internal (or external) volume, the rpm, the driving (or discharging) volume, the internal pressure, or the pressure of the fluid discharged therefrom, each of which may be similar or identical to that of other exemplary aspects as described above or to be explained hereinafter. In addition, various types of such hydraulic pumps or hydraulic motors, inclusion of at least one variable-volume pump (or motor), inclusion of the shift adjustor, or the configuration or operational mechanism of the shift adjustor may be similar or identical to those of other exemplary aspects described above or to be explained below. Various HAT bicycles of this aspect H may also include at least one of such forward clutches or such hydraulic brakes, where such bicycles may operate with the mechanical energy supplied by a user or with mechanical energy supplied by an electrical motor operating on a battery.

In another exemplary aspect I' (i.e., an Aspect I') of this disclosure, a HAT bicycle may include at least one frame and at least one of such HATs. The frame may be shaped and sized to couple with at least one front wheel and at least one rear wheel, where the front wheel may rotate about its rotation axis, where the rear wheel may rotate about its rotation axis, and where the frame may also include at least two pedals which may be rotated about its axis of rotation by a user. The HAT may include at least one hydraulic pump, at least one hydraulic motor, and at least one control unit, and may automatically change gear ratios in response to external mechanical load. More particularly, the hydraulic motor may pressurize fluid contained therein to the motor pressure up to the motor pressure in response to the mechanical load. The hydraulic pump may include a driving part and a driving volume, where the hydraulic pump may operate the driving part with the mechanical energy supplied by a user or with mechanical energy provided by an electrical motor operating on a battery, while pressurizing fluid contained therein to the pump pressure (which exceeds the motor pressure), and where the hydraulic pump may discharge the pressurized fluid to the hydraulic motor in an amount which is a pump driving volume. The control unit may control the driving volume or the discharging volume from the hydraulic pump (or motor), by performing at least one of a linear movement, a curved movement, or a rotational movement with respect to the driving part of the hydraulic pump (or motor) in synchronization with at least one of the mechanical load, the motor (or pump) pressure, and the mechanical energy. Because the hydraulic motor may take in a variable volume of the pressurized fluid discharged from the hydraulic pump, an rpm of the hydraulic motor may become different from an rpm of the hydraulic pump, and the HAT bicycle can automatically change gear ratios.

In another exemplary aspect I" (i.e., an Aspect I") of this disclosure which is a variation of the above aspect I', a HAT bicycle may include at least one frame and at least one of various HATs as described hereinabove or as will be described hereinafter. The frame may be shaped and sized to couple with at least one front wheel and at least one rear wheel, where the front wheel may rotate about its rotation axis, where the rear wheel may rotate about its rotation axis, where the frame may include at least two pedals which may be rotated about its rotation axis based on the mechanical energy supplied thereto by a user. The HAT may include at least one hydraulic pump, at least one hydraulic motor, and at least one control unit, and may also automatically change gear ratios in response to external mechanical load. More particularly, the hydraulic motor may include a motor driving axis and a motor driving part. The motor driving part may pressurize fluid contained therein to the motor pressure in response to the mechanical load by rotating about the motor axis, and may discharge the pressurized fluid in an amount of the motor discharging volume. The hydraulic pump may include a pump driving axis and a pump driving part, where the pump driving part may rotate about the motor driving axis with the mechanical energy supplied by a user, while pressurizing fluid contained therein to the pump pressure (which exceeds the motor pressure), and may discharge the pressurized fluid to the hydraulic motor in an amount which is a pump driving volume. The control unit may control the motor pressure, the pump pressure, or the discharging volume discharged from the hydraulic pump or from the hydraulic motor. The hydraulic motor or the hydraulic pump may variably adjust its discharging volume based on at least one of the mechanical load, the motor (or pump) pressure, the mechanical energy, and an rpm of the motor driving axis. Accordingly, the hydraulic motor may take in the pressurized fluid discharged from the hydraulic pump, and an rpm of the hydraulic motor may become different from an rpm of the hydraulic pump. As a result, the HAT bicycle can automatically change gear ratios.

As defined herein, an exemplary aspect I collectively refers to such an Aspect I' as well as such an Aspect I", and various embodiments of such an aspect I are as follows. In one example, the HAT may include at least one cover, where such a cover may include or encompass therein at least 50% of a volume of the hydraulic pump, at least 50% of a long axis of the hydraulic pump, at least 50% of a volume of the hydraulic motor, or at least 50% of a long axis of the hydraulic motor, thereby protecting the hydraulic pump or the hydraulic motor from external shocks or impacts. In another example, the HAT may include multiple tubes therein, where the cover may include therein at least 50% of a total internal or external volume of such tubes, at least 50% of a total length of such tubes, and the like, thereby protecting such tubes from external impacts or shocks. In addition, a length of the HAT may be less than about 75% of a length of a frame or about 75% of a distance between the rotation axis of the front wheel and the rotation of the rear wheel. The control unit may define a (control) set-point and may variably control the discharging volume of fluid discharged from the hydraulic pump (or motor) based on at least one of the mechanical load, the motor (or pump) pressure, and the mechanical energy. The HAT bicycle may also allow a user to manually adjust the (control) set-point.

In one exemplary embodiment I-1 of this exemplary aspect I, a HAT may include at least one cover which is similar or identical to that of the exemplary aspect H. In another exemplary embodiment I-2 of this exemplary aspect I, a HAT bicycle may configure the driving axis of the hydraulic pump (i.e., the pump driving axis) to be similar or identical to such an axis of the exemplary aspect H. In another exemplary embodiment I-3 of this exemplary aspect I, a HAT bicycle may configure the driving axis of the hydraulic motor (i.e., the motor driving axis) to be similar or identical to that of the exemplary aspect H. In another exemplary embodiment I-4 of this exemplary aspect I, a HAT bicycle may configure a length of the HAT as a certain percentage of the length of the frame, similar or identical to that of the exemplary embodiment H-4 of the exemplary aspect H. In another exemplary embodiment I-5 of this exemplary aspect I, a HAT bicycle may configure a length of the HAT as a certain percentage of the distance between the driving axis of the front wheel and the driving axis of the rear wheel, similar or identical to that of the embodiment H-5 of the exemplary aspect H.

In another exemplary embodiment I-6 of this exemplary aspect I, a control unit of a HAT bicycle may have a (control) set-point, and may also variably control the discharging volume of the hydraulic pump (or motor) based upon the set-point as well as based upon at least one of the mechanical load, the motor (or pump) pressure, and the mechanical energy. The control unit may allow a user to manually or electrically adjust the (control) set-point.

Each of various hydraulic pumps, hydraulic motors or HATs of this exemplary aspect I may be configured to have the weight, the size (e.g., a height, a length, or a width), the internal (or external) volume, the rpm, the driving (or discharging) volume, the pressure therein, or the pressure of the fluid discharged therefrom, each of which may be similar or identical to that of other exemplary aspects described above or to be explained below. Various types of such hydraulic pumps or hydraulic motors, inclusion of at least one variable-volume pump (or motor), inclusion of the shift adjustor, or the configuration or operational mechanism of such a shift adjustor may be similar or identical to those of other exemplary aspects described above or to be explained below. Various HAT bicycles of this aspect I may also include at least one of such forward clutches, and at least one of such hydraulic brakes, where such bicycles may operate with the mechanical energy supplied by a user or with mechanical energy supplied by an electrical motor operating on a battery.

In another exemplary aspect J (i.e., an Aspect J) of this disclosure, a HAT bicycle may include at least one frame and at least one of various HATs as described hereinabove or as will be described hereinafter. The frame may be shaped and sized to couple with at least one front wheel and at least one rear wheel, where the front wheel may rotate about its rotation axis, and where the rear wheel may rotate about its rotation axis. The HAT bicycle may also be shaped or sized to receive a pedal axis which may receive mechanical energy supplied by a user or may receive mechanical energy supplied by an electrical motor operating on a battery. In addition, the HAT bicycle may define a driving axis which may be one of a rotation axis of the front wheel and another rotation axis of the rear wheel. The HAT may automatically change gear ratios by varying an rpm of its driving axis using the mechanical energy and in response to the external mechanical load. The HAT bicycle may also include at least one cover which may include or encompass therein at least one half of an internal or external volume of the HAT, at least one half of a length of a long axis of the HAT, and the like, or which may have a length which may be less than about 50%, 60%, 70%, 80%, 90%, or 100% of a long axis of a frame of the HAT bicycle.

In one exemplary embodiment J-1 of this exemplary aspect J, a HAT of a HAT bicycle may include at least hydraulic pump and at least one hydraulic motor, where the hydraulic motor may include a driving axis (i.e., a motor driving axis) and a driving part (i.e., a motor driving part). The motor driving part may rotate about the motor driving axis in response the mechanical load, whereby the motor driving part may pressurize fluid contained therein to the motor pressure and discharge the pressurized fluid in a certain amount (i.e., a motor discharging volume). The hydraulic pump may include a driving axis (i.e., a pump driving axis) and a driving part (i.e., a pump driving part). The pump driving part may rotate about the pump driving axis in response to the mechanical energy supplied by a user (or mechanical energy supplied by a motor operating on a battery), whereby such a pump driving part may pressurize fluid contained therein to the pump pressure (which exceeds the motor pressure), and may discharge the pressurized fluid to the hydraulic motor in a certain amount (i.e., a pump discharging volume). In addition, at least one of the hydraulic motor and the hydraulic pump may variably adjust its motor discharging volume or pump discharging volume, respectively, based on at least one of the mechanical load, the motor (or pump) pressure, the mechanical energy, and an rpm of the hydraulic motor. Accordingly, the HAT may automatically change gear ratios by manipulating an rpm of the hydraulic motor and another rpm of the hydraulic pump, where such rpms may be determined by the motor (or pump) discharging volume.

In another exemplary embodiment J-2 of this exemplary aspect J, a HAT of a HAT bicycle may also include at least one control unit which may variably manipulate at least one of the motor (or pump) pressure, the pump discharging volume, and the motor discharging volume, based on at least one of the mechanical load, the pump (or motor) pressure, the mechanical energy, and an rpm of the hydraulic motor.

Each of various hydraulic pumps, hydraulic motors or HATs of this exemplary aspect J may be configured to have the weight, the size (e.g., a height, a length, or a width), the internal (or external) volume, the rpm, the driving (or discharging) volume, the pressure therein, or the pressure of the fluid discharged therefrom, each of which may be similar or identical to that of other exemplary aspects described above or to be explained below. Various types of such hydraulic pumps or hydraulic motors, inclusion of at least one variable-volume pump or motor, inclusion of the shift adjustor, or the configuration or operational mechanism of such a shift adjustor may also be similar or identical to those of other exemplary aspects described hereinabove or to be explained hereinafter. Various HAT bicycles of this aspect J may include at least one of the forward clutches, and at least one of the hydraulic brakes, where such HAT bicycles may operate with the mechanical energy supplied by a user or with mechanical energy supplied by an electrical motor operating on a battery.

In another exemplary aspect K (i.e., an Aspect K) of this disclosure, a HAT of a HAT bicycle may include at least one hydraulic pump, at least hydraulic motor, and at least one control unit, and may automatically change the gear ratios in response to external mechanical load imposed thereonto. The hydraulic motor may pressurize fluid contained therein to the motor pressure in response to the mechanical load. The hydraulic pump may pressurize fluid contained therein to the pump pressure (which exceeds the motor pressure) using the mechanical energy supplied by a user and may discharge such pressurized fluid to the hydraulic motor. More particularly, the hydraulic pump may be configured to have a variable driving volume (La, a pump driving volume) and may discharge a variable volume of the pressurized fluid (i.e., a pump discharging volume) to the hydraulic motor. The control unit may define a (control) set-point which may be adjusted by a user, and may variably manipulate the pump driving volume based on the (control) set-point as well as based on at least one of the mechanical load, the pump (or motor) pressure, and the mechanical energy, thereby also variably manipulating the pump discharging volume. Because the hydraulic motor may take in the pressurized fluid which is discharged from the hydraulic pump in the variable pump discharging volume, an rpm of the hydraulic motor may become different from an rpm of the hydraulic pump and, therefore, a user may variably change the gear ratios (or may select one of multiple variable gear ratios) either directly or indirectly.

In one exemplary embodiment K-1 of this exemplary aspect K, a hydraulic pump may be one of a variable-volume vane pump, a variable-volume gear pump, or a variable-volume piston pump. In another exemplary embodiment K-2 of this exemplary aspect K, a hydraulic motor may be one of a variable-volume hydraulic motor, and a fixed-volume hydraulic motor.

Each of various hydraulic pumps, hydraulic motors or HATs of this exemplary aspect K may be configured to have the weight, the size (e.g., a height, a length, or a width), the internal (or external) volume, the rpm, the driving (or discharging) volume, the pressure therein, or the pressure of the fluid discharged therefrom, each of which may be similar or identical to that of other exemplary aspects described above or to be explained below. Various types of such hydraulic pumps or hydraulic motors, inclusion of at least one variable-volume pump (or motor), inclusion of the shift adjustor, or the configuration or operational mechanism of such a shift adjustor may be similar or identical to those of other exemplary aspects described above or to be explained below. Various HAT bicycles of this aspect K may also include at least one of such forward clutches, and at least one of such hydraulic brakes, where such bicycles may operate with the mechanical energy supplied by a user or with mechanical energy supplied by an electrical motor operating on a battery or a generator.

Other configurational or operational characteristics of various embodiments of the HAT bicycles or the HATs of each exemplary aspect H to K may be similar or identical to those corresponding embodiments of others of the aspects H to K, or may be similar or identical to other embodiments of other aspects described above or to be explained below. In addition, variations or modifications of various embodiments of the HAT bicycles or their HATs of the exemplary aspects H to K may be similar or identical to those variations or modifications of other aspects described above or to be explained below. At least a portion of such configurations or operations of such HAT bicycles or their HATs of the exemplary aspects H to K may also replace, may be replaced by, may be combined into, or may be used with at least another portion of such HAT bicycles or their HATs of other exemplary aspects described above or to be explained below.

In another exemplary aspect P (i.e., an Aspect P) for various HAT bicycles of this disclosure, a method may provide various benefits to a user and may include the steps of: determining a pump pressure of fluid to be discharged out of a hydraulic pump unit (or its hydraulic pump) based on mechanical load exerted from an external source such as a road condition (e.g., a pressure determination step); driving the hydraulic pump unit (or its pump) at a pump rpm and pressurizing the fluid contained therein to the pump pressure (e.g., a pressurizing step); automatically varying a driving volume of the hydraulic pump according to discharging pressure from the hydraulic pump and delivering a variable discharging volume to the hydraulic motor (e.g., a discharging controlling step); changing gear ratios by generating power and driving the hydraulic motor with the power at a motor rpm determined by the discharging volume of the hydraulic pump (e.g., a step of changing gear ratios); and allowing a user to select one of a first control set-point for an extent of such changing gear ratios and a second control set-point for a response time for such changing a gear ratio in response to changes in such mechanical load (e.g., a user control step).

Various exemplary embodiments of various methods exemplified in the Aspect P may include the following. The pressurizing step may include the step of increasing the discharging pressure from the hydraulic pump in proportion to an increase in the mechanical load. The discharging controlling step may include the step of controlling the discharging pressure from the hydraulic pump inversely proportional to the driving volume of the hydraulic pump. The discharging controlling step may also include the step of including at least one of a variable-volume vane pump, a variable-volume gear pump, and a variable-volume piston pump as such a hydraulic pump. The step of changing gear ratios may include the step of including at least one of a variable-volume hydraulic motor and a fixed-volume hydraulic motor as the hydraulic motor.

The step of changing gear ratios may include one of the steps of: automatically determining an rpm of the hydraulic motor based on such discharging volume of the discharging volume of the hydraulic pump; and automatically determining an rpm of the hydraulic motor according to one of the discharging volume of the hydraulic pump and such mechanical load. In addition, the method may include the step of incorporating at least 50% of the hydraulic pump and at least 50% of the hydraulic motor inside a cover of the HAT (e.g., a consolidating step). More particularly, the method may include a first aligning step of aligning the hydraulic pump and the hydraulic motor along their long axes and then hydraulically coupling each other, or may include a second aligning step of aligning the hydraulic pump and the hydraulic motor in a direction which is transverse to their long axes and then hydraulically coupling each other. The user control step may include the step of controlling at least one of the first control set-point and the second control set-point while a user operates the hydraulic pump.

In another exemplary aspect Q (i.e., an Aspect Q) for various HAT bicycles of this disclosure, a method may protect a HAT bicycle or its HAT from external shock (or impact) and may include the steps of: pressurizing fluid contained in a hydraulic pump, by driving a hydraulic pump according to mechanical load exerted by an external source (e.g., a road condition) and then delivering a variable volume of the pressurized fluid to a hydraulic motor while controlling a driving volume of the hydraulic pump according to the pressure of the fluid discharged from the hydraulic pump (e.g., a step of pump discharging control); generating mechanical energy by driving the hydraulic motor at a motor rpm with the pressurized fluid delivered from the hydraulic pump and changing gear ratios determined by the rpm of the hydraulic motor and that of the hydraulic pump (e.g., a step of controlling gear ratios); and protecting the hydraulic pump and the hydraulic motor from an external impact or shock by incorporating at least 50% of a volume of each of the hydraulic pump and the hydraulic motor inside a cover of the HAT bicycle (e.g., a protecting step).

Various exemplary embodiments of various methods exemplified in the Aspect Q may include the following. The step of pump discharging control may include one of the steps of: increasing the pressure of the fluid which is discharged from the hydraulic pump as the mechanical load increases; and controlling the pressure of the fluid discharged by the hydraulic pump inversely proportional to a driving volume of hydraulic pump. The step of pump discharging control may also include the step of configuring the hydraulic pump as one of a variable-volume vane pump, a variable-volume gear pump, and variable-volume piston pump, while the step of controlling gear ratios may include the step of configuring the hydraulic motor as one of a variable-volume hydraulic motor and a fixed-volume hydraulic motor.

In addition, the step of controlling gear ratios may include one of the steps of: automatically determining an rpm of the hydraulic motor based on the discharging volume of the fluid discharged from the hydraulic pump; and determining a variable rpm of the hydraulic motor based on the discharging volume or the mechanical load. The method may include one of third aligning steps of: aligning the hydraulic pump and the hydraulic motor along a common long axis one after another and hydraulically coupling each other; and aligning the hydraulic pump and the hydraulic motor in a direction transverse to their long axes and hydraulically coupling each other. The method may also include a user control step of allowing a user to select one of a first control set-point for an extent of such changing gear ratios and a second control set-point for a response time for such changing a gear ratio in response to changes in such mechanical load.

Other operational details of such exemplary embodiments of the exemplary aspect P and exemplary aspect Q may be similar or identical to their corresponding exemplary embodiments, or to those of other related exemplary embodiments (including their modifications or their variations) of other aspects of this disclosure provided hereinabove or to be provided hereinafter. In addition, at least a portion of such configurations or operations of such HAT bicycles or their HATs of the exemplary aspects P and Q may also replace, may be replaced by, may be combined into, or may be used with at least another portion of such HAT bicycles or their HATs of other exemplary aspects described above or to be explained below.

In another exemplary aspect R (i.e., an Aspect R) for various HAT bicycles of this disclosure, a method may provide a HAT bicycle which may allow a user with hydraulic and infinitely variable gear ratios. The method may include the steps of: synchronizing mechanical load from an external source with a hydraulic motor so as to pressurize fluid contained in the hydraulic motor to a motor pressure (e.g., a load synchronizing step); synchronizing energy mechanically supplied by a user or mechanical by an electrical motor operating on a battery with a hydraulic pup in order to pressurize fluid contained in the hydraulic pump to a pump pressure which exceeds the pump pressure (e.g., a pressure synchronizing step); discharging the pressurized fluid from the hydraulic pump to the hydraulic motor in an amount of a pump discharging volume (e.g., a pump discharging step); and taking in the pressurized fluid discharged from the hydraulic pump by the hydraulic motor and then rotating a motor driving axis of the hydraulic motor while discharging the pressurized fluid from the hydraulic motor in an amount of a motor discharging volume (e.g., a driving step). The method may include at least one of the steps of: manipulating at least one of the mechanical load, the motor pressure, the pump pressure, and the mechanical energy (e.g., a user manipulating step); variably manipulating at least one of a first driving volume of the hydraulic motor (i.e., a motor driving volume) and a second driving volume of the hydraulic pump (i.e., a pump driving volume) by performing of at least one of the load synchronizing and the pressure synchronizing as a result of the user manipulating step (e.g., a delivery synchronizing step); discharging the pressurized fluid in a variable volume which may be one of the motor discharging volume and the pump discharging volume due to at least one of the variable motor driving volume and the variable pump driving volume (e.g., a variable discharging step); and changing at least one of the motor discharging volume and the pump discharging volume as a result of the variable discharging step, thereby automatically changing the gear ratios (e.g., a gear changing step).

Various exemplary embodiments of various methods exemplified in the Aspect R may include the following. The method may include the step of enclosing at least a portion of the hydraulic pump and the hydraulic motor inside a cover of the HAT bicycle for protecting such a portion from external shocks or impacts (e.g., a protecting step). The protecting step may also include at least one of the steps of: configuring said portion to be at least 50% (or 60%, 70%, 80%, 90% or more) of a volume of at least one of the hydraulic pump and the hydraulic motor; and enclosing at least 50% (or 60%, 70%, 80%, 90% or more) of a sum of lengths of fluid tubes inside the cover. The protection may instead include at least one of the steps of: configuring the cover to have a length which may be less than about 70% (or 60%, 50%, 40%, 30% or less) of a length of the HAT bicycle; and configuring the length of the cover to be less than about 70% (or 60%, 50%, 40%, 30% or less) of a distance between a rotation axis of a front wheel and a rotation axis of a rear wheel.

Another method of using a HAT bicycle may include at least one of the steps of: providing the driving axis of the hydraulic motor as a pedal axis of the HAT bicycle, providing the driving axis as a rotation axis of a front wheel of the bicycle; providing the driving axis as a rotation axis of a rear wheel of the bicycle; coupling the driving axis with at least one of the pedal axis, the rotation axis of the front wheel, and the rotation axis of the rear wheel with a chain; and coupling the driving axis with at least one of the pedal axis, the rotation axis of the front wheel, and the rotation axis of the rear wheel with at least one gear.

Another method of using a HAT bicycle may include at least one of the steps of: constructing the hydraulic motor or the hydraulic pump to have a weight less than a preset value for increasing a driving efficiency (e.g., a light-weighting step); constructing the hydraulic motor or the hydraulic pump to have a size (e.g., a length, a height, or a width), a thickness, or an internal or external volume to be less than a preset value to increase a driving efficiency (e.g., a miniaturization step); manipulating each of the hydraulic motor or the hydraulic pump to rotate in a certain range of rpm for discharging the pressurized fluid in a certain discharging volume (e.g., a step of restricting rpm ranges); configuring the hydraulic motor or the hydraulic pump to pressurize fluid under a preset value for increasing a driving efficiency (e.g., a step of driving in low pressure ranges), and the like. The above method may include the step of slowing down or stopping the bicycle by blocking the fluid flow (e.g., a hydraulically braking step).

As defined herein, a "hydraulic pump" means a pump which uses mechanical energy supplied by a user to pressurize fluid contained therein, to increase such fluid pressure, and to discharge the pressurized fluid out of the hydraulic pump in a flow of such fluid. Examples of such hydraulic pumps may include, e.g., a vane pump, a gear pump, a piston pump), a screw pump, and the like. In one example, the vane pump includes multiple vanes which are incorporated into a rotor, where the rotor rotates along with a driving axis of the vane pump and where the vanes compress and pressurize such fluid while rotating. In another example, a gear pump includes multiple gears which rotate about multiple driving axes and which pressurize the fluid placed in multiple gaps defined between such gears. In another example, a screw pump includes a single or multiple screws which rotate about a single or multiple driving axes and which pressurize the fluid placed in their threaded grooves. In another example, a piston pump includes a single or multiple cylinders containing the fluid and pressurizes the fluid by a single or multiple pistons which reciprocate along the cylinders. More particularly, the piston pump may be a rotary piston pump or a reciprocating piston pump, where the former pressurizes fluid contained in a horizontal or vertical cylinder with a piston reciprocating in a direction of a driving axis of the piston, whereas the latter converts a rotating movement of a driving axis of a piston into a reciprocating movement and pressurizes fluid contained in a cylinder with a piston. In addition, such a piston pump may also include an axial piston pump and a radial piston pump, where a piston moves in a direction parallel with a driving axis in the former, whereas a piston moves in a direction vertical to a driving axis in the latter.

In addition and as further defined herein, a "hydraulic pump" may include a "fixed-volume hydraulic pump" and a "variable-volume hydraulic pump" such that a volume of fluid discharged per a revolution of a driving axis of the hydraulic pump (i.e., a "discharging volume") is constant in the fixed-volume hydraulic pump but is varying in the variable-volume hydraulic pump. Therefore, a variable-volume hydraulic pump may include a prior art variable-volume [1] vane pump, [2] gear pump, or [3] piston pump, while a fixed-volume hydraulic pump may include a prior art fixed-volume [1] vane pump, [2] gear pump, [3] piston pump, or [4] screw pump. In addition, a lobe pump, a scroll pump, a progressive cavity pump, a diaphragm pump, or a peristaltic pump may be used as the fixed-volume hydraulic pump, while a lobe pump, a scroll pump, a progressive cavity pump, a diaphragm pump, or a peristaltic pump may be constructed to have a variable discharging volume and, therefore, used as a variable-volume hydraulic pump.

As defined herein, a "hydraulic motor" includes a pump which is of the same type as the above "hydraulic pump," which operates in the same way as the "hydraulic pump," but which functions in an opposite way to the "hydraulic pump." That is, in contrary to the hydraulic pump which converts the mechanical energy into the fluid pressure, the hydraulic motor generates the mechanical energy by converting the fluid pressure into a fluid flow. In this aspect, the hydraulic motor may be classified based on the types of pressurization such as, e.g., a vane motor, a gear motor, a piston motor, or a screw motor. In addition, the hydraulic motor may include a "fixed-volume hydraulic pump" having a constant discharging volume and a "variable-volume hydraulic pump" having a variable discharging volume. Therefore, the variable-volume hydraulic motor may include a variable-volume [1] vane motor, [2] gear motor, or [3] piston motor, while a fixed-volume hydraulic motor may instead include a fixed-volume [1] vane motor, [2] gear motor, [3] piston motor, or [4] screw motor. As is the case with the above, a hydraulic pump, a lobe motor, a scroll motor, a progressive cavity motor, a diaphragm motor, or a peristaltic motor may be used as the fixed-volume hydraulic motor, while a lobe motor, a scroll motor, a progressive cavity motor, a diaphragm motor, or a peristaltic motor may be constructed to have a variable discharging volume and, therefore, used as a variable-volume hydraulic motor.

A "hydraulic pump (or motor)" of this disclosure generally refers to a "positive displacement pump (or motor)." In other words, such a hydraulic pump (or motor) displaces a constant volume of fluid per one revolution of its driving axis, regardless of a magnitude or a change in the mechanical load.

It is noted, however, that such a "hydraulic pump (or motor)" may include not only the positive displacement pump (or motor) but also a "variable-volume pump (or motor)" which refers to a pump (or motor) which can displaces a varying volume of fluid per revolution of its driving axis according to a change in the mechanical load. More particularly, when a HAT bicycle includes a HAT which in turn includes at least one variable-volume hydraulic pump, the HAT may also include at least one positive displacement hydraulic motor or at least one variable-volume hydraulic motor.

Various variable-volume vane pumps (or vane motors) may be constructed or operated as exemplified in various prior art documents such as, e.g., U.S. Pat. Nos. 3,824,045, 4,421,462, and 4,316,706, Korean Pat. Nos. 10-1382073, 10-1177595, and 10-1235988, and the like.

Various variable-volume gear pumps (or gear motors) may be constructed or operated as exemplified in various prior art documents such as, e.g., U.S. Pat. No. 3,847,515 and Korean Pat. No. 10-1449224, while variable-volume piston pumps (or piston motors) may be constructed or operated as exemplified in prior art documents such as, e.g., Korean Pat. No. 10-0429928, Korean Utility Model 20-0467725, and the like.

As used herein, a "frame of a bicycle" or simply a "frame" refers to a backbone of a bicycle, except a handle, a seat, a pedal, a chain gear, a mechanical or hydraulic brake, a front wheel, a rear wheel, and the like.

As used herein, a "mechanical load" refers to a load which is exerted onto a HAT bicycle of this disclosure and which is generally determined by a feature of a road on which a user rides a HAT bicycle, or a slope of such a road and which is also determined by mechanical energy applied by a user or by an electrical motor operating on an electrical battery. Therefore, when other things being equal, the mechanical load increases as a user rides a HAT bicycle uphill than riding a downhill, as a user provides more mechanical energy to a HAT bicycle, and the like. In addition, the "mechanical load" may also be affected by an acceleration of a HAT bicycle. Accordingly, when other things being equal, the mechanical load increases as a user rides a HAT bicycle while increasing its speed (i.e., accelerating) than while decreasing its speed (i.e., decreasing). The "mechanical load" may further be affected by a weight of a user, a cargo loaded on a HAT bicycle or by a total weight of everything loaded on or attached to a frame of the HAT bicycle. Accordingly, when other things being equal, the "mechanical load" increases when a weight of such things attached to a HAT bicycle increases than decreases/In other words, the "mechanical load" may be viewed as mechanical energy which is required to move a HAT bicycle along with a user and along with optional cargos at a desired speed.

It is appreciated throughout this disclosure that a term "consist of" has two different meanings. When the term is used in a claim, it corresponds to a transition phrase for a closed terminology. When the term is used in other parts of this disclosure, the term corresponds to "include" or "to make" such that the term does not mean the closed terminology. In other words, the term "consist of" used in the disclosure except in the claim does not mean the closed terminology.

DETAILED DESCRIPTION

Various "hydraulic automatic transmission bicycles" (to be abbreviated as "HAT bicycles" hereinafter) of this disclosure include various "hydraulic automatic transmission" (to be referred to as "HAT" hereinafter) which may be provided in various configurations and which may operate in various mechanisms and sequences. Therefore, this disclosure provides various exemplary aspects and their embodiments of such HAT bicycles, their HATs, and various units and parts thereof. This disclosure also provides various exemplary aspects and their embodiments of various methods of constructing, operating, and using such HAT bicycles and their HATs.

It is appreciated, however, that the foregoing and the following exemplary aspects and their embodiments of various configurations and methods of such HAT bicycles and their HATs are only exemplary. Accordingly, various HAT bicycles and their HATs of this disclosure may include not only those described throughout this disclosure, but also their modifications or variations which are within the knowledge of one of ordinary skill in the relevant art.

In the first exemplary aspect (i.e., an Aspect 1) of this disclosure, a HAT of a HAT bicycle may synchronize external mechanical load which is exerted on a driving wheel (e.g., a rear wheel) of the HAT bicycle while riding the bicycle with pressurizing fluid of a variable volume, and with driving a driving axis of the bicycle utilizing the pressurized fluid of the variable volume (i.e., a "load synchronizing"), thereby automatically changing gear ratios. Accordingly, when the HAT of this Aspect 1 is implemented into a HAT bicycle, the HAT bicycle can automatically change a gear ratio (e.g., lowering the ratio from 3.2 to 0.7) when a user rides uphill, thereby allowing a user to climb uphill at a slower speed but with stronger force, when a user provides a certain amount of mechanical energy to the HAT bicycle. Conversely, the HAT bicycle can automatically change a gear ratio (e.g., increasing the ratio from 1.2 to 5.9) when a user rides a downhill, thereby allowing a user to come down the hill at a faster speed but with weaker force, when a user provides a certain amount of mechanical energy to the HAT bicycle.

Figure 1A:
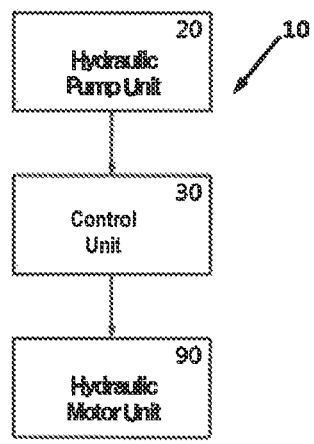
FIG. 1A is a block diagram of a hydraulic automatic transmission bicycle (HAT bicycle) of a first exemplary aspect.

FIG. 1A is a block diagram of a hydraulic automatic transmission bicycle (HAT bicycle) of the Aspect 1 of this disclosure, where the HAT (10) may include at least one hydraulic pump unit (20), at least one hydraulic motor unit (90), at least one control unit (30), and the like. The hydraulic pump unit (20) may receive a first mechanical energy supplied by a user and/or a second mechanical energy supplied by an electrical motor which operates on a battery or which operates on an electrical generator manipulated by a user, where both of the first mechanical energy and/or the second mechanical energies will be collectively referred to as the "mechanical energy" hereinafter. The hydraulic pump unit (20) may then pressurize fluid contained therein.

Thus, the hydraulic pump unit (20) may be viewed to convert the mechanical energy into the pressurized fluid or into the flow of the pressurized fluid. To this end, the hydraulic pump unit (20) may recruit a vane pump, a gear pump, a piston pump, a screw pump, or any other prior art pump which may pressurize fluid contained therein. For example, a vane pump may include multiple vanes which are incorporated into a rotor, and may pressurize the fluid contained therein while rotating the rotor about a driving axis of the vane pump. In another example, a gear pump may include multiple rotating screws which are aligned with each other at a preset angle (e.g., parallel with each other or at a small angle), and may pressurize such fluid contained between such gears while rotating multiple screws along their rotation axes. In another example, a piston pump may include at least one piston coupling with a driving axis of the pump and pressurize fluid contained in a cylinder by reciprocating such a piston inside the cylinder. In another example, a screw pump may also include multiple male screws and pressurize fluid contained between the screws by rotating the screws about their rotation axes.

The HAT (10) exemplified in FIG. 1A may configure its hydraulic pump unit (20) to automatically discharge the pressurized fluid of a variable volume (e.g., a variable "motor discharging volume") to the hydraulic motor unit (90), thereby automatically changing gear ratios. Therefore, when the hydraulic pump unit (20) includes at least one variable-volume hydraulic pump, the hydraulic pump may define a variable driving volume (i.e., a variable "pump driving volume") and, accordingly, may vary (or adjust) a volume of the pressurized fluid discharged out of the hydraulic pump (i.e., a variable "pump discharging volume") per rotation (or revolution) of its driving axis (i.e., a "pump driving axis"). Examples of such variable-volume hydraulic pump may include various prior art pumps such as a variable-volume vane pump, a variable-volume gear pump, a variable-volume piston pump, a variable-volume screw pump, and the like. The hydraulic motor unit (90) may take in (or receive) the pressurized fluid which is discharged out of the hydraulic pump unit (20), and may generate (mechanical) power. To this end, the hydraulic motor unit (90) may include, e.g., at least one variable-volume motor or at least one fixed-volume hydraulic motor, or at least one of both motors. When the hydraulic pump unit (20) includes at least one fixed-volume hydraulic pump, hydraulic motor unit (90) may preferably include at least one variable-volume hydraulic motor unit.

The control unit (30) of FIG. 1A may configure the hydraulic pump unit (20) to pressurize fluid contained therein to a certain pressure (i.e., the "pump pressure") in synchronization with mechanical load exerted by an external source (e.g., a road condition) onto a driving wheel (e.g., a rear wheel) of the HAT bicycle (to be referred to as "load synchronizing" or "load synchronization" hereinafter) or in synchronization with pressure of fluid contained in the hydraulic motor unit (90) (to be referred to as "pressure synchronizing" or "pressure synchronization" hereinafter), where the fluid pressure in the hydraulic motor unit (90) may also be affected by such mechanical load. Through the pressure synchronizing and/or the load synchronizing, the control unit (30) may then configure the hydraulic pump unit (20) to automatically discharge the pressurized fluid in a variable pump discharging volume or in a variable flow rate to the hydraulic motor unit (90). The hydraulic pump unit (20) may pressurize the fluid contained therein utilizing the first mechanical energy supplied by a user (e.g., onto a pedal of the HAT bicycle) and/or the second mechanical energy provided by an electrical motor which operates on an electrical battery or on an electrical generator which is operated by a user either directly or indirectly. Accordingly, when the hydraulic motor unit (90) includes a fixed-volume hydraulic motor, the hydraulic motor unit (90) may drive the HAT bicycle according to an amount of fluid discharged from the hydraulic motor unit (90) (i.e., a "motor discharging volume"). In contrary, when the hydraulic pump unit (20) includes a variable-volume hydraulic motor, the hydraulic motor unit (90) may drive the HAT bicycle based on the motor discharging volume as well as based on the pressure of such fluid. It is appreciated that the hydraulic motor unit (90) may pressurize the fluid up to a certain pressure (i.e., a "motor pressure"), where the pump pressure exceeds the motor pressure for discharging the pressurized fluid in the pump discharging volume to the hydraulic motor unit (90).

Further details in providing the automatic and infinitely variable gear ratios through the load synchronizing or the pressure synchronizing of the hydraulic pump unit (20) or the hydraulic motor unit (90) may be as follows. Various mechanical load may exert on a driving wheel of a HAT bicycle (e.g., its rear wheel) while a user is riding the bicycle such that the mechanical load may include a static load such as, e.g., a weight of the HAT bicycle, a weight of a user, or a road condition (e.g., a slope of a road, a roughness of the road, and the like), along with a dynamic load such as, e.g., a speed of the HAT bicycle, an acceleration thereof, a curvature of the road, and the like. Accordingly, when a user rides the HAT bicycle uphill, more mechanical load may be exerted on the driving wheel of the HAT bicycle, and then exerted on the hydraulic motor unit (90) which drives the driving wheel of the HAT bicycle. The mechanical load transmitted to the hydraulic pump unit (20) may pressurize (or begins to pressurize) fluid contained in such a motor unit (90) as well as fluid which is disposed in an upstream or in a downstream of the hydraulic motor unit (90).

The hydraulic pump unit (20) is in the pressure synchronizing with the hydraulic motor unit (90) through the fluid (or the pressure of fluid) and, accordingly, a variable-volume hydraulic pump of the hydraulic pump unit (20) is also exerted by the mechanical load through the fluid pressure of a upstream or a downstream of the hydraulic motor unit (90) or its hydraulic motor. Accordingly, the hydraulic pump unit (20) has to pressurize the fluid to a higher pressure in order to drive the hydraulic motor unit (90) and, to this end, hydraulic pump unit (20) may decrease a driving volume of the variable-volume hydraulic pump and may also decrease the pump discharging volume of the fluid to be discharged to the hydraulic motor unit (90). With the decreasing pump discharging volume, the hydraulic pump may rotate its driving axis more (i.e., an increased rpm) with a certain amount of the first and/or second mechanical energy. At the same time, the hydraulic motor unit (90) may take in the decreased discharging volume of fluid from the hydraulic pump unit (20) and, therefore, may rotate its driving axis less (i.e., a decreased rpm). As a result, the HAT bicycle and its HAT may automatically change its gear ratios due to the increased rpm of the driving axis of the hydraulic pump unit (20) as well as to the decreased rpm of the driving axis of the hydraulic motor unit (90).

It is appreciated that the very unique feature of the HAT (10) of the HAT bicycle is its "infinitely variable gear ratios" and resulting "infinite automatic transmission." In other words, when the hydraulic pump unit (20) may include a variable-volume hydraulic pump but when the hydraulic motor unit (90) may include a fixed-volume hydraulic motor, the HAT (10) may provide the infinite gear ratios which is automatically determined through such load synchronizing with the mechanical load which is exerted on the driving wheel (e.g., a rear wheel) of the HAT bicycle while a user is riding the HAT bicycle. This is because the mechanical load determines the fluid pressure required to drive the driving axis of the HAT bicycle, because the fluid pressure determines pressure of fluid contained in the hydraulic motor unit (90) (i.e., a "motor pressure") as well as a volume of the pressurized fluid to be discharged from the hydraulic motor unit (90) (i.e., a "motor discharging volume"), and because these motor pressure and the motor discharging volume automatically determine the pressure of fluid contained in the hydraulic pump unit (20) (i.e., a "pump pressure") and a volume of the pressurized fluid to be discharged from the hydraulic pump unit (20) (i.e., a "pump discharging volume") to the hydraulic motor unit (90). Accordingly, the HAT (10) operating under the above mechanism can perform the infinite automatic transmission while providing a user with infinitely variable gear ratios.

Figure 1B:
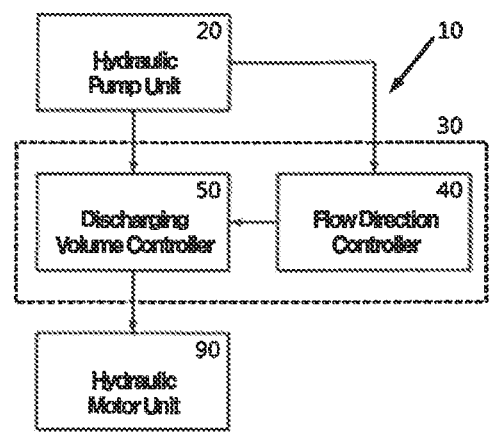
FIG. 1B is a block diagram of a first embodiment of the HAT bicycle of the first exemplary aspect.

A HAT (10) of a HAT bicycle according to the first exemplary aspect (i.e., Aspect 1) as illustrated in FIG. 1A may be constructed and operated in various embodiments. One exemplary embodiment 1-1 of this Aspect 1 is depicted in FIG. 1B, where a control unit (30) of the HAT (10) may include at least one flow direction controller (40) and at least one discharging volume controller (50). It is appreciated that various fluid tubes connecting various units and parts of the HAT (10) are omitted for simplicity of illustration.

As described above, a hydraulic pump of the hydraulic pump unit (20) may be pressure synchronizing with the fluid pressure in the hydraulic motor unit (90) and, therefore, may pressurize the fluid contained therein according to the pressure synchronizing using the first and/or second mechanical energy. The flow direction controller (40) of the controller unit (30) may be configured to direct the pressurized fluid to flow in a certain tube of a network of multiple tubes based upon such pressure synchronizing. For example, the flow direction controller (40) may be incorporated in an outlet of the hydraulic pump unit (20) and may be configured to deliver such mechanical load (or its changes) or the fluid pressure in the hydraulic motor unit (90) (or its changes) to the discharging volume controller (50) through a certain fluid tube. The flow direction controller (40) may instead be configured to deliver such mechanical load (or its changes) or the fluid pressure in the hydraulic motor unit (90) (or its changes) to the discharging volume controller (50), only when the load (or its changes) or the pressure (or its changes) may exceed a certain threshold.

The discharging volume controller (50) may also control the pump discharging volume (discharged from the hydraulic pump unit), the motor discharging volume (discharged from the hydraulic motor unit), or a volume of the pressurized fluid taken in by the hydraulic motor unit (90) (i.e., a "motor intake volume") based on the mechanical load (or its changes) or the fluid pressure in the hydraulic pump (or motor) unit (20), (90). When the hydraulic pump unit (20) may include a vane pump, the discharging volume controller (50) may increase or decrease (i.e., manipulate or control) a distance between a driving axis of the vane pump and a center of an outer cam ring, thereby variably controlling a driving volume of the vane pump, the pump discharging volume, or the intake (or discharging) volume of the hydraulic motor unit (90). When the hydraulic pump unit (20) may instead include a gear pump, the discharging volume controller (50) may increase or decrease or increase gaps between the gears rotating (or revolving) about their driving axes, thereby variably controlling a driving volume of the gear pump, the pump discharging volume, or the intake (or discharging) volume of the hydraulic motor unit (90). When the hydraulic pump unit (20) may include a piston pump, the discharging volume controller (50) may increase or decrease a distance of travel of a piston, thereby variably controlling a driving volume of the piston pump, the pump discharging volume, or the intake (or discharging) volume of the hydraulic motor unit (90). When the hydraulic pump unit (20) may include a screw pump, the discharging volume controller (50) may increase or decrease gaps formed between the screw grooves, thereby variably controlling a driving volume of such a pump, the pump discharging volume, or the intake (or discharging) volume of the hydraulic motor unit (90). Therefore, the HAT (10) according to the exemplary embodiment 1-1 of the Aspect I may synchronize the driving wheel (e.g., a rear wheel) of the HAT bicycle with the mechanical load exerted thereonto through the load synchronizing, and may automatically and variably manipulate the pump discharging volume or the motor intake (or discharging) volume through the pressure synchronizing, thereby providing a user with the infinite variable gear ratios and enabling a user to enjoy such automatic transmission (i.e., automatic gear changing) while a user is riding the bicycle.

Figure 1C:
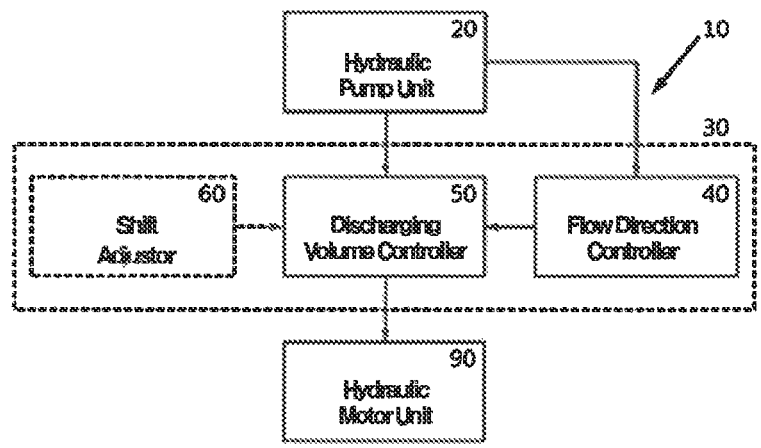
FIG. 1C is a block diagram of a second embodiment of the HAT bicycle of the first exemplary aspect.

Another exemplary embodiment 1-2 of this Aspect 1 of FIG. 1A is depicted in FIG. 1C, where a control unit (30) of the HAT (10) may include at least one flow direction controller (40), at least one discharging volume controller (50), and at least one shift adjustor (60), along with various fluid tubes connecting various units and parts of the HAT (10), where such tubes are omitted for simplicity of illustration herein. The shift adjustor (60) may be configured to easily manipulate a certain value of the mechanical load (or its changes) in which the HAT (10) changes a gear ratio or to easily manipulate another certain value of the fluid pressure (or its changes) in which the HAT (10) changes the gear ratio. To this end, the shift adjustor (60) may be configured to manipulate such values or volumes either mechanically or electrically. In addition, the shift adjustor (60) may also be configured to allow a user to easily perform mechanical or electrical manipulation of the driving volume of the hydraulic pump unit (20), the discharging volume of the hydraulic pump unit (20), or its gear ratios for such automatic transmission.

When a HAT does not include any shift adjustor (60), a certain value of the mechanical load (or another value of the fluid pressure) in which the HAT changes a gear ratio is rather fixed, while the pump discharging volume of the hydraulic pump unit (20) is also fixed according to the mechanical load. Therefore, such fixed value may be too mild for an athletic user but may be too physically demanding for an elderly user. But when the HAT (10) may include at least one shift adjustor (60), a user may manually or electrically control a certain value of the mechanical load (or its changes) or the fluid pressure (or its changes) in which the HAT (10) may change gear ratios based on his or her physical condition or circumstances. Such a user may further control the driving volume of the hydraulic pump unit (20), its discharging volume, or gear ratios based on the mechanical load imposed on the driving wheel (e.g., a rear wheel or a front wheel) based on the physical condition or circumstances. Accordingly, a young athlete may control such values that he or she can enjoy intense riding, whereas a senior user may control such values to comfortably ride the HAT bicycle, without having to hard-press pedals of the bicycle.

The first example of the embodiment 1-2 is a shift adjustor (60) which can manipulate the fluid pressure, where the shift adjustor (60) may be a prior art hydraulic valve or any prior art tube capable of decreasing fluid pressure flowing therein. The shift adjustor (60) may be incorporated into various locations such as, e.g., at a downstream of a hydraulic pump of the hydraulic pump unit (20), in a tube connecting the hydraulic pump and the flow direction controller (50), in a tube disposed between the hydraulic pump and the discharging volume controller (50), in a tube between a flow direction controller (40) and the discharging volume controller (50), in a upstream or a downstream of the flow direction controller (40), in a upstream of the discharging volume controller (50), or in any other locations capable of affecting the pressure of the fluid in a upstream or a downstream of the flow direction controller (40) or the discharging volume controller (50). As a result, the fluid flowing through the shift adjustor (60) may lose its energy and the pressure of such fluid may decrease depending on, e.g., an area or a volume available for such fluid to flow through the adjustor (60), its length, its cross-sectional area or shape, and the like, whereby a user may increase or decrease the value of the mechanical load or the fluid pressure for such automatic transmission.

The second example of the embodiment 1-2 is a shift adjustor (60) which may also increase or decrease an extent of controlling a flow direction by the flow direction controller (40), e.g., in response to the mechanical load (or its changes) exerted onto the driving wheel of the HAT bicycle or in response to the fluid pressure (or its changes). An exemplary shift adjustor (60) may insert a mechanical spring to the flow direction controller (40) and may configure the spring to respond to such fluid pressure (or its changes) by compression force or extension force of the spring, where the flow direction controller (40) may direct the fluid to flow in a certain tube(s) in response to the mechanical load, fluid pressure, or their changes, and may automatically deliver such to the discharging volume controller (50). When a user extends or compresses the spring and changes its length, such a spring may exert the compression or extension force of different magnitudes due to changes in its length, whereby the shift adjustor (60) may increase or decrease the value of the mechanical load or the value of the fluid pressure at which the HAT (10) changes the gear ratios. Such a shift adjustor (60) may be incorporated into various locations such as, e.g., inside the flow direction controller (40), in one end of the flow direction controller (40), between the flow direction controller (40) and the discharging volume controller (50), in any other locations for affecting the flow direction, or in any other locations capable of affecting the extent of controlling the flow direction.

The third example of the embodiment 1-2 is a shift adjustor (60) which may also increase or decrease an extent of controlling a pump (or motor) discharging volume by the discharging volume controller (50), e.g., in response to the mechanical load (or its changes) which is exerted on the driving wheel (e.g., a rear wheel) of the HAT bicycle or in response to the pressure of the fluid in the hydraulic motor unit (90) (or its changes). Therefore, the shift adjustor (60) may control an extent of controlling by the discharging volume controller (50), thereby controlling the pump discharging volume, or the motor intake (or discharging) volume. When the hydraulic pump unit (20) may include a vane pump, the shift adjustor (60) may include at least one part (e.g., a "pressure generating part") capable of increasing or decreasing the fluid pressure which may in turn determine a distance between a driving axis of the vane pump and a center of an outer cam ring of the vane pump or which may in turn determine a change in such a distance. When the hydraulic pump unit (20) may include a gear pump, the shift adjustor (40) may include at least one of such pressure generating parts capable of manipulating the fluid pressure which may in turn determine sizes of multiple gaps (e.g., a driving volume) formed between multiple gears rotating about their driving axes or which may in turn determine a change in such gaps. When the hydraulic pump unit (20) may include a piston pump, the shift adjustor (40) may include at least one of such pressure generating parts capable of manipulating the fluid pressure which may in turn determine a distance of travel of a piston of the piston pump or which may in turn determine a change in such a distance. When the hydraulic pump unit (20) may include a screw pump, the shift adjustor (40) may include at least one of such pressure generating parts capable of manipulating the fluid pressure which may determine a distance between multiple screw grooves and an inner wall of the screw pump or which may in turn determine a change in such a distance. Such pressure generating parts may be a prior art (either compression or extension) spring capable of generating the compression or extension force based on its deformation from its resting length, may be a compressible gas capable of generating such force, and the like.

Such shift adjustors of the HAT (10) of the HAT bicycle of the embodiment 1-2 provide a user with various benefits. For example, a senior user is generally physically restricted in the maximum amount of mechanical energy which he or she can provide to the HAT bicycle due to, e.g., his or her age, sex, physical strength, or other physical conditions. For example, such a user may not cope with the external mechanical load which is exerted onto the driving wheel of the HAT bicycle when the load or the resulting fluid pressure in the HAT may exceed physical limits of the user from time to time. In this case, a senior user may obtain a higher gear ratio, simply by lowering the value of the mechanical load or the fluid pressure at which the HAT may perform the automatic transmission (e.g., by automatically changing such gear ratios), which may be accomplished by adjusting the driving volume of the hydraulic pump unit, its discharging volume, and the like.

In a contrary case where a user is a young athlete who desires to improve his or her physical strength, such a user may increase the value of the mechanical load or the fluid pressure at which the HAT may perform the automatic transmission (e.g., by automatically changing the gear ratios) and may perform exercise of the desired strength on the HAT bicycle, simply by manipulating such values either mechanically or electrically using one of various shift adjustors as described above. In addition, the same user may lower such values of the mechanical load or the fluid pressure according to different situations. For example, when the user wants to commute on the HAT bicycle, he or she may simply manipulate the shift adjustor and lower such values for the automatic transmission.

Another exemplary embodiment 1-3 of this Aspect 1 of FIG. 1A relates to another control unit (30) which is similar to that of the exemplary embodiment 1-2 and which may include at least one flow direction controller (40), at least one discharging volume controller (50), and at least one shift adjustor (60), along with various fluid tubes connecting various units and parts of the HAT (10), where such tubes are omitted for simplicity of illustration herein. It is appreciated that, in contrary to the shift adjustor of the embodiment 1-2 which may set up a minimum value of the mechanical load or the fluid pressure in which the HAT (10) performs automatic transmission, the shift adjustor (60) of this embodiment may set up a maximum value of the mechanical load or the fluid pressure at which the HAT (10) may perform such automatic transmission. To this end, the shift adjustor (60) may recruit the spring of the second example of the embodiment 1-2 but may implement such a spring in a direction opposite to that of the spring of the second example of the embodiment 1-2 (e.g., in an opposite side of the fluid pressure). Alternatively, the shift adjustor (60) may be identical to that shown in the third example of the embodiment 1-2 but may be implemented in an opposite side of the fluid pressure.

Such shift adjustors of the HAT (10) of the HAT bicycle of the embodiment 1-3 also provide a user with various benefits. For example, when a user sets up the minimum value of the mechanical load or the fluid pressure at which the HAT performs the automatic transmission, the HAT may change gear ratios in response to every minute change in the mechanical load or fluid pressure, where such frequent automatic transmission may lead to erosion of mechanical parts. Accordingly, when a user sets up the maximum value for the mechanical load or the fluid pressure for performing such automatic transmission, such a HAT may be able to minimize erosion of mechanical parts, to minimize unnecessary transmission, and the like.

Various shift adjustors of the HAT (10) of the HAT bicycle exemplified in the above embodiments 1-2 and 1-3 of this Aspect 1 may be configured such that a user may manipulate such adjustors either mechanically (or manually) or electrically, or by both. For example, a user may manually and mechanically manipulate such a shift adjustor (e.g., a hydraulic valve, a spring, and the like). Alternatively, an electrically manipulating shift adjustor may come with an electrical motor which operates on a battery or an electrical generator and which manipulates the shift adjustor (e.g., opening or closing the hydraulic valve, or extending or compressing the spring). In addition, the shift adjustor may be configured to be manipulated either manually (e.g., by a user) or electrically (e.g., by the electrical motor or another electrical actuator).

Various HAT bicycles, HATs, units, parts, and configurational or operational characteristics of one exemplary embodiment of this exemplary Aspect 1 may be [1] similar or identical to corresponding bicycles, HATs, units, parts, and characteristics of another exemplary embodiment of the same Aspect 1 or [2] similar or identical to corresponding bicycles, HATs, units, parts, and characteristics of other exemplary embodiments of other exemplary aspects of this disclosure as described hereinabove or to be explained hereinafter. In addition, at least a portion of such bicycles, HATs, units, parts, and characteristics of such exemplary embodiments of this Aspect 1 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the second exemplary aspect (i.e., an Aspect 2) of this disclosure, a HAT bicycle may include at least one of various HATs as exemplified in the Aspect 1, where such HATs may be incorporated into various locations of the HAT bicycle and may be operated by various methods. Accordingly and as described in the Aspect 1, the HAT may synchronize the external mechanical load exerted on a driving wheel (e.g., a rear wheel) of the HAT bicycle while a user is riding on the bicycle with pressurizing a variable volume of fluid contained in at least one of a hydraulic pump unit and a hydraulic motor unit through such "load synchronizing." In addition, the HAT may perform the automatic transmission (e.g., automatically changing the gear ratios) by driving at least one variable-volume (or fixed-volume) hydraulic pump unit and at least one variable-volume (or fixed-volume) hydraulic motor unit through such "pressure synchronizing." Accordingly, when a user rides the HAT bicycle uphill, the mechanical load exerted on the driving wheel of the bicycle increases, and the HAT may automatically lower a gear ratio, thereby enabling a user to ride uphill at a slower speed but with an increased power. Conversely, as a user rides the HAT bicycle on a downhill, the mechanical load exerted on the driving wheel of the bicycle decreases, and the HAT may automatically change into a higher gear ratio, thereby enabling a user to ride downhill at a higher speed but with a decreased power.

Various HAT bicycles of this Aspect 2 may incorporate various HATs as exemplified in various embodiments of the Aspect 1 and as will be exemplified hereinafter into various locations of the bicycles. More particularly, because various HATs of the HAT bicycles of this Aspect 2 may include various units and parts which may be similar or identical to those of the above Aspect 1, various HAT bicycles of this Aspect 2 may be similarly configured or operated as well.

Figure 2A:
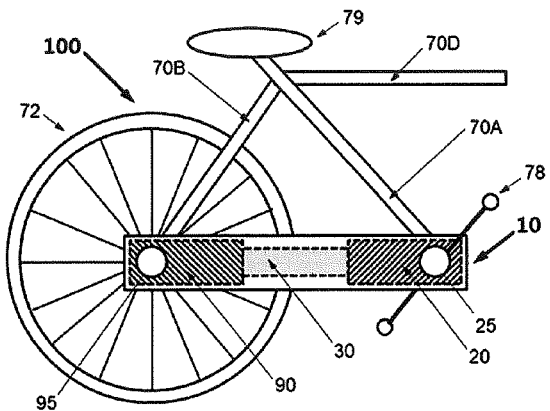
FIG. 2A is a schematic diagram of a first embodiment of a second exemplary aspect of a HAT bicycle which incorporates various units in various locations.

One exemplary embodiment 2-1 of this Aspect 2 is depicted in FIG. 2A, where a HAT bicycle (100) may include a bicycle body (70) and at least one HAT (10). The body (70) may in turn include a frame (70A-70D, not included in the figure) which corresponds to a mechanical skeleton of the HAT bicycle (100). The body (70) may also include a handle (not shown in the figure), a seat (79), a front wheel (not shown in the figure), a rear wheel (72), and at least one pedal (78). The HAT (10) may include at least one hydraulic pump unit (20) and at least one hydraulic motor unit (90), and may also include at least one optional control unit (30), where the hydraulic pump unit (20) may include at least one hydraulic pump, while the hydraulic motor unit (90) may include at least one hydraulic motor. The HAT (10) shown in this figure exemplifies an arrangement in which the hydraulic pump unit (20) and the hydraulic motor unit (90) are fabricated as a unitary article.

The unitary HAT (10) may recruit a driving axis (25) of the hydraulic pump of the hydraulic pump unit (20) as a rotation axis of the pedal (78), may recruit a driving axis (95) of the hydraulic motor of the hydraulic motor unit (90) as a rotation axis of the rear wheel (72). Therefore, the HAT (10) may also serve as a kind of frame which may couple the pedal axis (77) with the rotation axis of the rear wheel (72). As a result, the HAT (10) may be made of or include sturdy materials. The HAT (10) may instead be made of or include conventional materials and then an additional sturdy frame may be incorporated thereinto to connect the pedal axis (77) and the rotation axis of the rear wheel (72). Although not included in the figure, the control unit (30) of the HAT (10) may include therein at least one flow direction controller (40) and at least one discharging volume controller (50), both of which have been explained in the embodiment 1-1, and may include at least one optional shift adjustor (60) as explained hereinabove.

A user may operate the HAT bicycle (100) of the exemplary embodiment 2-1 according to various methods. For example, a user may sit on the seat (79) and reciprocatingly press the pedal (78) to ride the bicycle (100). In the embodiment described in the figure, the rotation axis of the pedal (78) coincides with a driving axis (25) of a variable-volume hydraulic pump of the hydraulic pump unit (20). Therefore, such mechanical energy supplied by a user who presses the pedal (78) or provided by an electrical motor which operates on a battery or an electrical generator may drive (i.e., rotate) a driving axis of the hydraulic pump of the hydraulic pump unit (20). Thus, the hydraulic pump such as a variable-volume vane pump, a variable-volume gear pump, a variable-volume piston pump, or a variable-volume screw pump may pressurize fluid contained therein with such mechanical energy.

When a user rides the HAT bicycle (100) uphill, the mechanical load which is exerted on its driving wheel (e.g., its rear wheel) of the bicycle increases, and may be transmitted to fluid contained in the hydraulic motor of the hydraulic motor unit (90) and increase the pressure of such fluid as well as the pressure of fluid which is discharged out of (or taken in by) the hydraulic motor, where such pressure is to be referred to as a "motor pressure" hereinafter. The increased pressure may also be transmitted to the hydraulic pump unit (20) which is synchronized with the hydraulic motor unit (90) through the "pressure synchronizing" and, accordingly, the variable-volume hydraulic pump of the hydraulic pump unit (20) may also be affected by the mechanical load. As a result, the hydraulic pump of the hydraulic pump unit (20) may also have to pressurize the fluid up to a higher pressure (to be referred to as a "pump pressure") in order to drive the hydraulic motor of the hydraulic motor unit (90). To this end, the flow direction controller of the control unit (30) may direct the pressurized fluid to flow through a certain tube according to the mechanical load or the pressure of the fluid discharged out of the hydraulic motor (i.e., the motor pressure) and may also synchronize such pressurized fluid with the discharging volume controller (50) through the "pressure synchronizing." The discharging volume controller (50) may decrease the pump discharging volume which is discharged from the hydraulic pump unit (20) or may decrease the motor intake volume which is taken in by the hydraulic motor unit (90) according to the mechanical load or the fluid pressure. In other words, the hydraulic pump of the hydraulic pump unit (20) may increase an rpm of its driving axis per a certain amount of the mechanical energy, thereby supplying a less volume of the pressurized fluid to the hydraulic motor unit (90) than the one supplying thereto while a user is riding the HAT bicycle (100) on a flat road. In response thereto, the hydraulic motor of the hydraulic motor unit (90) may also decrease its rpm of its driving axis and, as a result, the HAT (10) may perform such automatic transmission by shifting to a lower gear ratio.

As described above, the pressurized fluid which is discharged from the hydraulic pump may be delivered to the hydraulic motor which may operate based upon their types. More particularly, when the hydraulic motor unit (90) may include a fixed-volume hydraulic motor, such a motor may rotate at a certain rpm determined by the intake volume of such a motor. Thus, the HAT (10) may operate at a gear ratio which is determined by a ratio of a first rpm of the driving axis (25) of the hydraulic pump to a second rpm of the driving axis (95) of the hydraulic motor. It is appreciated that the HAT bicycle (100) may configure the rotation axis (75) of the rear wheel (72) to coincide with the driving axis (95) of the hydraulic motor of the hydraulic motor unit (90). As a result, a user may conveniently enjoy riding the bicycle (100) at the above gear ratio.

Conversely, when the hydraulic motor unit (90) may include a variable-volume hydraulic motor, the HAT (10) may additionally change the gear ratio again, e.g., by rotating the driving axis (95) of the variable-volume hydraulic motor at an rpm determined by the motor intake volume and the fluid pressure of the fluid taken into such a motor. In such a case, the HAT (10) may operate at an overall gear ratio which is a product of a first gear ratio of the hydraulic pump unit (20) and a second gear ratio of the hydraulic motor unit (90). Thus, a user may further enjoy the automatic transmission which may be even more convenient than the one with a single gear ratio which may be one of the above first and second gear ratios.

Figure 2B:
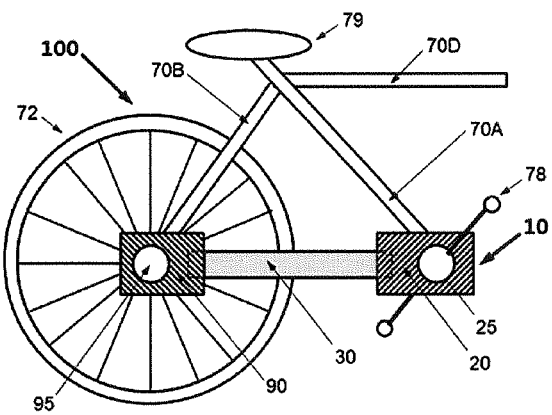
FIG. 2B is a schematic diagram of a second embodiment of the second exemplary aspect.

Another exemplary embodiment 2-2 of this Aspect 2 is depicted in FIG. 2B, where a HAT bicycle (100) may include a bicycle body (70) and at least one HAT (10). The body (70) may in turn include a frame (70A), (70B), (70D) which is a mechanical skeleton of the bicycle (100). The body (70) may include a handle (not shown in the figure), a seat (79), a front wheel (not shown in the figure), a rear wheel (72), and at least one pedal (78). The HAT (10) may include at least one hydraulic pump unit (20) and at least one hydraulic motor unit (90) both of which are fabricated as a unitary article. The HAT (10) may also have at least one optional control unit (30). It is appreciated in this embodiment 2-2 that at least a substantial portion of the controller unit (30) is incorporated into the hydraulic pump unit (20) or the hydraulic motor unit (90) in such a way that a middle portion of the control unit (30) has a minimum size or volume. As a result, this configuration may provide a slimmer look than the one exemplified in the embodiment 2-1, as long as the control unit (30) may endure mechanical shock or impact imposed thereon while a user is riding the HAT bicycle (100).

Figure 2C:
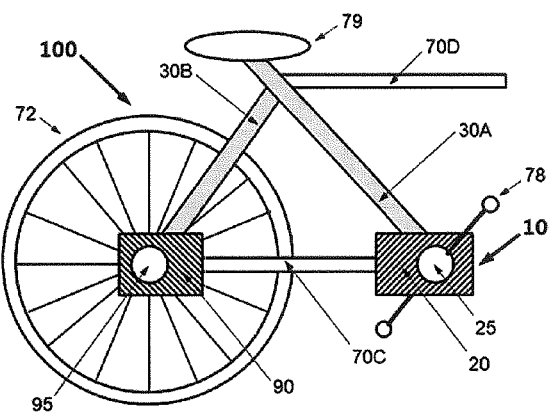
FIG. 2C is a schematic diagram of a third embodiment of the second exemplary aspect.

Another exemplary embodiment 2-3 of this Aspect 2 is depicted in FIG. 2C, where a HAT bicycle (100) may similarly include a bicycle body (70) and at least one HAT (10), where the body (70) may include a frame (70C), (70D), a handle (not shown in the figure), a seat (79), a front wheel (not shown in the figure), a rear wheel (72), and at least one pedal (78). The HAT (10) may also include at least one hydraulic pump unit (20) and at least one hydraulic motor unit (90), and at least one similar optional control unit (30).

It is noted in this embodiment 2-3 that at least a substantial portion of the control unit (30) is incorporated into a portion of the frame which connects the pedal axis (77) with the seat (79) which may correspond to the frame (70A) of FIGS. 2A and 2B, or incorporated into another portion of the frame which connects the seat (79) with the rear wheel (72)

which may correspond to the frame (70B) of FIGS. 2A and 2B in such a way that a third portion of the frame (70C) connecting the pedal axis (77) with the rear wheel (72) has a minimum size or volume. As a result, this configuration may provide a look different from those of the embodiments 2-1 and 2-2.

Various HAT bicycles (100) of the embodiments 2-1 to 2-3 may be operated in various methods which may be similar or identical to those of the HAT bicycle of the Aspect 1. Therefore, details of such methods are to be omitted herein.

Various features of the HAT bicycles (100) of such exemplary embodiments 2-1 to 2-3 of this Aspect 2 may be combined with each other or may replace each other. Therefore, various parts of the hydraulic pump unit (20) or the hydraulic motor unit (90) may be disposed inside or outside of the body (70) or the frame (70A), (70B), (70C), (70D), as long as the HAT bicycle (100) may perform such automatic transmission with infinite gear ratios and as long as the bicycle (100) may endure the static or dynamic mechanical load, a weight of a user, and the like. In addition, the hydraulic pump unit (20), the hydraulic motor unit (90), the control unit (30), or their parts may be releasably implemented inside or outside the body (70) or the frame (70A), (70B), (70C), (70D) such that a user may easily repair a damaged unit (or part) or may readily replace the damaged unit (or part).

The above HAT bicycles (100) exemplified in the embodiments 2-1 to 2-3 of this Aspect 2 couple the driving axis (25) of the hydraulic pump unit (20) with the pedal axis (77) of the body (70), or couple the driving axis (95) of the hydraulic motor unit (90) with the rotation axis of the rear wheel (72). However, the HAT bicycle (100) may include a first auxiliary gear which is disposed between the pedal axis (77) and the driving axis (25) and connects the pedal axis (77) with the driving axis (25), or a second auxiliary gear which is disposed between the rotation axis (75) and the driving axis (95) and connects the rotation axis (75) to the driving axis (95). In this arrangement, the gear ratio of the variable-volume hydraulic pump unit (20) or the gear ratio of the variable-volume hydraulic motor unit (90) may vary due to the presence of such auxiliary gears. However, operational features of such HAT bicycles (100) may be similar or identical to those of other HAT bicycles of the embodiments 2-1 to 2-3 and, therefore, omitted herein.

Figure 2D:
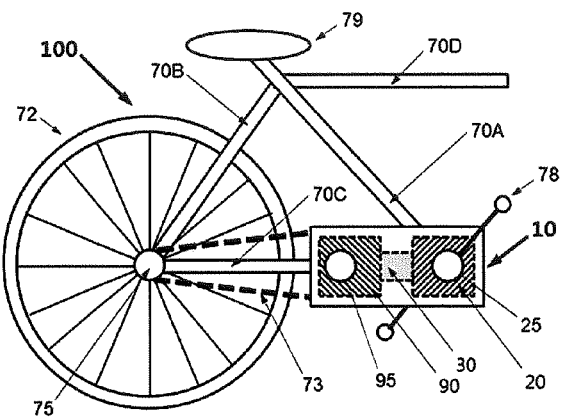
FIG. 2D is a schematic diagram of a fourth embodiment of the second exemplary aspect.

Another exemplary embodiment 2-4 of this Aspect 2 is depicted in FIG. 2D, where a HAT bicycle (100) may similarly include a bicycle body (70) and at least one HAT (10), where the body (70) may include a frame (70A), (70B), (70C), (70D), a handle (not shown in the figure), a seat (79), a front wheel (not shown in the figure), a rear wheel (72), and at least one pedal (78). The HAT (10) may also include at least one hydraulic pump unit (20) and at least one hydraulic motor unit (90), both of which are fabricated as a unitary article. The HAT (10) may also include at least one similar optional control unit (30). However, the HAT (10) of this embodiment is configured to be shorter than those of the embodiments 2-1 to 2-3, and that a driving axis (25) of a hydraulic pump of the hydraulic pump unit (20) may correspond to a pedal axis (77) of the pedal (78). As a result, a driving axis (95) of a hydraulic motor of the hydraulic motor unit (90) which is spaced apart from a rotation axis (75) of the rear wheel (72) may be coupled to the rotation axis (75) by a chain (73), by a gear, or by a gear assembly.

The HAT bicycle (100) of this embodiment 2-4 may be operated in various methods. In one example, a user sits on the seat (79) of the bicycle (100), and may start to ride the bicycle (100) by providing thereto mechanical energy, e.g., by rotating the pedal (78) or by using an electrical motor which operates on a battery. Because a rotating pedal axis (77) of the pedal (78) coincides with a driving axis (25) of a variable-volume hydraulic pump of the hydraulic pump unit (20), the mechanical energy supplied by a user or by an electrical motor may be transmitted to the driving axis (25) of the variable-volume hydraulic pump through the pedal (78) and may drive (i.e., rotate) the driving axis (25) of the hydraulic pump which may then start to pressurize fluid contained therein, where the hydraulic pump may be a vane pump, a gear pump, a piston pump, or a screw pump and where each of such pumps may define a variable volume in its driving part.

When the fluid pressure in the hydraulic motor or the fluid pressure in an inlet (or outlet) of the hydraulic motor unit (90) (or its change) may exceed a certain value, or when the mechanical load (or its change) applied to a driving wheel (e.g., a rear wheel) of the HAT bicycle (100) may exceed a certain value, a flow direction controller of the control unit (30) may direct the pressurized fluid to flow to a certain tube based on the fluid pressure and then may send the value to the discharging volume controller (50). The discharging volume controller (50) may manipulate the variable-volume hydraulic pump to pressurize the fluid contained therein to a higher pressure in order to drive the hydraulic motor despite the increased fluid pressure (or its change) inside (or in an inlet or outlet of) the hydraulic motor and against the external mechanical load (or its change). To this end, the discharging volume controller (50) may deliver a decreased amount of the fluid to the hydraulic motor to drive the driving axis of the motor at a higher rpm with the fixed amount of mechanical energy supplied by a user. As a result, the hydraulic motor may rotate at a lower rpm.

The hydraulic motor of the hydraulic motor unit (90) may take in the pressurized fluid which is discharged out of the hydraulic pump of the hydraulic pump unit (20), and the hydraulic motor may be a fixed-volume motor or a variable-volume motor which operates as described above. While rotating its driving axis, the hydraulic motor may generate power which may be transmitted to the rotation axis (75) of the rear wheel (72) through the chain (73), a gear, or a gear assembly.

As described above, the HAT bicycle (100) of this embodiment 2-4 may mechanically couple a rotation axis (75) of the rear wheel (70) with a driving axis (95) of the hydraulic motor unit (90) in various means. For example, a HAT bicycle (100) may include an auxiliary gear (or assembly) with a fixed gear ratio between the rotation axis (75) of the rear wheel (72) and the driving axis (75) of the hydraulic motor unit (90) or between the pedal (77) and the driving axis (95), and may configure such an auxiliary gear to transmit the power to the chain (73). The chain (73) may then transmit the power to the rotation axis (75) of the rear wheel (72) or the pedal axis (77). In this case, the gear ratio of the variable-volume hydraulic pump unit (20) or the gear ratio of the hydraulic motor unit (90) may vary from those of the embodiments 2-1 to 2-4. Other configurational or operational characteristics of such HAT bicycle (100) and its HAT (10) of this embodiment may be similar or identical to those of other embodiments described above or to be explained below, and are omitted herein.

Figure 2E:
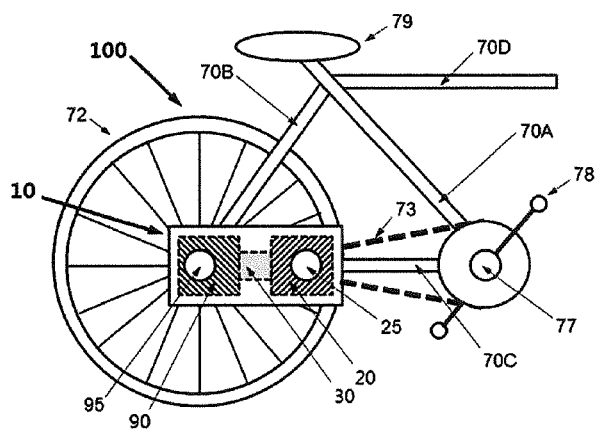
FIG. 2E is a schematic diagram of a fifth embodiment of the second exemplary aspect.

Another exemplary embodiment 2-5 of this Aspect 2 is depicted in FIG. 2E, where a HAT bicycle (100) may similarly include a bicycle body (70) and at least one HAT (10), where the body (70) may include a frame (70A), (70B), (70C), (70D), a handle (not shown in the figure), a seat (79), a front wheel (not shown in the figure), a rear wheel (72), and a pedal (78). This HAT (10) may also include a hydraulic pump unit (20) and a hydraulic motor unit (90) both of which are fabricated as a unitary article. The HAT (10) may also include an optional control unit (30).

The HAT (10) of this embodiment 2-5 may similarly be configured to have a shorter length than those of the above embodiments 2-1 to 2-3, and may configure a driving axis (95) of the hydraulic motor to correspond to a rotation axis (75) of the rear wheel (72). Therefore, a driving axis (25) of a hydraulic pump of the hydraulic pump unit (20) which is spaced apart from a pedal axis (77) of the pedal (78) may be mechanically coupled to the pedal axis (77) by a chain (73), by a gear, or by a gear assembly.

The HAT bicycle (100) of this embodiment 2-5 may be operated in various methods. In one example, a user sits on the seat (79) of the bicycle (100), and may start to ride the bicycle (100) by providing thereto mechanical energy, e.g., by rotating the pedal (78) or by using an electrical motor which operates on a battery. In this embodiment, a rotating pedal axis of the rear wheel (72) coincides with a driving axis (95) of the hydraulic motor of the hydraulic motor unit (90). As the user or an electrical motor provides mechanical energy to a rotation axis of the pedal (78), a chain (73) may transmit such mechanical energy to a driving axis of a variable-volume hydraulic pump of the hydraulic pump unit (20), where the hydraulic pump such as a variable-volume vane pump, a variable-volume gear pump, a variable-volume piston pump, or a variable-volume screw pump may begin to pressurize fluid contained therein using the mechanical energy.

When the fluid pressure in the hydraulic motor or the fluid pressure in an inlet (or outlet) of the hydraulic motor unit (90) (or its change) may exceed a certain value, or when the mechanical load (or its change) applied to a driving wheel (72) may exceed a certain value, a flow direction controller may direct the fluid to flow to a certain tube based on the fluid pressure and then may send the value to the discharging volume controller (50). The discharging volume controller (50) may manipulate the variable-volume hydraulic pump in a manner similar to that of the embodiment 2-4. As a result, the hydraulic motor may rotate at a lower rpm. The pedal axis (77) and the driving axis (25) of the hydraulic pump unit (20) may be connected to each other in a manner similar to that of the embodiment 2-4 as well.

Figure 2F:
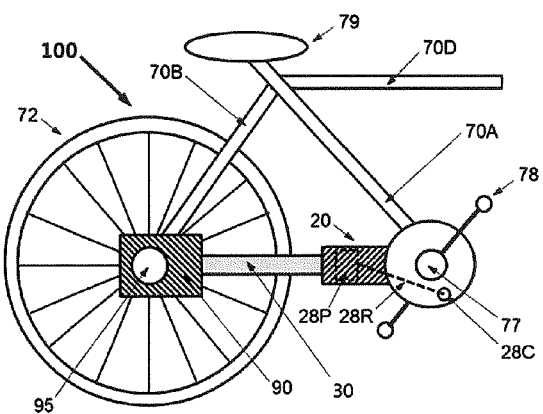
FIG. 2F is a schematic diagram of a sixth embodiment of the second exemplary aspect.

Another exemplary embodiment 2-6 of this Aspect 2 is depicted in FIG. 2F, where a HAT bicycle (100) may similarly include a bicycle body (70), at least one HAT (10), and at least one optional control unit (30). The body (70) may include a frame (70A), (70B), (70C), (70D), a handle, a seat (79), a front wheel, a rear wheel (72), and a pedal (78). This HAT (10) may include a hydraulic pump unit (20) and a hydraulic motor unit (90), where the control unit (30) is provided as multiple parts each of which may be implemented into each of such units (20), (90) or into only one of such units (20), (90). A driving axis (95) of hydraulic motor unit (90) is spaced away from a rotation axis of the rear wheel (72) and, therefore, connected thereto by a chain (73), by an auxiliary gear, or by a gear assembly. A driving axis (25) of the hydraulic pump unit (20) which is similarly spaced away from a rotation axis (77) of the pedal (78) may be connected to the pedal axis (77) by the chain (73), by an auxiliary gear, or by a gear assembly. In this aspect, the HAT bicycle (100) of this embodiment 2-6 may be viewed as a combination of those bicycles of the embodiments 2-4 and 2-5.

The HAT bicycle (100) of this embodiment 2-6 may be operated in various methods. In one example, a user sits on the seat (79) and starts to ride the bicycle (100) by providing mechanical energy to the pedal axis (77) of the pedal (78). In this embodiment, a rotating pedal axis (77) may couple with a driving axis (25) of a variable-volume hydraulic pump of the hydraulic pump unit (20), while the rotation axis (75) of the rear wheel (72) may couple with a driving axis (95) of a hydraulic motor of the hydraulic motor unit (90) by a chain (73), an auxiliary gear, or an auxiliary gear unit. Thus, the mechanical energy may be transmitted to the hydraulic motor unit (90) and may drive (i.e., rotate) the driving axis (25) of the hydraulic pump which may then begin to pressurize fluid contained therein.

When the fluid pressure (or its change) in the hydraulic motor unit (90) or at an inlet (or outlet) thereof may exceed a certain value, or when the mechanical load (or its change) applied to a driving wheel (72) may exceed a certain value while driving, a flow direction controller may direct the fluid to flow to a certain tube and may send the value to the discharging volume controller (50). The discharging volume controller (50) may automatically manipulate a discharging volume of the hydraulic pump unit (20) or an intake volume of the hydraulic motor unit (90) in a manner similar to that of the embodiments 2-4 or 2-5.

Therefore, the power from the pedal axis (75) of the pedal (72) (or the chain) may drive the driving axis (25) of the hydraulic pump of the hydraulic pump unit (20), and the fluid pressurized in the hydraulic pump may be delivered to the hydraulic motor of the hydraulic motor unit (90) and drive the hydraulic motor. Depending on the configuration, a variable-volume or a fixed-volume hydraulic motor may generate power as described in the previous embodiments, and may then transmit such power to the rotation axis (75) of the rear wheel (72).

The HAT bicycle (100) of this embodiment 2-6 may mechanical couple the pedal axis (77) of the body (70) to the driving axis (25) of the hydraulic pump unit (20) or may mechanically couple the driving axis (95) of the hydraulic motor unit (90) with the rotation axis (75) of the rear wheel (72) in various means. For example, the bicycle (100) may include an auxiliary gear (or assembly) with a fixed gear ratio between the pedal axis (77) and the driving axis (25) of the hydraulic pump unit (20) or between the rotation axis (75) of the rear wheel (72) and the driving axis (95) of the hydraulic motor unit (90). The gear ratio of the variable-volume hydraulic pump unit (20) or the gear ratio of the hydraulic motor unit (90) may vary and, therefore, may be different from those of the embodiments 2-1 to 2-4. Other configurational or operational characteristics of such HAT bicycle (100) and its HAT (10) of this embodiment may be similar or identical to those of other embodiments described above or to be explained below, and are omitted herein.

As described above, the hydraulic pump unit (20) of this embodiment 2-6 may include at least one hydraulic pump such as, e.g., at least one variable (or fixed)-volume vane pump, at least one variable (or fixed)-volume gear pump, at least one variable (or fixed)-volume piston pump, or at least one variable (or fixed)-volume screw pump. When the hydraulic pump unit (20) may include a vane pump or a gear pump as its hydraulic pump, such a unit (20) includes a circular rotor in the vane pump or circular gears in the gear pump and, therefore, may generally have a dimension of which a length and a width may be of similar lengths. To the contrary, when the hydraulic pump unit (20) may include a piston pump or a screw pump, such a unit (20) may generally have an elongated dimension.

Figure 2G:
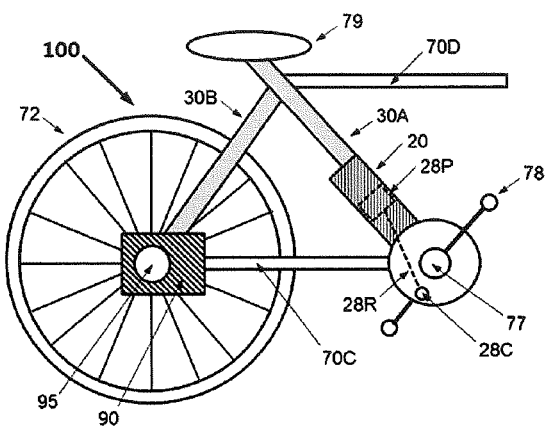
FIG. 2G is a schematic diagram of a seventh embodiment of the second exemplary aspect.

Another exemplary embodiment 2-7 of this Aspect 2 is depicted in FIG. 2G, where a HAT bicycle (100) may similarly include a bicycle body (70), at least one HAT (10), and at least one optional control unit (30). The body (70) may include a frame (70A), (70B), (70C), (70D), a handle, a seat (79), a front wheel, a rear wheel (72), and a pedal (78). This HAT (10) may also include a hydraulic pump unit (20) and a hydraulic motor unit (90), where the hydraulic pump unit (20) may include a piston pump as its hydraulic pump, where both units (20), (90) may be provided as a unitary article, and where at least a portion of the control unit (30) may also be disposed inside the body (70).

As depicted in the figure, the hydraulic pump unit (20) may include an elongated piston pump which includes at least one cylinder, at least one piston (28P), and at least one piston lever (28R), where the piston (28P) may reciprocate inside the cylinder, where the lever (28R) may movably couple the piston (28P) to a rotation axis (28C) of the piston (28P), and where the rotation axis (28C) may be incorporated to a rotation plate of the pedal (78). As a result, when a user or an electrical motor may rotate the rotation plate, the rotation axis (28C) may rotate in a circular path. As the piston lever (28R) converts the rotation into a linear reciprocation, the piston (28P) may reciprocate inside the cylinder while pressurizing the fluid contained in the cylinder and then discharging the pressurized fluid out of the cylinder in a pump discharging volume.

The HAT bicycle (100) of this embodiment 2-7 may be operated in various methods which may be similar or identical to those of the embodiments 2-1 to 2-13 and, accordingly, further details are to be omitted herein for simplicity of illustration.

Figure 2H:
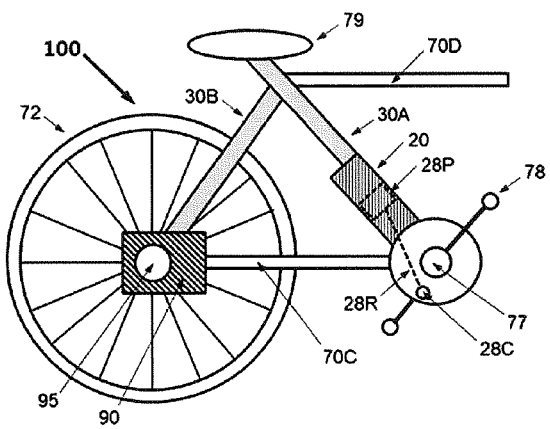
FIG. 2H is a schematic diagram of an eighth embodiment of the second exemplary aspect.

Another exemplary embodiment 2-8 of this Aspect 2 is depicted in FIG. 2H, where a HAT bicycle (100) may include a bicycle body (70), at least one HAT (10), and at least one optional control unit (30), where such a body (70) may be similar to that of the embodiment 2-7. This HAT (10) may also include a hydraulic pump unit (20) and a hydraulic motor unit (90), where the hydraulic pump unit (20) may include a piston pump as its hydraulic pump.

The HAT bicycle (100) of this embodiment is generally similar to that of the embodiment 2-7. However, in contrary to the HAT of the embodiment 2-7 of which frame (70C) connects the rotation axis (77) of the pedal (78) to the rotation axis of the rear wheel (77), a HAT (10) of this embodiment may include a different frame (70A), (70B). Further configurational or operational characteristics of this HAT bicycle (10) may be similar or identical to those of the HAT bicycle of the embodiment 2-7 and are omitted herein.

It is appreciated that various HATs of the embodiments 2-1 to 2-8 include the hydraulic pump unit (20) and the hydraulic motor unit (90) which are disposed along a long axis of the bicycle (or a forward riding direction) but that the hydraulic pump unit (20), the hydraulic motor unit (90), and at least a portion of the control unit (30) of this embodiment may be disposed in a direction which may be transverse to (i.e., not parallel with) the long axis of the bicycle (100) or the forward riding direction such as, e.g., in a direction perpendicular to and on the left or right side of the long axis, in another direction perpendicular to and over or below the long axis, or in yet another direction which forms an acute angle with the axis (e.g., a slanted direction). That is, when viewed along the long axis of the HAT bicycle (100), the hydraulic pump unit (20), the hydraulic motor unit (90), or at least a portion of the controller unit (30) may be implemented in a stacked arrangement. In addition, the hydraulic pump unit (20), the hydraulic motor unit (90), or at least a portion of the control unit (30) may be disposed in various locations of the HAT bicycle (100), other than the frame (70A), (70B), (70C), (70D) of the body (70). Accordingly, the hydraulic pump (or motor) unit (20), (90) or at least a portion of the control unit (30) may be disposed on or around a handle, on or around a front (or rear) rack, on or around a front (or rear) wheel, or in any other suitable location of the bicycle (100).

Figure 2I:
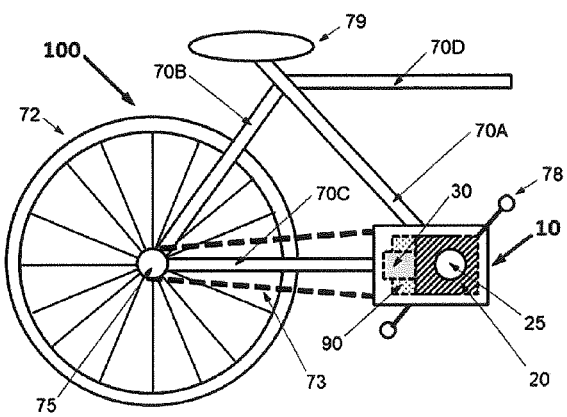
FIG. 2I is a schematic diagram of a ninth embodiment of the second exemplary aspect.

Another exemplary embodiment 2-9 of this Aspect 2 is depicted in FIG. 2I, where a HAT bicycle (100) may include a bicycle body (70) and at least one HAT (10) which may be disposed in a stacked arrangement. The HAT bicycle (100) may also include at least one optional control unit (30), where such a body (70) may be similar to that of the embodiment 2-8. This HAT (10) may include a hydraulic pump unit (20) and a hydraulic motor unit (90).

More particularly, the HAT (10) may have a configuration similar to that of the embodiment 2-4. However, in contrary to the HAT of the embodiment 2-4 where the hydraulic pump unit, the hydraulic motor unit, and the control unit (30) are aligned along a long axis of the bicycle, the HAT (10) of this embodiment may include the hydraulic pump unit (20) disposed on a right side of a pedal (78), the hydraulic motor unit (90) disposed on a left side of the pedal (78), and the like. Further configurational or operational characteristics of this HAT bicycle (10) may be similar or identical to those of the HAT bicycle of the embodiment 2-4 and are omitted herein.

It is noted that various HATs of the HAT bicycles of this disclosure may have configurational and operational characteristics which are different from those of the HATs exemplified in the embodiments 2-1 to 2-9. In one example, the HAT bicycle may recruit the front wheel as its driving wheel. In such a case, the pedal axis (77) may drive the hydraulic pump unit (20), while the fluid pressurized in a hydraulic pump (21) of the hydraulic pump unit (20) may be discharged to the hydraulic motor unit (90). A hydraulic motor or the hydraulic motor unit (90) may then directly drive a rotation axis of the front wheel (71) or indirectly drive the rotation axis (71) through a chain, an auxiliary gear, or a gear assembly. The hydraulic motor or the hydraulic motor unit (90) may then be disposed in, on or around the front wheel (71). Alternatively, the hydraulic motor or the hydraulic motor unit (90) may be implemented to the rear wheel (72), the body (70), or in other locations of the HAT bicycle (100), where the hydraulic motor unit (90) may directly or indirectly drive the front wheel (71).

Various HAT bicycles, HATs, units, parts, and configurational or operational characteristics of one exemplary embodiment of this exemplary Aspect 2 may be [1] similar or identical to corresponding bicycles, HATs, units, parts, and characteristics of another exemplary embodiment of the same Aspect 2 or [2] similar or identical to corresponding bicycles, HATs, units, parts, and characteristics of other exemplary embodiments of other exemplary aspects of this disclosure as described hereinabove or to be explained hereinafter. In addition, at least a portion of such bicycles, HATs, units, parts, and characteristics of such exemplary embodiments of this Aspect 2 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

It is appreciated that following modifications or variations of various examples and exemplary embodiments of the above Aspect 1 and Aspect 2 also belong to such aspects and fall within the scope of this disclosure.

It is appreciated that an efficiency of the HAT bicycle refers to a distance of riding per unit mechanical energy which may be manually supplied by a user or which may be supplied by an electrical motor which operates on a battery or an electrical generator, and that such an efficiency may generally increase as a weight of the hydraulic pump (or motor) unit may decrease, where the term "hydraulic pump (or motor) unit" refers to both of the hydraulic pump unit and the hydraulic motor unit or only one of such units, and where the efficiency of riding is to be abbreviated as a "riding efficiency" hereinafter. Therefore, in the context of the riding efficiency, it may be desirable to decrease the weight of the hydraulic pump (or motor) unit or the control unit. Thus, the hydraulic pump or the hydraulic pump unit may be configured to have a weight which may be less than, e.g., about 15 Kg, 10 Kg or 8 Kg, while the hydraulic motor or the hydraulic motor unit may be configured to have a weight which may be less than, e.g., about 15 Kg, 12 Kg, or 10 Kg. When such a pump or pump unit may be made of or include light composite materials or alloys, such a weight may even be decreased less than about 7 kg, 6 Kg, 5 Kg, or 4 Kg, while such a motor or motor unit may be configured to have a weight less than about 8 Kg, 7 Kg, 6 Kg, or 5 Kg. It is further appreciated that a weight of the HAT or its hydraulic pump (or motor) unit may be determined based on a range of gear ratios which a user may desire. Therefore, when a user preferentially desires a range of low gear ratios, such a user may tend to be athletic and the HAT bicycle may be configured as a heavy-duty HAT bicycle which may also be relatively heavy. In contrary, when a user preferentially desires a range of high gear ratios, such a user may tend to be a senior or may want to use the HAT bicycle for commute. In this case, the HAT bicycle or its HAT may not have to be made of sturdy, heavy materials.

In general, prior art bicycles have weights which take account of their uses. For example, prior art mountain bicycles are made of sturdy materials and typically weigh more than 15 Kg or, sometimes, as much as 25 Kg. In contrary, prior art racing bicycles are typically made to have a less weight such as, e.g., 10 Kg or less. Therefore, various HATs including such hydraulic pump (or motor) unit and control unit may be configured to have a weight which may be comparable with a weight of a frame of the HAT bicycle. For example and in the case of a light-weight HAT bicycle whose weight may be less than about 10 Kg, the HAT or the hydraulic pump (or motor) may have a weight similar to or less than that of the frame of the HAT bicycle. Therefore, a weight of the hydraulic pump (or motor) unit or the HAT may be determined as a ratio to a total weight of the HAT bicycle (with or without a user riding thereon) or as a ratio to a weight of the frame of the HAT bicycle such as, e.g., less than about 150%, 140%, 130%, 120%, 110%, 100%, 90%, 80%, 70%, 60%, 50%, 40%, or 30%. In case of a middle-weight HAT bicycle (e.g., a total weight of about 10 Kg without a user sitting on), a ratio of a weight of the hydraulic pump (or motor) or the HAT to a total weight of the HAT bicycle (or its frame) may be less than about 120%, %110%, 100%, 90%, 80%, 70%, 60%, 50%, or 40%.

When the frame may be made of or may include a light-weight sturdy material such as a carbon fiber or its equivalents, the frame may have a weight of less than about 5 Kg or even about or less than 3 Kg. In such a case, a ratio of a weight of the hydraulic pump (or motor) unit, its hydraulic pump (or motor), or the HAT to a weight of a weight of the frame may be less than about 200%, 180%, 160%, 140%, 120%, or 100%.

A weight of the hydraulic pump (or motor) unit may tend to be proportional with a weight of a hydraulic pump (or motor) included therein. The same may generally apply to the HAT as well. Therefore, when the HAT may be made as a light-weight article, the hydraulic pump unit may tend to be a light-weight unit and, therefore, the maximum pressure to which the hydraulic pump unit may pressurize the fluid may decrease. This may also decrease the fluid pressure inside the hydraulic pump unit or the fluid pressure discharged from such a hydraulic pump unit, and may also affect the maximum gear ratio which the HAT may attain. In addition, as the fluid pressure discharged out of the hydraulic pump unit decreases, the fluid pressure in or around the hydraulic motor unit may also decrease. As a result, the hydraulic motor unit may then be made as a light-weight unit as well. Based upon these general principles, a manufacturer may choose or select an optimum weight of the hydraulic pump (or motor) unit or the HAT, while also taking account of the riding efficiency, the gear ratio which may be desired by a user, and the like.

Similar to their weights, the HAT bicycle, its HAT, or its hydraulic pump (or motor) unit may also be provided in various dimensions (e.g., a height, a length or a width), various internal volumes, various external volumes, and the like. Considering its efficiency and as described above, the hydraulic pump (or motor) unit may be fabricated to have a compact configuration with a light weight. It is appreciated that, even when the hydraulic pump (or motor) unit may have a light weight but be bulky, a user may find it uncomfortable to ride on such a HAT bicycle. For example, when a bulky hydraulic pump is coupled to a rotation axis of a pedal, a user may find it uneasy to rotate the pedal. Therefore, it is generally to the advantage of a user to not unnecessarily increase a size or a volume of the hydraulic pump (or motor) unit, its hydraulic pump (or motor), or the HAT.

In general, a size (or volume) of the hydraulic pump (or motor) unit may tend to be proportional with a driving volume or a volume of a driving part of the hydraulic pump (or motor) included therein, where characteristics of the hydraulic pump (or motor) may depend more on the driving volume which may be provided in various shapes and sizes and which may in turn be determined by a length, a width, and a height (or a radius) of the driving volume (or part) rather than a one-dimensional size of the unit. For simplicity of illustration, however, various characteristics of such hydraulic pump (or motor) units are to be described in terms of their "sizes" which may correspond to a maximum value of a length, a width, a height, or a diameter of such units. In one example, the hydraulic pump (or motor) may include a driving part which has a size less than about 30 cm, 25 cm, 20 cm, or 15 cm, where such a size may also depend on a weight of a user, a main use of the HAT bicycle (e.g., exercise or commute), a driving power, a gear ratio desired by a user, and the like. In another example, the hydraulic pump (or motor) may include a driving part which has a size less than about 14 cm, 12 cm, 10 cm, or 8 cm, when a user desires a compact HAT bicycle regardless of its gear ratio or driving power. In another example when a user has a small constitution or when a user is a child, the hydraulic pump (or motor) unit may operate at a relatively low range of fluid pressure and, therefore, hydraulic pump (or motor) unit may include a driving part which has a size less than about 7 cm, 6 cm, or 5 cm.

Accordingly, when the hydraulic pump (or motor) is a vane pump (or motor) with multiple vanes, the driving part of such a unit may include a rotor which has a diameter of less than about 23 cm, 18 cm, 13 cm, 12 cm, or 10 cm. When a user prefers a smaller or lighter hydraulic pump (or motor), its rotor may have a diameter of less than about 9 cm, 7 cm, 5 cm, or less. As will be explained below, the HAT which may use the vane pump (or motor) as its hydraulic pump (or motor) may include an outer cam ring which may enclose at least a substantial (or an entire) portion of the driving part of the vane pump (or motor). Therefore, a manufacturer may have to select a size of the hydraulic pump (or motor) unit while also considering that a size of the HAT is generally bigger than the size of the hydraulic pump (or motor) unit due to the outer cam ring. When the hydraulic pump (or motor) includes a gear pump (or motor) as a hydraulic pump (or motor), a size of multiple gears may be viewed as a sum of diameters of such gears, where such a size may be less than about 28 cm, 23 cm, 18 cm, 13 cm, 12 cm, or 10 cm. When a smaller hydraulic pump (or motor) is preferable, the pump (or motor) may have the above size which may be less than about 9 cm, 7 cm, 5 cm, or less. A manufacturer may have to select a size of the hydraulic pump (or motor) unit while considering that a pair of gears may operate while multiple ridges and grooves of such gears mesh each other, that an actual diameter of a meshed pair of gears may be less than a sum of diameters of the pair of gears, and that such gears are disposed inside a housing of a finite size. When the hydraulic pump (or motor) includes a piston pump (or motor) as a hydraulic pump (or motor), a distance of travel by a piston may be viewed as the size of the piston pump (or motor), where the size may be less than about 28 cm, 23 cm, 18 cm, 13 cm, 12 cm, or 10 cm. When a smaller hydraulic pump (or motor) is preferable, the pump (or motor) may have the above size which may be less than about 9 cm, 7 cm, 5 cm, or less. A manufacturer may have to select a size of the hydraulic pump (or motor) unit while considering a size or a thickness of a cylinder of the piston pump (or motor), and a size of a housing which encloses the piston and cylinder therein. When the hydraulic pump (or motor) includes a screw pump (or motor) as a hydraulic pump (or motor), a length of a screw may be viewed as the size of the screw pump (or motor), where such a size may be less than about 28 cm, 23 cm, 18 cm, 13 cm, 12 cm, or 10 cm. When a smaller hydraulic pump (or motor) is preferable, the pump (or motor) may have the above size which may be less than about 9 cm, 7 cm, 5 cm, or less.

The size or volume of the hydraulic pump (or motor) unit may depend on its length as well as its height. Thus, the hydraulic pump (or motor) may have a height which may be similar to the above sizes exemplified in the preceding paragraph. As to the gear pump (or motor), a length which connects centers of rotation of a pair of gears may exceed its height. As to the piston pump (or motor), the distance of travel may exceed a height of the piston pump (or motor). As to the screw pump (or motor), an axial length of the screw may also exceed its height. And as to the vane pump (or motor), its height and length may be similar to each other. It is to be understood that a length and a height of the hydraulic pump (or motor) unit may be reversed depending on how such hydraulic pump (or motor) may be installed. In this aspect, it may be deemed that a "length" of the hydraulic pump (or motor) unit may refer to a length of such a unit along its "long axis," and that a "height" of the hydraulic pump (or motor) unit may refer to a length of such a unit along its "short axis."

The size of the hydraulic pump (or motor) unit is determined not only by the above length and height but also by its width. In general, the width of the hydraulic pump (or motor) unit is less than its height or length. It is appreciated that the narrower the hydraulic pump (or motor) unit may be, it may be more convenient for a manufacturer to fabricate the hydraulic pump (or motor) unit, it may be easier for a user to operate the HAT bicycle, and the HAT bicycle may achieve a higher riding efficiency. Accordingly, a width of the hydraulic pump (or motor) or that of the hydraulic pump (or motor) unit may be less than about 20 cm, 18 cm, 16 cm, 14 cm, 12 cm, 10 cm, or less. A narrower hydraulic pump (or motor) unit may be more easily incorporated into various locations of the HAT bicycle as well and, when feasible, at least a portion of the hydraulic pump (or motor) unit may even be incorporated into a frame. When a lighter HAT bicycle is desirable, the width of the hydraulic pump (or motor) unit may be less than about 9 cm, 7 cm, 5 cm, 3 cm, or less.

As described above, various HATs of the exemplary Aspect 1 and Aspect 2 may include both of the hydraulic pump and the hydraulic motor therein, a size of such a HAT may amount to twice of the size of the hydraulic pump or motor. As the control unit is also added thereto, a total size of the HAT may be about three times or more of that of the hydraulic pump or motor. As depicted in the exemplary embodiment 2-9 of the above Aspect 2, however, at least a portion of the hydraulic pump unit (or its hydraulic pump) may instead be stacked over, disposed on top of, or disposed next to at least a portion of the hydraulic motor unit (or its hydraulic motor). In this arrangement, an overall size of the HAT may be less than about 200%, 180%, 160%, 140%, 120%, or 110% of a size of the hydraulic pump (or motor) unit or may be almost identical that of the hydraulic pump (or motor) unit.

The size of the HAT may be selected depending on a distance between the rotation axis of the front wheel and that of the rear wheel as well. For example, when the HAT may dispose the hydraulic pump unit apart from the hydraulic motor unit, an overall length of the HAT may be about 150%, 130%, 120%, or 110% of the distance or may be almost identical to the distance. When the hydraulic pump and motor units (or their hydraulic pump and hydraulic motor) are disposed apart from each other, an overall length of the HAT may be about 150%, 130%, 120%, or 110% of the distance, or may be almost same as the distance. In addition, when the hydraulic pump and motor units (or their hydraulic pump and motor) are disposed close to each other or stacked one over the other (or side by side), an overall length of the HAT may be about 90%, 80%, 70%, 60%, 50%, 40%, or 30% of the distance.

Similarly, the size of the HAT may be selected depending on a length of a long axis of the frame as well. For example, when the HAT may dispose the hydraulic pump unit apart from the hydraulic pump motor unit, an overall length of the HAT may be about 180%, 160%, 140%, 130%, 120%, or 110% of the length of the long axis of the frame or may be almost identical thereto. When the hydraulic pump and motor units (or their hydraulic pump and motor) are disposed close to each other or stacked one over the other (or side by side), an overall length of the HAT may be about 90%, 80%, 70%, 60%, 50%, 40%, or 30% of such a length of the long axis of the frame.

The HAT of the exemplary Aspect 1 and Aspect 2 may include the hydraulic pump and the hydraulic motor both of which may be provided as a unitary article. Such a HAT may also include a cover which may enclose therein the hydraulic pump unit, the hydraulic motor unit, and at least a substantial (or an entire) portion of a network of multiple tubes, where the network may include the tubes which are connected to the hydraulic pump unit or the hydraulic motor unit (or its hydraulic pump or motor), which may be disposed between the hydraulic pump unit and hydraulic motor unit (or their hydraulic pump and motor), and the like. As a result, a size (e.g., a length, a width or its height) of such a HAT may be greater than an overall size of the hydraulic pump unit and the hydraulic motor unit together. In addition, considering a size of all of such tubes included therein, the HAT may have a size greater than the overall size of such hydraulic pump and motor units. For example, when the hydraulic pump unit and the hydraulic motor unit are provided as a unitary article, the HAT may have a size which may be less than about 400%, 370%, 340%, 310%, 280%, 250%, or 220% of a size of one of such hydraulic pump and motor units which has a smaller size. Alternatively, the HAT including a unitary hydraulic pump and motor unit may have a size which may be less than about 400%, 370%, 340%, 310%, 280%, 250%, or 220% of a size of one of such hydraulic pump and motor which has a smaller size.

When the hydraulic pump unit and the hydraulic motor unit are fabricated as a unitary article, the size (e.g., a length, a width, or a height) of this unitary HAT may be less than a sum of the sizes (i.e., an overall size) of the hydraulic pump unit and the hydraulic motor unit or may be less than a sum of the sizes of the hydraulic pump and the hydraulic motor. In one example, when the hydraulic pump and the hydraulic motor may be at least partially staked on top of another (or disposed side by side along their short axes), the size of the HAT may be about two time or less than the size of the hydraulic pump unit (or its pump) or than the size of the hydraulic motor unit (or its motor), depending on the shapes, sizes or other configurational characteristics of abutting surfaces of such units (or those of the pump and the motor). Accordingly, the unitary HAT including the unitary article of the hydraulic pump unit and the hydraulic motor unit may have a size which may be about 180%, 160%, 140%, 120%, or 110% of a size of one of such hydraulic pump and motor units which has a bigger size. Alternatively, the unitary HAT may have a size which may be about 190%, 170%, 150%, 140%, 130%, 120%, or 110% of a size of one of such hydraulic pump and motor which has a bigger size.

To the contrary, the HAT may configure at least a portion but not an entire portion of the hydraulic pump unit and at least a portion but not an entire portion of the hydraulic motor unit as a unitary article, or may instead configure at least a portion but not an entire portion of the hydraulic pump and at least a portion but not an entire portion of the hydraulic motor unit as a unitary article, where such an arrangement may be referred to as a "semi-unitary article" or as a "semi-unitary HAT" hereinafter, in contrast to a "unitary article" or a "unitary HAT" which includes the hydraulic pump unit (or its pump) and the hydraulic motor unit as a unitary article. It is appreciated that the semi-unitary HAT may include therein an entire portion of the hydraulic pump unit (or its pump) but only a portion of the hydraulic motor unit (or its pump, or may include therein only a portion of the hydraulic pump unit (or its pump) but an entire portion of the hydraulic motor unit (or its motor).

The semi-unitary HAT may include at least one cover, and may include inside the cover such hydraulic pump unit and such hydraulic motor unit, along with various tubes. Therefore, a size of the semi-unitary HAT may be greater than an overall size of the hydraulic pump unit (or its pump) and the hydraulic motor unit (or its motor) together. For example, the semi-unitary HAT may have a size which may be about 400%, 370%, 340%, 310%, 280%, or 220% of a size of one of such hydraulic pump and motor units which has a smaller size. Alternatively, the semi-unitary HAT may have a size which may be about 450%, 420%, 390%, 360%, 330%, 300%, 270%, or 240% of a size of one of such hydraulic pump and motor which has a smaller size.

The semi-unitary HAT may also have a size (e.g., a length, a width, or a height) which may be smaller than an overall size of the hydraulic pump unit and hydraulic motor unit together, or than an overall size of the hydraulic pump and hydraulic motor together. For example, when the hydraulic pump unit and the hydraulic motor unit may be stacked on top of each other or disposed side by side, the semi-unitary HAT may have a size which may be less than twice a length, a width, or a height of the hydraulic pump unit (or its pump) or less than twice a length, a width, or a height of the hydraulic motor unit (or its motor). In another example, the semi-unitary HAT may have the size which may be less than about 250%, 220%, 180%, 130%, 120%, or 110% of a size of one of such hydraulic pump and motor units which has a bigger size. Alternatively, the semi-unitary HAT may have a size which may be less than about 230%, 200%, 180%, 160%, 140%, 130%, or 120% of a size of one of such hydraulic pump and motor which has a bigger size.

The above unitary or semi-unitary HAT may offer various benefits to a user, for the hydraulic pump unit (or its pump) and the hydraulic motor unit (or its motor) are provided as a relatively compact article. First of all, the unitary (or semi-unitary) HAT may enclose at least a portion of the hydraulic pump unit and at least a portion of the hydraulic motor unit inside its case and, therefore, may protect such units or such pump or motor from external shocks or impacts. The unitary (or semi-unitary) HAT may also have a more compact configuration by minimizing gaps which may be present in a non-unitary HAT, whereby such a HAT may be more readily implemented into a light-weight HAT bicycle or into a compact HAT bicycle.

Even when the HAT may not be fabricated as a unitary (or semi-unitary) article, the HAT may incorporate its units or parts into different locations of the HAT bicycle as described in various exemplary embodiments of the Aspect 2, and may decrease a size or a volume of each of such parts of the HAT or those of the HAT as well. Although not shown in the figures, at least a (or an entire) portion of the hydraulic pump unit, at least a (or an entire) portion of the hydraulic motor unit, or at least a (or an entire portion) of the control unit may be incorporated into the HAT bicycle in a direction which may not coincide with a direction of the long axis of the HAT bicycle, but rather in a direction which may be transverse to the long axis such as, e.g., in a lateral direction (e.g., toward left or toward right), in a vertical direction (e.g., upwardly or downwardly), or in another direction which may be transverse to the long axis (e.g., at an acute angle with respect to the long axis). As a result, a size or a volume of at least a (or an entire) portion of the HAT may be reduced.

More particularly, when the hydraulic pump (or motor) may be provided as a light-weight pump (or motor), a user may find it very uncomfortable to ride the HAT bicycle when the volume of such a pump (or motor) may be big. For example, when the hydraulic pump attached to the rotation axis of the pedal may be too big or too wide, a user may not easily rotate the pedal. Therefore, the HAT may be provided as a compact article by minimizing the size of at least a (or an entire) portion of the hydraulic pump (or motor) unit or its pump (or motor).

The HAT, its hydraulic pump (or motor) unit, or its pump (or motor) may have a size which may be selected in relation to or as a ratio of its size to a size of a part of the HAT bicycle which may directly relate to or may physically contact a user. For example, the width of the hydraulic pump (or motor) unit or its hydraulic pump (or motor) may have a width which may be less than about 125%, 100%, 90%, or 80% of a width of the seat of the HAT bicycle. Therefore, when the HAT is incorporated below the seat, a user may not be bothered at all by such a unit or pump (or motor). The width of the hydraulic pump (or motor) unit or its hydraulic pump (or motor) may instead have a width which may be less than about 110%, 100%, 90%, or 80% of a distance between a pair of the pedals. Therefore, when the HAT is incorporated between or around the pedal, a user may not be bothered by using his or her legs. When the hydraulic pump (or motor) unit or its hydraulic pump (or motor) may be disposed in other locations, the above width may not apply.

The HAT bicycle including one of various HATs of the exemplary Aspect 1 and Aspect 2 may also configure its hydraulic pump (or motor) unit or its hydraulic pump (or motor) to have a preset "discharging volume" or a preset "volume ratio" based on a weight of the bicycle, a riding efficiency, or gear ratios. As described above, the volume ratio means a ratio of an intake (or discharging) volume of a fluid by (or out of) a hydraulic motor unit (or its hydraulic motor) to an intake (or discharging) volume of a fluid by (or out of) a hydraulic pump unit (or its hydraulic pump). When a hydraulic pump (or motor) is of a variable-volume type, a maximum volume (or volume ratio) and a minimum volume (or volume ratio) may also be calculated.

For example, assume the volume ratio of the hydraulic motor and the hydraulic pump to be 10 or 20. When the HAT may increase the volume ratio of the hydraulic pump and the hydraulic motor to reduce the gear ratio, the volume of the hydraulic motor may have to be 10 times or 20 times of the volume of the hydraulic pump. Therefore, the size or weight of the hydraulic motor may have to be 10 times or 20 times of those of the hydraulic pump, which may increase the size or weight of the HAT bicycle and may decrease the riding efficiency. In another example, assume the volume ratio of the hydraulic motor and the hydraulic pump to be 1/10 or 1/20. When the HAT increases the volume ratio of the hydraulic pump and the hydraulic motor in order to increase the gear ratio, the volume of the hydraulic pump may have to be 10 times or 20 times of the volume of the hydraulic motor. Therefore, the size or weight of the hydraulic pump may have to be 10 times or 20 times of those of the hydraulic motor, which may lead to an increase in the size or weight of the HAT bicycle and may also lead to a decrease in the riding efficiency. Accordingly, various HATs of such HAT bicycles throughout this disclosure may configure the volume or the volume ratio of the hydraulic motor and pump units (or their motor and pump) to have a certain range of the volume ratios. For example, the HAT may configure the hydraulic motor and pump units (or their motor and pump) to have the volume ratio which is less than about 10.0, 5.0, 4.0, or 3.0, or may be between about 1.0 and 2.0. In a contrary case, the HAT may configure the hydraulic motor and pump units (or their motor and pump) to have the volume ratio which falls between about 0.5 and about 1.0, between about 0.2 and about 0.5, between about 0.1 and about 0.2, and the like. Accordingly, depending on the purpose or use of the HAT bicycles, a manufacturer may select a proper volume ratio of the hydraulic motor and pump units (or their motor and pump) to be within the above ranges, even between about 0.05 and 1.0, or even between 10.0 and 20.0. Based thereon, the manufacturer may then choose or select a proper size, a proper internal (or external) volume, or a suitable driving volume of the hydraulic motor and pump units (or their motor and pump).

It is appreciated that it is still the user who may ride the HAT bicycle which includes one of various HATs of the exemplary Aspect 1 and Aspect 2. Therefore, when the user presses the pedal and delivers mechanical energy to the HAT bicycle, an rpm of the driving axis of the hydraulic pump (or motor) unit may be about 600 (e.g., 10 revolutions per second) in a higher range, about 200 rpm (e.g., 3.3 revolutions per second), 300 rpm, 400 rpm, or 500 rpm in a high range. In the case of normal riding, such an rpm may generally be from about 60 rpm to about 200 rpm. Based thereon, a manufacturer may then configure the hydraulic motor and pump units (or their motor and pump) to operate in such ranges with suitable driving efficiency.

When the hydraulic pump (or motor) unit may include a gear pump (or motor), a piston pump (or motor), or a screw pump (or motor) as its hydraulic pump (or motor), such pumps (or motors) may operate in the above rpm ranges rather efficiently. Accordingly, such pumps (or motors) may not require special considerations in designing such hydraulic motor (or pump) unit and its motor (or pump) as well as in implementing such a unit, pump, or motor into various HATs and into various HAT bicycles of this disclosure.

However, when the hydraulic pump (or motor) unit includes a vane pump (or motor) as its hydraulic pump (or motor), a manufacturer may have to ensure such a vane pump (or motor) to have a proper efficiency. In one example, multiple vanes movably attached to the rotor of the vane motor move inside the vane slots with the centrifugal force and, therefore, may not move effectively at a relatively low rpm. Accordingly, the vane pump (or motor) may adopt a configuration which assists the vanes with mechanical springs by supplementing the centrifugal force with spring force and by ensuring tight sealing between the vanes and the inner walls of the outer cam ring. For example, Korean Pat. Nos. 10-0866544, 10-1041211, 10-0195896, and 10-0563296 and U.S. Pat. Nos. 6,099,261 and 5,733,113 disclose vanes which may include rectangular-shaped tips on the outer ends, which may include rollers at their outer ends so as to reduce mechanical friction, which may include vanes with rotating ends for minimizing friction and for controlling movement thereof, or which may include variable wings in their outer ends.

In contrary, the HAT bicycle which includes the vane pump (or motor) as its hydraulic pump (or motor) may offer a benefit to a user due to its relative low rpm range. That is, because the vane pump (or motor) rotates at a lower rpm, the HAT bicycle may provide automatic and infinitely variable gear ratios while minimizing the mechanical erosion of its parts or the loss of energy due to friction, while ensuring the vanes to contact the inner walls of the outer cam ring by employing various configurations. In one example, one end of each vane may include in its distal end at least one roller which may constantly contact and abut the inner wall of the outer cam ring even at a relatively low rpm, while minimizing the friction with the inner wall, the erosion of the roller and the inner wall, and the energy loss due to such friction. Such a vane pump may also include an inner cam ring which is radially disposed inside the vane pump. Because the inner cam ring constantly supports the opposite end of each vane, the vane may constantly contact and abut the inner wall of the outer cam ring. Accordingly, the vanes may constantly maintain such contact even when the rotor may rotate at a very low rpm or stop, thereby facilitating the intake and discharge of fluid thereinto or therefrom. It is appreciated that the end of each vane which is to contact and abut the inner walls of the outer cam ring is referred to as a "distal end" of the vane, while the opposite end which is adjacent to the rotor is referred to as a "proximal end" of the vane. It is further appreciated that such vanes may include the rollers not only in their distal ends but also in their proximal ends, where the rollers at the proximal ends may be identical to, similar to, or different from those at the distal ends.

More particularly, such a low-speed vane pump with rollers may typically include a pump body, a driving axis movably coupling with the pump body, the rotor coupling with the driving axis and rotating therewith, multiple vane slots which may be radially formed and may allow the vanes to slide therealong, multiple vanes which may be movably disposed inside the vane slots and each of which may include at least one roller at its distal end, the outer cam ring which may be disposed inside the pump body and may be also disposed in an eccentric arrangement with the driving axis, the inner cam ring which may be disposed adjacent to opposite ends of the vanes, a pump fluid inlet, or a pump fluid outlet. Each vane with such a roller in one end may slide inside the vane slot based on a position of rotation of the rotor, and may contact and abut the inner wall of the outer cam ring by the inner cam ring, while the roller may roll along the inner wall of the outer cam ring as the vane rotates, thereby minimizing the friction with such an inner wall. As the rotor and the driving axis of the vane pump rotate, the inner cam ring may also rotate in an opposite direction. Even when the rotor and the driving axis rotate at a low rpm, the inner cam ring may push the vanes toward the outer cam ring and may ensure the rollers of such vanes to constantly contact and seal any gap with such inner walls, while minimizing the friction between the rollers and such inner walls, the erosion of the rollers or the inner walls, and the energy loss due to such friction.

In addition, the vane pump may include multiple rod-shaped vanes, where the inner cam ring may be radially disposed adjacent to the rotor. Accordingly, the inner cam ring may constantly push the vanes toward the outer cam ring such that one end of each vane can constantly and tightly contact the inner walls of the outer cam ring even when the rotor rotates at a very low rpm or stops and that the vane pump may readily take in or discharge the fluid into or out of the vane pump.

When the vane pump include multiple rod-shaped vanes each of which may in turn include at least one roller in its proximal end, the inner cam ring may be configured to be radially disposed and to abut such rollers. As the inner cam ring may support and press the proximal rollers, the vanes may be pushed to contact and abut the inner walls of the outer cam ring as well as to contact and abut the outer walls of the inner cam ring, even when the rotor rotates at a low rpm or stops. Therefore, the proximal and distal rollers of the vanes may constantly contact and seal the gaps with such inner and outer walls, while minimizing the friction between the rollers and such inner and outer walls, the erosion of the rollers or the inner or outer walls, and the energy loss due to such friction.

It is appreciated that various configurations and operations of such vane pumps as provided in the preceding paragraphs may similarly apply to vane motors of the hydraulic motor unit.

In general, the driving efficiency of the HAT bicycle may depend on an efficiency of the hydraulic pump (or motor) or an efficiency of the hydraulic pump (or motor) unit, where the driving efficiency refers to a distance of travel per mechanical energy supplied by the user or provided by the electrical motor. In particular, such a driving efficiency may tend to decrease as the fluid pressure in or around the hydraulic pump (or motor) unit or its hydraulic pump (or motor) may increase and as the resulting friction may also increase. In contrary, the driving efficiency may tend to increase as the fluid pressure in or around the hydraulic pump (or motor) unit or its hydraulic pump (or motor) may decrease and as the resulting friction may also decrease. Accordingly, the HAT bicycle may configure the pressure in or around the hydraulic pump (or motor) unit or its hydraulic pump (or motor) to be less than about 120 atm, and may operate such units, pumps or motors.

In general, various hydraulic pumps (or motors) have different sources of mechanical friction. In the vane pump (or motor), the rotating vanes of the vane pump and an inner wall of the pump may cause such friction, while multiple teeth of abutting and rotating gears may cause such friction in the gear pump (or motor). In the piston pump (or motor), an outer surface of the reciprocating and an inner wall of the cylinder may cause the friction, while the rotating screw and an inner wall of the pump may cause such friction in the screw pump (or motor). Because such friction tends to increase with the fluid pressure inside such pumps (or motors), such HATs of the exemplary Aspect 1 and Aspect 2 may maximize the operating efficiency of such pumps (or motors) as well as the driving efficiency of the HAT bicycle, by configuring the pressure in such pumps (or motors), the pressure of the fluid taken thereinto, or the pressure of the fluid discharged therefrom to be as low as possible, as long as such pumps (or motors) may generate sufficient power.

Accordingly, assuming a high estimate of a weight of a user to be about 120 Kg (considering momentum due to movements of the HAT bicycle), the HAT may configure the pressure inside the hydraulic pump (or motor) during riding, or the fluid pressure taken in or discharged by the hydraulic pump (or motor) unit to be less than about 120 atm, about 100 atm, about 80 atm, or about 60 atm, based on the desired gear ratios, the riding efficiency, or the purpose of using the HAT bicycle. Alternatively, the HAT may configure the pressure of the fluid pressure taken in or discharged by the hydraulic pump (or motor) unit to be less than about 100 atm, about 80 atm, or about 60 atm when the HAT is to be provided as a compact unit.

As described above, various HATs of the HAT bicycle may include at least one shift adjustor to control the extent of changing gear ratios. In one example, when a user may have to ride uphill while supplying more mechanical energy than he or she is riding on a flat road while supplying less mechanical energy, the HAT may select a desired gear ratio based on the mechanical load exerted by the road. In such a circumstance, however, a user may select different extents of changing gear ratios. That is, a user may select to change the gear ratios with less extent while providing less mechanical energy thereto (to be referred to as "soft transmission"), or to change gear ratios with more extent while supplying more mechanical energy thereto (to be referred to as "hard transmission"). In general, a senior or a child may prefer the soft transmission, but a young athlete may prefer the hard transmission in order to improve his or her physical condition or athletic abilities. With the shift adjustor, a user may select the desired extent of changing gear ratios.

Various HAT bicycles and their HATs may be used for various purposes depending on a user. For example, a user may use the HAT bicycles for improving his or her physical abilities or for recreational purposes. To the contrary, a user may use the HAT bicycles for commuting, delivery or other transportation purposes. To this end, the HAT bicycles may run on mechanical energy provided by various energy sources.

In one example and as explained in various embodiments of the exemplary Aspect 1 and Aspect 2, the HAT bicycle may operate with mechanical energy supplied by a user onto the pedal of the HAT bicycle. The HAT bicycle may configure the mechanical energy to directly rotate the driving axis of the hydraulic pump, where the driving axis may correspond to or couple with the pedal axis of the pedal. Alternatively, the HAT bicycle may configure the mechanical energy supplied to the pedal axis of the pedal to operate an auxiliary gear, and then to enable the auxiliary gear to drive the driving axis of the hydraulic pump, or may configure such mechanical energy to move the chain which may in turn drive the driving axis of the hydraulic pump.

To the contrary, the HAT bicycle may include an electrical motor and a battery, where the battery may supply electrical energy to the electrical motor, and where the electrical motor may convert the electrical energy into the mechanical energy which may then be transmitted to the HAT bicycle in various means. In one example, the electrical motor may be coupled to the driving axis of the hydraulic pump, and then drive the driving axis of the hydraulic pump directly. In another example, the electrical motor may be coupled to an auxiliary gear and drive such a gear which may in turn rotate the driving axis of the hydraulic pump. In another example, the electrical motor may be coupled to the pedal axis of the pedal and rotate the pedal axis. By coupling the pedal axis with the driving axis of the hydraulic pump, the electrical motor may then rotate the driving axis of the hydraulic pump. In another example and when the chain connects the pedal axis and the driving axis of the hydraulic pump, the electrical motor may drive the pedal axis while moving the chain in a preset direction, and then the chain may drive the driving axis of the hydraulic pump which may be spaced apart from the pedal.

When the HAT bicycle includes an electrical motor and a battery, such a bicycle may operate solely using the mechanical energy supplied to the pedal (i.e., "manual driving mode") by a user, may operate solely with the mechanical energy supplied by an electrical motor (i.e., "electrical driving mode"), or may operate with both of such mechanical energies simultaneously or sequentially (i.e., "mixed mode"). Accordingly, a user may select to ride the HAT bicycle in the manual driving mode, in the electrical driving mode, or in the mixed mode, or may change from one mode to another while riding on the HAT bicycle.

When a user rides the HAT bicycle in the manual driving mode, various variable-volume hydraulic pumps (or motors) may perform automatic transmission with infinitely variable gear ratios by manipulating the driving volume of the hydraulic pump (or motor) unit or its hydraulic pump (or motor) as well as by manipulating the discharging volume thereof in response to the external mechanical load. Accordingly, the HAT may have to operate through the load synchronizing, the pressure synchronizing, or movement synchronizing. When a user rides the HAT bicycle in the electrical driving mode, however, the HAT may not have to rely on the load synchronizing, the pressure synchronizing, or the movement synchronizing. For example, when the electrical motor rotates the driving axis of the hydraulic pump at a preset rpm or at a preset force (or torque), the HAT of such a HAT bicycle performs the automatic transmission with infinitely variable gear ratios and, therefore, the load synchronizing, pressure synchronizing, or movement synchronizing may all become important to proper operation of the HAT and the HAT bicycle. However, when the HAT bicycle may include a separate controller which may monitor the mechanical load (or its change) and performs automatic transmission, the movement synchronizing may become less important or irrelevant, and the load synchronizing or pressure synchronizing may also become meaningless depending upon detailed methods of monitoring such external mechanical load.

When the HAT bicycle includes the electrical motor and the battery, the HAT bicycle may include the cruise controller to enable a user to ride the bicycle at a relatively uniform speed. For example, a user may set up a certain speed into the cruise controller. When a user gets tired after riding the bicycle in the manual driving mode, or when a user cannot manage riding uphill, a user may switch from the manual driving mode to the electrical driving mode, and may turn on the cruise controller, thereby riding the HAT bicycle at the certain uniform speed using the mechanical energy supplied by the electrical motor.

The cruise controller of the HAT bicycle may include an on/off switch, a switch for setting up a certain speed or for canceling the previously set-up speed, a switch for resetting the speed, and the like. Because the configurational and operational characteristics of the cruise controller may be similar or identical to those of the prior art cruise controller commonly found in prior art automobiles, further details are omitted herein.

When the HAT bicycle includes an electrical motor and a battery, the HAT bicycle may include an electrical generator which can be manually operated by a user and supply further electrical energy to the battery. The HAT bicycle may also include a secondary battery or a rechargeable battery and use such repeatedly. In this arrangement, a user may recharge the battery during the manual driving mode as well.

The generator or rechargeable battery may be used not only for rotating the driving axis of the HAT bicycle but also for other purposes. In one example, the HAT bicycle may use the generator or rechargeable battery to provide electrical energy to manipulate various control valves, pistons, switches, and the like. Accordingly, a user may either manually or electrically control different parts of the control unit. The HAT bicycle may include a switch for turning on or off the rechargeable battery, or a switch for supplying a certain portion of the mechanical energy supplied by a user to the battery. Such rechargeable batteries are similar to various prior art counterparts and, therefore, further details of such generators or rechargeable batteries are omitted herein.

The HAT bicycle may include at least one forward clutch as briefly described hereinabove. It is appreciated that prior art mechanical clutches are used to connect or disconnect one axis with another, to stop an axis without having to stopping a driving axis, or to change the gear ratios without stopping the rotation of the driving axis. The prior art clutches may generally include an interlocking clutch or a friction clutch, where the former may properly operate when the axes are not rotating or rotating at a low rpm, while the latter may operate while such axes are rotating. In this context, the HAT of various HAT bicycles of this disclosure may incorporate the mechanical or hydraulic forward clutch in the pedal axis or in the rotation axis of the rear wheel, whereby the rotation axis of the rear wheel (or the driving wheel) may rotate and the HAT bicycle may continue to move along a forward direction even when no mechanical energy is supplied to the pedal.

The HAT bicycle may incorporate the mechanical or hydraulic forward clutch in various locations thereof. For example, the mechanical forward clutch may be implemented into the pedal axis. When a user presses the pedal and rotates the pedal axis in a forward direction (e.g., rotating the pedal axis in this direction results in riding the bicycle in the forward direction), the mechanical energy supplied by a user is transmitted to the hydraulic pump which then delivers the pressurized fluid to the hydraulic motor and rotates the driving axis of the HAT bicycle. Conversely, when a user presses and rotates the pedal axis in an opposite direction, the mechanical energy supplied by a user is not transmitted to the hydraulic pump and, accordingly, the bicycle may continue to move in the forward direction.

In another example, the mechanical forward clutch may be implemented to the driving axis of the hydraulic pump. That is, the forward clutch may transmit the mechanical energy to the pump driving axis in a forward direction but not in an opposite direction. Accordingly, the hydraulic pump may pressurize the fluid, deliver the pressurized fluid to the hydraulic motor, and drive the driving axis of the HAT bicycle only in the forward direction but not in the opposite direction. Similarly, the mechanical forward clutch may be implemented to the driving axis of the hydraulic motor. That is, the forward clutch may transmit the mechanical energy to the motor driving axis in a forward direction but not in an opposite direction. Accordingly, the hydraulic motor may pressurize the fluid, and drive the driving axis of the HAT bicycle only in the forward direction but not in the opposite direction, while allowing the HAT bicycle to continue to move in a forward direction even when no mechanical energy is supplied to the pedal.

In contrary, the HAT bicycle may include the hydraulic forward clutch in various locations thereof and attain such functions performed by the mechanical forward clutch. For example, at least one one-way valve, check valve, or another prior art valve capable of preventing a retrograde fluid flow may be incorporated in one of multiple tubes so that such a valve may allow the fluid to flow in the forward direction but not in an opposite direction. As a result, when such a valve is incorporated in a tube connecting the hydraulic pump unit to the hydraulic motor unit, the pressurized fluid discharged from the hydraulic pump unit may be delivered to the hydraulic motor unit but not in the opposite direction. Accordingly, a user may continue to ride the bicycle in the forward direction even when the user does not press and rotate the pedal or when the user may rotate the pedal in the opposite direction, thereby performing the functions of the mechanical forward clutch.

The HAT bicycle may instead incorporate such a valve in the fluid inlet (or outlet) of the hydraulic pump unit (or its hydraulic pump) or in the fluid inlet (or outlet) of the hydraulic motor unit (or its hydraulic motor) as the forward clutch. Accordingly, such a valve may allow the fluid to flow in the forward direction but not in the opposite direction, thereby performing the functions of the mechanical forward clutch.

From time to time, a user may not want to include the forward clutch in the HAT bicycle. For example, a user may desire to ride the HAT bicycle in the forward direction when he or she presses and rotates the pedal in the forward direction, but to ride the bicycle in the backward direction when he or she presses and rotates the pedal in the opposite direction. In this case, a manufacturer (or a user) may not include any mechanical or hydraulic forward clutch in the HAT bicycle.

The HAT bicycle may include at least one of various mechanical forward clutches but no hydraulic forward clutch, may include at least one of various hydraulic forward clutches but no mechanical forward clutch, or may include at least one of various mechanical forward clutches as well as at least one of various hydraulic forward clutches. The HAT bicycle may further include a control switch with which a user may activate or deactivate the forward clutch.

As described above, the HAT bicycle may include at least one hydraulic brake. In general, a prior art bicycle includes a mechanical brake which is used for reducing a speed of the bicycle or for stopping the bicycle and which is incorporated into a rim or a rotation axis of the front (or rear) wheel and generates the friction to reduce the speed or to make a stop. The HAT bicycle may similarly include the prior art mechanical brake to reduce the speed or to make a stop, and may include such a brake into various locations of the HAT bicycle as commonly seen in the prior art non-HAT bicycles. In addition, the HAT bicycle may include such a brake around the driving axis of the hydraulic pump (or motor) and control the rotation of such axis to reduce the speed of the HAT bicycle or to stop the HAT bicycle.

With or without any mechanical brake, the HAT bicycle may include at least one hydraulic brake to reduce the speed of the HAT bicycle or to make a stop as well. For example, the HAT bicycle may incorporate at least one stop valve, cock valve or any other valve capable of shutting down the fluid flow therethrough in at least one of multiple tubes so that such valves may allow the fluid to flow therealong in their open states, but may prevent the fluid flow therethrough in their closed states. When the HAT bicycle includes the hydraulic brake in or along a tube which delivers the pressurized fluid discharged from the hydraulic pump unit to the hydraulic motor unit, the HAT may open or close the hydraulic brake to allow or deny the fluid supply to the hydraulic motor unit, thereby performing the function of a brake and controlling the speed of the HAT bicycle or making a stop. The hydraulic brake may be incorporated along the fluid outlet of the hydraulic pump (or motor) unit, at the fluid inlet (or outlet) of the hydraulic pump (or motor), or in any other tube along which the fluid may flow, whereby the hydraulic brake may control the speed of the HAT bicycle or to make a stop. The HAT bicycle may instead implement multiple valves along or in the fluid inlet (or outlet) of the hydraulic pump (or motor). More particularly, when multiple hydraulic brakes are implemented in and around the hydraulic motor, a user may effectively trap the pressurized fluid inside the hydraulic motor, which may render all fluid in the HAT to stop, where a user may more readily control the speed of the HAT bicycle or make a stop.

Alternatively, the HAT bicycle may perform the brake function by rapidly siphoning the pressurized fluid from the hydraulic pump (or motor) unit or its hydraulic pump (or motor) to a fluid tank or from at least one tube to the fluid tank, thereby rapidly decreasing the fluid pressure and reducing the speed of the HAT bicycle or making a stop. For example, the HAT bicycle may fluidly couple one end of at least one on-off valve or shut-off valve with at least one of the tubes, or the fluid inlet (or outlet) of the hydraulic pump (or motor), and may fluidly couple an opposing end of the valve to atmosphere or to a fluid tank of which pressure is maintained at a relatively low pressure. When a user rides the HAT bicycle, the on-off or shut-off valve is closed and the user may ride the HAT bicycle as described above and, accordingly, the fluid is not in fluid communication with the fluid tank or atmosphere. However, when a user activates the on-off or shut-off valve, such a valve may shut down the normal fluid communication, while opening a new pathway which directs a non-negligible amount of the fluid to the atmosphere or to the fluid tank, thereby rapidly decreasing the fluid pressure inside the tubes, or at the fluid inlets (or outlets). As a result, the fluid pressure rapidly decreases down to a value at which the fluid cannot drive the hydraulic pump (or motor) and the HAT ceases to operate, thereby decreasing the speed of the HAT bicycle or making a stop.

It is appreciated that it takes a finite time for the viscous fluid to flow to the fluid tank and that the hydraulic pump (or motor) may rotate a bit while the fluid pressure decreases to a certain value. It is also appreciated that a user may have to decrease the driving speed or to make a stop rather instantly. Accordingly, such on-off valve or shut-off valve may be incorporated closer to the hydraulic pump (or motor) unit or its hydraulic pump (or motor) in order to reduce a response time to slowing down the speed or making a stop.

Instead of such on-off or shut-off valves which operate either in the fully open state and the fully closed state, the HAT bicycle may include another control valve as the hydraulic brake, where examples of such control valves may include a butterfly valve, a needle valve, or another valve which may operate in at least one state which is in-between such fully open and closed states. Therefore, when the HAT bicycle includes the control valve as the hydraulic brake, a user may manipulate an amount of the mechanical energy and manipulate an amount of fluid flowing therethrough, thereby controlling the strength of such braking.

The HAT bicycle may also employ at least one mechanical brake along with at least one hydraulic brake for improving the braking efficiency. For example, the HAT bicycle may configure that, as a user or the electrical motor may activate one of such hydraulic and mechanical brakes, the HAT bicycle may activate the other brake immediately thereafter or within a certain period of time. In another example, when a user provides the mechanical energy to the first of such brakes, the HAT bicycle may activate the second brake immediately thereafter. But when a user provides the mechanical energy to the second of such brakes, the HAT bicycle may activate the first brake only within a certain period of time or may activate the first brake gradually. In the alternative, when a user activates one of such brakes by supplying the mechanical energy thereto, the HAT bicycle may activate the second brake only when an amount of such mechanical energy may exceed a certain value. Alternatively, the HAT bicycle may configure the mechanical brake and the hydraulic brake to operate independent of each other.

The HAT bicycle may include at least one chain and a gear assembly to drive the chain. The chain and the gear assembly may be employed, e.g., when the pedal axis which receives the mechanical energy and the driving axis of the hydraulic pump which has to receive such mechanical energy from the pedal axis may be spaced away from each other, when the rotation axis of the driving wheel (e.g., the rear or front wheel) and the hydraulic motor which drives the driving axis of the driving wheel may be spaced away from each other, or when a first part which transmits the mechanical energy and a second part which receives the mechanical energy therefrom may be spaced away from each other. In addition, such chain and a gear assembly may be employed when it is desirable to manipulate the rpm of the pedal axis (receiving the mechanical energy from a user) to be different from the rpm of the driving axis of the hydraulic pump, to manipulate the rpm of the rotation axis of the rear wheel from the rpm of the driving axis of the hydraulic motor, and the like.

Similarly, the HAT bicycle may also include an auxiliary gear or gear assembly between at least two of the pump, the motor, the driving axis, the rotation axis, and the like. Configurational or operational features of such auxiliary gear or gear assembly may be similar to those of the chain or gear assembly of the preceding paragraph and, therefore, are omitted herein.

The HAT of the HAT bicycle may also have a configuration which may be different from those exemplified in the embodiments 2-1 to 2-9 of the above Aspect 2. For example, the HAT may configure at least one of the hydraulic pump (or motor) unit or its hydraulic pump (or motor) to be exposed to the exterior, as exemplified in FIGS. 2B, 2C, 2G, and 2H. Therefore, a user may readily maintain or fix the unit, pump, or motor, and may easily replace a problematic part, without having to replace an entire pump, motor, or unit.

Conversely and as exemplified in FIGS. 2A, 2D, 2E, 2F, and 2I, the HAT may include the cover which may enclose therein at least a substantial (or an entire) portion of the hydraulic pump (or motor) unit, its hydraulic pump (or motor), and various tubes. The cover may be made of or include light but sturdy material, and may have various exterior configuration or design. More particularly, the cover may readily protect such tubes, pumps, motors, or units enclosed therein by absorbing at least a portion of the external shocks or impacts, when a user falls on the road with the bicycle or hits an object.

As exemplified in FIGS. 2A to 2H, at least a (or an entire) portion of the hydraulic pump (or motor) unit, or its hydraulic pump (or motor) may be incorporated into the HAT bicycle in a direction parallel with the long axis of the HAT bicycle. Conversely and as exemplified in FIG. 2I, such a portion of the hydraulic pump (or motor) unit, or its hydraulic pump (or motor) may be stacked on top of each other or side by side in a direction which may be transverse to the long axis such as, e.g., in a lateral direction (e.g., toward left or toward right), in a vertical direction (e.g., upwardly or downwardly), or in another direction which may form an acute angle with respect to the long axis. Accordingly, the HAT bicycle or its HAT may generally reduce its size, at the cost of increasing its width. Accordingly, the HAT may be fabricated in various configurations when the HAT includes a cover which may enclose various portions of the hydraulic pump (or motor) unit or its hydraulic pump (or motor) stacked one over the other or side by side.

As described above, when the HAT is provided as the unitary or semi-unitary article or when the hydraulic pump unit and the hydraulic motor unit (or their pump and motor) are stacked on top of each other (or disposed side by side), the HAT may be provided with a smaller size (e.g., its length, its width or its height) so that the size may be less than a distance between the pedal axis of the pedal and the rotation axis of the front (or rear) wheel. In this arrangement and as exemplified in FIGS. 2D to 2F and 2I, the HAT bicycle may include a chain, an auxiliary gear or a gear assembly to properly deliver power.

Variations or modifications of such configurations or operations of such HAT bicycles or their HATs of this Aspect 2 may be similar or identical to those of such HAT bicycles or their HATs of other exemplary aspects described hereinabove or to be explained hereinafter. Accordingly further details are omitted herein.

Various HAT bicycles, HATs, units, parts, and configurational or operational characteristics of one exemplary embodiment of this exemplary Aspect 2 may be [1] similar or identical to corresponding bicycles, HATs, units, parts, and characteristics of another exemplary embodiment of the same Aspect 2 or [2] similar or identical to corresponding bicycles, HATs, units, parts, and characteristics of other exemplary embodiments of other exemplary aspects of this disclosure as described hereinabove or to be explained hereinafter. In addition, at least a portion of such bicycles, HATs, units, parts, and characteristics of such exemplary embodiments of this Aspect 2 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the third exemplary aspect (i.e., an Aspect 3) of this disclosure, a HAT of a HAT bicycle may include at least one control unit which may in turn include therein at least one flow direction controller, at least one discharging volume controller, and at least shift adjustor, where each of such controller or adjustor may be an option. In addition, the shift adjustor may incorporate at least one mechanical spring in the flow direction controller or in the discharging volume controller.

FIGS. 3A to 3F are schematic drawings of various exemplary embodiments of various HATs of a HAT bicycle of this Aspect 3 of this disclosure. More particularly, FIGS. 3A to 3E relate to configurational and operational characteristics of a control unit of the HAT according to the first exemplary embodiment of this Aspect 3, whereas FIG. 3F relates to configurational and operational characteristics of another control unit of the HAT according to a second exemplary embodiment thereof. For simplicity of illustration, FIGS. 3A to 3F only depict various hydraulic pump units (or their pumps) and control units, while omitting matching hydraulic motor units (or their motors).

Figure 3A:
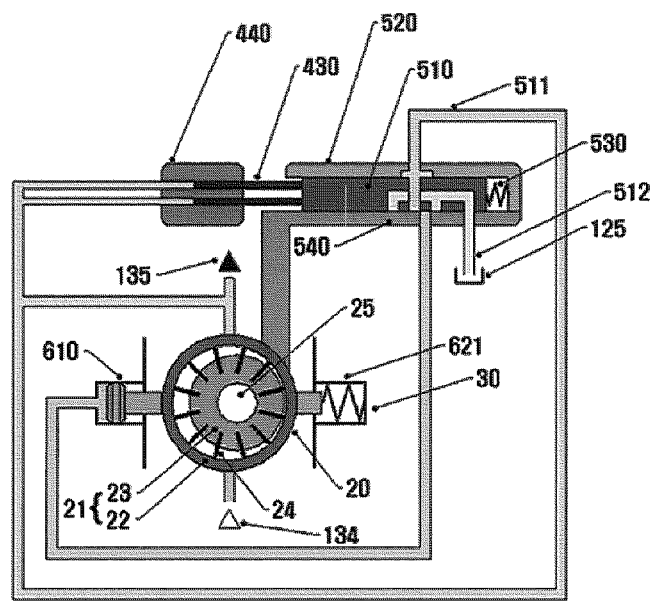
FIGS. 3A to 3E are cross-sectional views of a first embodiment of a third exemplary aspect of a HAT bicycle.

One exemplary embodiment 3-1 of this Aspect 3 is described in FIG. 3A, where a HAT (10) may include at least one hydraulic pump unit (20), at least one control unit (30), and at least one hydraulic motor unit (not included in the figure), where the hydraulic pump unit (20) may include a vane pump as its hydraulic pump (21) and where the hydraulic pump in this embodiment refers to that vane pump (or vice versa). The vane pump (21) may include a cylindrical outer cam ring (22), a rotor (23), multiple vanes (24), and a driving axis (25), where the rotor (23) is rotatable and disposed inside the outer cam ring (22) and includes the driving axis (25) as well as multiple vanes (24) movably disposed on a perimeter of the rotor (23). More particularly, the rotor (23) defines multiple vane slots which open in the perimeter of the rotor (23) and penetrate inwardly so that the vanes (24) can move toward a center of the rotor (23) or move away therefrom. Therefore, when the rotor (23) rotates and develops centrifugal force, the vanes (24) may move along the slots away from the center of the rotor (23) until they (24) may touch an inner wall of the outer cam ring (22) and may prevent fluid flow between the inner wall and the vanes (24).

As explained above, the vane pumps (21) which are included as the hydraulic pumps of the hydraulic pump units of various HATs of this disclosure operate at an rpm which may be significantly lower than that of prior art vane pumps and, therefore, the centrifugal force developed by the rotating rotor (23) may not be enough to enable the vanes (24) to slide along the vane slots outwardly toward the inner wall of the outer cam ring (22). Even if the vanes (24) may successfully move outwardly toward the outer cam ring (22), the centrifugal force may not be enough to push the vanes (24) toward the outer cam ring (22) and to prevent fluid from flowing through a gap between the vanes (24) and the inner wall of the outer cam ring (22). Accordingly, the vane pump (21) may include a spring or another elastic element inside the vane slot in order to supplement the centrifugal force and to ensure the vanes (24) to tightly contact the inner wall of the outer cam ring (22). Several prior art documents described this arrangement, where Korean Pat. Nos. 10-0866544, 10-1041211, 10-0195896, and 10-0563296 and U.S. Pat. Nos. 6,099,261 and 5,733,113 disclose vanes which include rectangular-shaped tips on their outer ends, which include rollers at their outer ends to decrease mechanical friction, which include vanes with rotating ends for minimizing friction and for controlling movement thereof, which include variable wings in their outer ends, and the like.

The vane pump (21) of the hydraulic pump unit (20) of the HAT (10) may include at least one fluid inlet (134) and at least one fluid outlet (135), where the fluid inlet (134) may be incorporated into one end of the outer cam ring (22), and where the fluid outlet (135) may be incorporated in an opposite side of the fluid inlet (134). As a result, the vane pump (21) may take in fluid through the fluid inlet (134), may pressurize the fluid with the vanes (24) which rotate inside the outer cam ring (22), and then discharge the pressurized fluid through the fluid outlet (135) toward the hydraulic motor unit. The vane pump (21) may further include two "cylinder-shaped bumps" provided on its opposing ends, where the first bump corresponds to a down piston (610) and where detailed configurations and functions of such a pair of bumps will be explained below in conjunction with the control unit (30).

The control unit (30) of the HAT (10) may include various parts, where three major parts of the control unit (30) generally includes a flow direction controller, a discharging volume controller, and a shift adjustor. The flow direction controller may include an adjusting piston (430), an adjusting cylinder (44), a main control valve (510), and a main control valve housing (520) (to be abbreviated as a "valve housing" hereinafter). As shown in FIG. 3A, the adjusting piston (430) may reciprocate inside the adjusting cylinder (440), while the main control valve (510) may reciprocate inside the valve housing (520). In addition, the adjusting cylinder (440) may couple with the fluid outlet (135) of the vane pump (21) such that the adjusting piston (430) may move inwardly into the valve housing (520) due to the fluid pressure at the fluid outlet (135). To this end, the adjusting piston (430) and the adjusting cylinder (440) are configured to movably and snugly fit each other so as to prevent leakage of fluid therebetween and too prevent pressure drop due to such leakage. To the contrary, the main control valve (510) may slide back and forth inside the valve housing (52) and may define a gap or clearance therebetween, for there is no danger of fluid leakage therethrough.

The discharging volume controller may include an outer cam ring valve (540) and multiple tubes such as, e.g., an "inner tube" and an "outer tube." The inner tube (512) may be incorporated inside the valve housing (520), and one end of the inner tube (512) may couple with a fluid tank (125) which may be kept at a preset pressure which may be typically lower than the atmospheric pressure or lower than the pressure inside the vane pump (21). The outer tube (511) may be disposed outside the valve housing (520) and may couple with the fluid outlet (135) of the vane pump (21). Other outer tubes may be configured and disposed in order to connect the inner tube to those cylinder-shaped bumps. More particularly, such other outer tubes may connect the first bump, i.e., the down piston (610), and the second bump to the main control valve (510) in such a way that one of the outer tubes may be disposed on a side of the vane pump (21)

and may be shaped and sized as a cylinder which may receive the down piston (610). In FIG. 3A, the main control valve (510) is disposed inside the valve housing (510) and is in a position where the inner tube is not connected with the outer tubes.

The outer cam ring valve (540) of this embodiment 3-1 of this Aspect 3 may be provided to be mechanically coupled to an outer wall of the outer cam ring (22). As a result, when the outer cam ring valve (540) moves in a lateral direction (e.g., to the left or right), the outer cam ring (22) may also move in the lateral direction in response thereto. Because the outer cam ring (22) may not be mechanically coupled to the rotor (23) or the driving axis (25) which are disposed inside the outer cam ring (22), the lateral movement of the outer cam ring valve (540) may not move the rotor (23) or the driving axis (25) disposed inside the outer cam ring (22). Therefore and as will be explained in further detail below, the movement of the outer cam ring valve (540) is synchronized with the movement of the outer cam ring (22), and such synchronization is to be referred to as "movement synchronizing" or "movement synchronization" hereinafter. That is, various hydraulic pump (21) of the hydraulic pump unit (20) (e.g., a vane pump, a gear pump a piston pump, or a screw pump) may be configured to control its driving volume and its discharging volume through such movement synchronizing.

The shift adjustor of the control unit (30) may generally include a main control valve spring (530), a return spring (621), and the like. The main control valve spring (530) may be implemented in one end of the main control valve housing in such a direction and in such an arrangement that the spring (530) may resist the adjusting piston (430) moving inwardly into the main control valve housing (520). To the contrary, the return spring (621) may be implemented in such a direction and in such an arrangement that the spring (621) may respond to the movement of the down piston (610) provided at one side of the vane pump (21).

Figure 3B:
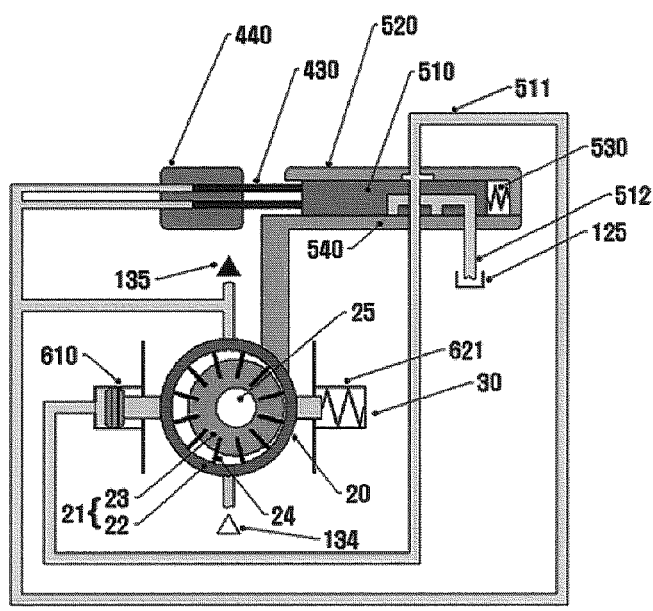

FIG. 3B shows a first schematic drawing of an operation of the HAT of the embodiment 3-1 of this Aspect 3 as depicted in FIG. 3A. More particularly, FIG. 3B relates to a state when a user starts to ride uphill and the HAT is about to change its gear from a high ratio to a lower ratio.

As described above, when a user rides the HAT bicycle uphill, a road may impose an increased amount of the mechanical load onto the driving axis of the hydraulic motor of the hydraulic motor unit (not shown in the figure). As a result, the fluid pressure in and around the hydraulic motor unit increases to the motor pressure. Through the load synchronizing as explained above, the increased pressure in and around the hydraulic motor unit may also increase fluid pressure in and around the hydraulic pump unit (20). In order for a user to continue riding uphill, the vane pump (21) of the hydraulic motor unit (20) may have to increase the pump pressure beyond the motor pressure using the mechanical energy manually supplied by a user or electrically supplied through an electrical motor operating on a battery. Through this pressure synchronizing, the pressure of fluid discharged out of the hydraulic pump unit (20) to the hydraulic motor unit may also increase accordingly.

As depicted in FIG. 3B, the flow direction controller of the control unit (30) may deliver the fluid discharged from the vane pump (21) to the adjusting cylinder (440) through the outer tube connected to the fluid outlet (135) of the vane pump (21). As a result, the adjusting piston (430) may move to the right in the figure. The main control valve (510) which is connected to the adjusting piston (430) may also move inwardly into the valve housing (520) until the force exerted on the adjusting piston (430) may balance the compression force generated by the main control valve spring (530).

As the main control valve (510) moves into the valve housing (520), the inner tube may be connected to the outer tube. It is appreciated that the inner tube may connect the outer tube (511) which is connected to the fluid discharged from the vane pump (21) to another outer tube which includes the cylinder enclosing the first pump such as, e.g., the down piston (610). As the fluid discharged from the vane pump (21) is connected the cylinder enclosing the down piston (610) through the inner tube and outer tubes, the fluid may push the down piston (610) while resisting the return spring (621), and then may move the outer cam ring (22) toward or closer to the return spring (621). As a result, a distance between the driving axis (25) of the vane pump (21) and a center of the outer cam ring (22) may decrease, an eccentricity between the driving axis (25) of the vane pump (20) and the center of the outer cam ring (22) may also decrease, the driving volume of the vane pump (21) may also decrease, and the discharging volume of the vane pump (21) may also decrease, compared with that of FIG. 3A. As the volume of fluid delivered to the hydraulic motor unit from the hydraulic pump unit (20) decreases (i.e., decreased discharging volume), the hydraulic motor of the hydraulic motor unit may drive with a decreased volume of fluid and, therefore, may rotate at a lower rpm than riding on a flat road.

Figure 3C:
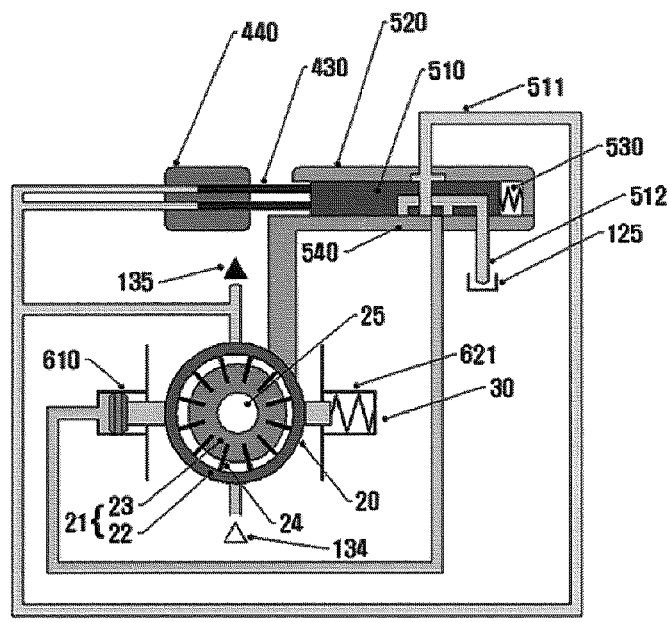

FIG. 3C is a second schematic drawing of an operation of the HAT of the embodiment 3-1 of this Aspect 3 as depicted in FIG. 3A. More particularly, FIG. 3C relates to a state when a user keeps riding uphill and the HAT is about to complete gear shift, e.g., changing its gear from a high ratio to a lower ratio.

As explained above, the outer cam ring (22) may be mechanically coupled to the outer cam ring valve (540) through the movement synchronizing. Therefore, as a user rides uphill, the increased mechanical load may increase the fluid pressure in and around the hydraulic motor unit through the load synchronizing. The flow direction controller may move the outer cam ring valve (540) using the pressure of the fluid discharged from the vane pump (21) and, therefore, the fluid pressure of the vane pump (21) may move the outer cam ring (22) and the outer cam ring valve (540) through the movement synchronizing. As a result and as described in FIG. 3C, the outer cam ring valve (540) may move to a position where the inner tube may not be coupled with any outer valve. That is, the HAT (10) may complete shifting gears, i.e., changing the gear ratio from a higher ratio to a lower ratio.

Figure 3D:
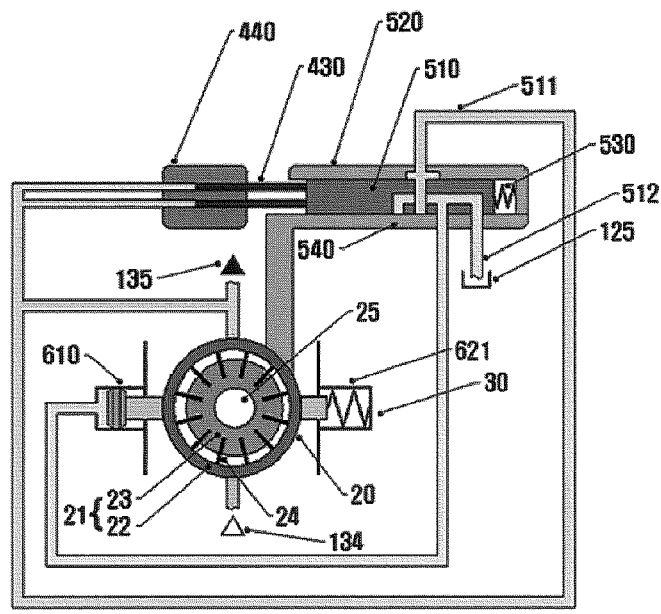

FIG. 3D is a third schematic drawing of an operation of the HAT of the embodiment 3-1 of this Aspect 3 as depicted in FIG. 3A. More particularly, FIG. 3D relates to a state when a user begins to ride downhill and the HAT is about to change its gear from a lower ratio to a higher ratio.

When a user starts to ride the HAT bicycle (100) downhill, the mechanical load exerted onto the hydraulic motor unit may begin to decrease through the load synchronizing and, therefore, the pressure in and around the hydraulic motor unit may begin to decrease as well. In this state, a user may continue riding as long as the hydraulic pump unit (20) may pressurize the fluid contained therein to the pump pressure while using the mechanical energy supplied by the user or the electrical motor, where such a pump pressure may only have to be slightly higher than the motor pressure. Through this pressure synchronizing, the pressure of the fluid discharged from the vane pump (21) may also decrease accordingly.

As described in FIG. 3D, the flow direction controller may deliver the fluid which is discharged from the vane pump (21) and which is pressurized to a relatively low pressure to the adjusting cylinder (440) through the outer tube which is connected to the fluid outlet (135) of the vane pump (21). With the decrease in pressure, the main control valve spring (530) of the shift adjustor may move the adjusting piston (430) to the left of FIG. 3D, e.g., outside of the valve housing (520).

When the main control valve (510) is disposed outside the valve housing (520), the inner tube may connect the fluid tank with the outer tube which may form a cylinder which in turn may receive the down piston (610) therein. As a result, the down piston (610) may move to the left of FIG. 3D due to the return extension force exerted by the return spring (621) of the control unit (30), and the outer cam ring (22) may also move to the same direction. This may increase a distance between the driving axis (25) of the hydraulic pump (21) and the center of the outer cam ring (22), may increase the eccentricity between the center of the outer cam ring (22) and the driving axis (25), may increase the driving volume of the vane pump (21), and may then increase the discharging volume of the vane pump (21) than the one shown in FIG. 3C. As the fluid volume supplied to the hydraulic motor from the vane pump (21) increases, the hydraulic motor may operate with more fluid contained therein, and may rotate at a higher rpm.

Figure 3E:
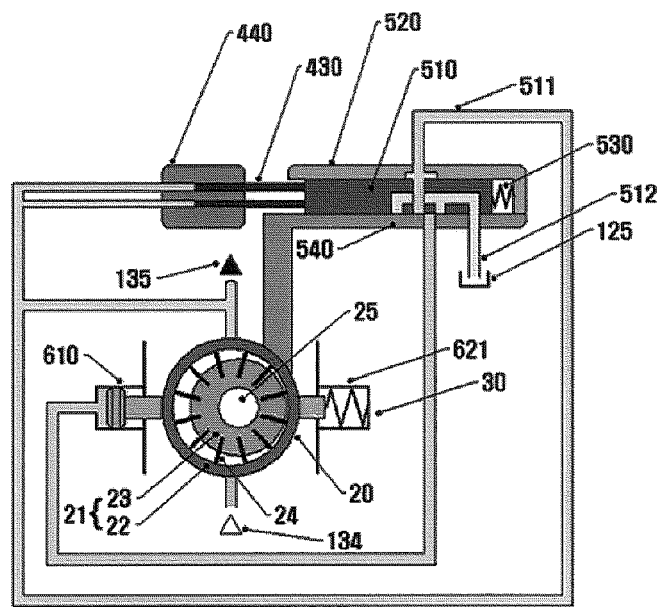

FIG. 3E shows a fourth schematic drawing of an operation of the HAT of the embodiment 3-1 of this Aspect 3 as depicted in FIG. 3A. More particularly, FIG. 3E relates to a state when a user rides downhill and the HAT completes to change its gear from a low ratio to a higher ratio.

As described above, the movement synchronizing allows the outer cam ring (22) to mechanically couple with the outer cam ring valve (540). Accordingly, a decrease in the mechanical load while driving downhill may decrease the pressure of fluid contained in the hydraulic motor unit through the load synchronizing, which may decrease the pressure of fluid contained in the vane pump (21) through such pressure synchronizing. The flow direction controller may move the outer cam ring valve (540) using the return extension force of the return spring (621), where the return extension force may synchronize movements of the outer cam ring (22) and the outer cam ring valve (540) through the movement synchronizing. As a result and as shown in FIG. 3E, the outer cam ring valve (540) moves to another position in which the inner and outer tubes may not be in fluid communication with each other. Through such movement synchronizing, the HAT may complete to perform such automatic transmission from the low gear ratio (of riding uphill) to the high gear ratio (or riding downhill).

Figure 3F:
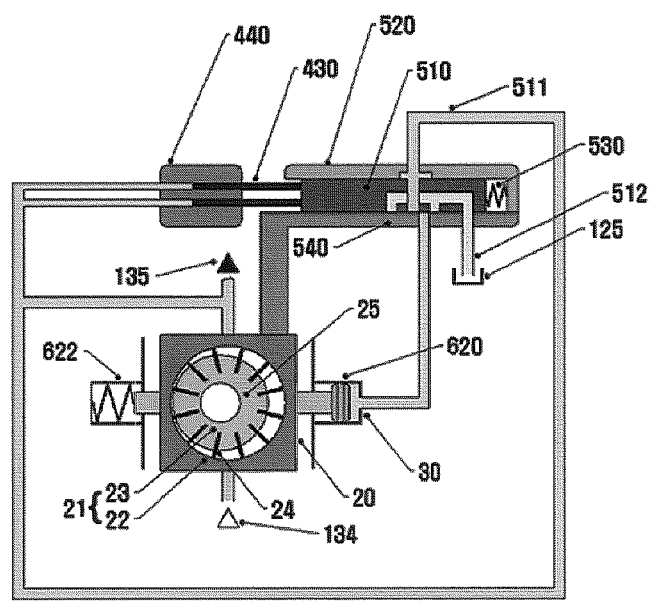
FIG. 3F is a cross-sectional view of a second embodiment of the third exemplary aspect.

Another exemplary embodiment 3-2 of this Aspect 3 is described in FIG. 3F, where a HAT (10) may include at least one hydraulic pump unit (20), at least one control unit (30), and at least one hydraulic motor unit (not included in the figure). Other configurational and operational features of the HAT of this embodiment may be similar or identical to those of the embodiment 3-1 as exemplified in FIGS. 3A to 3E, except that the first cylinder-shaped bump formed on the exterior of the outer cam ring (22) of the vane pump (21) of this embodiment corresponds to the down piston (610) which is abutted by a down spring (610), while the second cylinder-shaped bump formed on the opposite side of the first bump corresponds to a return spring (620).

Accordingly, when a user starts to ride uphill, the external mechanical load exerted on the driving axis of the HAT bicycle increases through the load synchronizing, and the HAT begins to shift its gear from the high gear ratio to the lower gear ratio. The flow direction controller may move while pushing the main control valve spring, and the fluid outlet (135) of the vane pump (21) may be fluidly connected to the return spring (620) through the outer tube (511). As a result, the return piston (620) may move the outer cam ring (22) in the direction of compressing the down spring (622), a distance between the driving axis (25) of the vane pump (21) and a center of the outer cam ring (22) may decrease, and the eccentricity between the driving axis (25) and the center of the outer cam ring (22) also decreases. These series of steps may decrease the driving volume of the vane pump (21) as well as the discharging volume thereof. As the fluid volume supplied to the hydraulic motor unit decreases, the hydraulic motor may operate with a less amount of fluid and, therefore, the rpm of the hydraulic motor unit (or its motor) may also decrease.

Conversely, when a user starts to ride downhill, the external mechanical load exerted on the driving axis of the HAT bicycle decreases through the load synchronizing, and the HAT begins to shift its gear from the low gear ratio to the higher gear ratio. The flow direction controller may move toward an exterior of the valve housing (520) due to extension of the main control valve spring, and the return piston (620) may be fluidly connected to a fluid tank (125) through the inner tube (512). As a result, the down spring (622) may move the outer cam ring (22) toward the return spring (620), a distance between the driving axis (25) of the vane pump (21) and a center of the outer cam ring (22) may increase, and the eccentricity between the driving axis (25) and the center of the outer cam ring (22) also increases. These series of steps may increase the driving volume of the vane pump (21) as well as the discharging volume thereof. As the fluid volume supplied by the vane pump (21) to the hydraulic motor unit increases, the hydraulic motor may operate with more fluid and, therefore, the rpm of the hydraulic motor unit (or its motor) may also increase.

Various HATs of the HAT bicycle of this disclosure may be incorporated into various locations of the HAT bicycle as exemplified in the embodiments 2-1 to 2-9 of the Aspect 2 as well as into other locations thereof. In addition, depending upon the implementation location or arrangement of such HATs, the HAT bicycle may also include a chain, a chain gear, a different auxiliary gear, or an auxiliary gear assembly, each of which may mechanically couple the HAT to one of the pedal axis, or the rotation axis of the front (or rear) wheel, or to at least two of the above.

As explained in FIG. 2I, the hydraulic pump unit and the hydraulic motor unit (or its hydraulic pump and its hydraulic motor) may be implemented together on the rotation axis of the front wheel, on the side (e.g., on the right side or the left side) of the pedal axis, or on the side of the rotation axis of the rear wheel. In the alternative, the hydraulic pump unit and the hydraulic motor unit (or its hydraulic pump and its hydraulic motor) may be separately implemented on different sides of the rotation axis of the front wheel, on different sides of the pedal axis, or on the different sides of the rotation axis of the rear wheel. When the length of the HAT may be shorter than a distance between the pedal axis and the rotation axis, the HAT may include the chain, the chain gear, a different gear, or a gear assembly in order to mechanically couple one portion of the HAT with the rotation axis of the front (or rear) wheel.

Although not included in FIGS. 2A to 2I, at least a (or an entire) portion of the hydraulic pump (or motor) unit or its hydraulic pump (or motor) may be included inside the front (or rear) wheel, i.e., inside the front wheel or inside the herb axis of the rear wheel. This arrangement may offer the benefit of minimizing the volume or the size of the HAT and the HAT bicycle. Of course, the HAT bicycle of this arrangement may include the chain, the chain gear, or an auxiliary gear assembly in order to mechanically couple one end of the HAT with the rotation axis of the front (or rear) wheel or the pedal axis.

As briefly explained in FIGS. 2A to 2I, the HAT bicycle of this disclosure may have the driving axis which may coincide with the rotation axis of the rear wheel or with that of the front wheel. More particularly, when the hydraulic motor unit or its hydraulic motor may be mechanically coupled to the rotation axis of the rear wheel directly or indirectly, the HAT bicycle may operate by rotating the rotation axis of the rear wheel (e.g., a rear-wheel drive), where such a rotation axis may correspond to the driving axis of the HAT bicycle. Conversely, when the hydraulic motor unit or its hydraulic motor is mechanically coupled to the rotation axis of the front wheel, the HAT bicycle may operate by rotating the front wheel (e.g., a front-wheel drive), where the rotation axis may then correspond to the driving axis of the HAT bicycle.

It is appreciated that following modifications or variations of various examples and exemplary embodiments of the above Aspect 3 also belong to such an aspect and fall within the scope of this disclosure, and that such modifications or variations also fall within the scope of the HAT bicycle of this disclosure.

It is appreciated that the HAT may be deemed to include various parts of the hydraulic pump unit, various parts of the hydraulic motor unit, various parts of the control unit, and various tubes, and that all of such parts may be deemed to form a hydraulic circuit. In general, when a certain hydraulic circuit (which may also mean a certain HAT) includes a certain number of such parts, the hydraulic circuit may be consolidated into its equivalent hydraulic circuit which may include a smaller number of such parts or may be divided into a greater number of such parts. Accordingly, various HATs of the HAT bicycles may be varied or modified into many equivalent HATs which may include more or less parts.

For example, when the adjusting cylinder (440) of the flow direction controller is integrated into the valve housing (520), the adjusting piston (430) of the flow direction controller may similarly be integrated into the main control valve (510). In this configuration, the main control valve (510) may serve as a piston which may reciprocate or slide inside the valve housing (520) which may serve as a matching cylinder. Accordingly, the integrated main control valve (510) may move inside the valve housing (520) which may be integrated into a location where the pressure of the fluid discharged from the vane pump (21) through the fluid outlet (135) may be in equilibrium with the recoil force of the main control valve spring (530).

In addition, formation and removal of fluid connection (or communication) between the inner tubes and the outer tubes may be embodied in configurations which may be different from those exemplified in Aspect 3, for an arrangement or a connection of such outer tubes may vary when a size or an arrangement of the inner tubes of the outer cam ring valve (540) may be changed. When the location of the fluid inlet (134) or the fluid outlet (135) is varied or when the shapes of the cylinder-shaped bumps are changed, an arrangement or a pattern of such fluid connection (or communication) may also change, whereby the sizes or an arrangement of the inner tubes of the outer cam ring valve (540) may also change. In addition, formation and removal of fluid connection (or communication) between the inner tubes and the outer tubes may be embodied by replacing the outer cam ring valve (540) with multiple additional tubes, multiple on-off (or control) valves, and at least one three-way valve.

It is appreciated that the main purpose of the HATs of this Aspect 3 is to perform automatic transmission with infinitely variable gear ratios. Therefore, as long as the HAT may perform such automatic transmission, the HAT may include as many (inner or outer) tubes of any types which may be arranged in any arrangement. In addition, as long as the HAT may perform such automatic transmission, the HAT may include as many (inner or outer) valves or springs of any types which may be arranged in any arrangement.

It is also appreciated that the main control valve spring, the return spring, or the down spring of this Aspect 3 may not have to be of a coil type. Therefore, such springs may have a non-coil shape as long as they may exert elastic properties in the valve housing or against the cylindrical bumps formed on the outer cam ring of the vane pump.

The movement synchronizing of the HAT of this Aspect 3 may be provided in various configurations. In one example and as explained in the exemplary embodiment 3-1 and 3-2, the outer cam ring valve and the outer cam ring may be mechanically coupled to each other directly, where such outer cam ring and its valve may move in the same direction by the same distance due to such coupling through the movement synchronizing. Alternatively, the outer cam ring and the outer cam ring valve may be indirectly coupled to each other, where the outer cam ring and its valve may move in the same or different directions by the same or different distances.

Figure 3G:
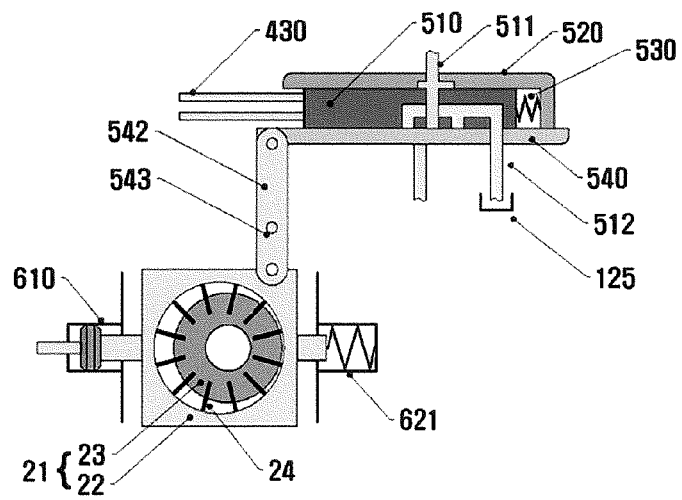
FIGS. 3G and 3H are cross-sectional views of a third embodiment of the third exemplary aspect.

For example, FIG. 3G relates to a schematic diagram depicting a variation of the movement synchronizing of the exemplary embodiments 3-1 and 3-2 of this Aspect 3, where the HAT (10) may include the vane pump (21), the adjusting piston (430), and the main control valve (510) each of which may be identical to that of the embodiments 3-1 and 3-2. However, the outer cam ring valve (540) may couple with the outer cam ring (22) not directly but indirectly by a valve lever (542) which may couple with at least one of the outer cam ring (22) or its valve (540) and may pivot or rotate about a center axis (543) of the valve lever (542).

Figure 3H:
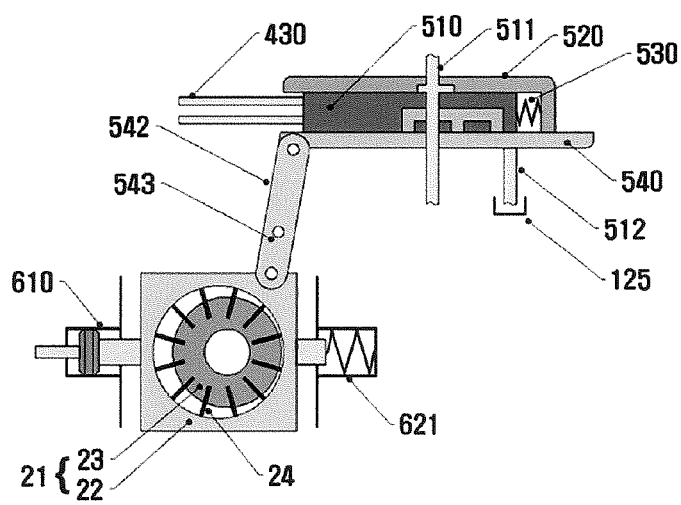

For example, FIG. 3H is a schematic diagram depicting subsequent steps of the operation of the movement synchronizing exemplified in FIG. 3G. When the flow direction controller may push the outer cam ring valve (540) toward the main control valve spring (530), a top portion of the valve lever (542) may pivot and move toward the main control valve spring (530) along with the outer cam ring valve (540). As a result, the valve lever (542) may pivot about the center axis (543) of the valve lever (542), a bottom portion of the valve lever (542) may pivot in a direction away from the main control valve spring (530), and the outer cam ring (22) may also move in the same direction. Therefore, it is appreciated that the movement of the outer cam ring (22) of such movement synchronizing exemplified in FIGS. 3G and 3H may be in a direction opposite to the direction of the exemplary embodiments 3-1 and 3-2.

This variation of the movement synchronizing of the exemplary embodiments 3-1 and 3-2 may offer various benefits to a user. For example, this variation in synchronizing may allow a manufacturer to select along which direction the outer cam ring (22) may move. In another example, a manufacturer may lengthen or shorten a distance or an angle of such movement synchronizing. Therefore, as the center axis (543) of the valve lever (542) approaches the top portion of the valve lever (542), the bottom portion of the center axis (543) may travel along a longer distance. Conversely, as the center axis (543) of the valve lever (542) is implemented closer to the bottom portion of the valve lever (542), the top portion of the center axis (543) may travel along a distance which may be longer than the bottom portion thereof (543) due to such movement synchronizing. Utilizing such characteristics of the movement synchronizing, the HAT may configure the outer cam ring (22) or the outer cam ring valve (540) to travel along a precise distance or along a longer distance.

When the hydraulic pump (or motor) unit or its hydraulic pump (or motor) is of a variable-volume type, such movement synchronizing may be employed to manipulate the driving volume of such a pump (or motor). The movement synchronizing may enable the hydraulic pump (or motor) unit or its pump (or motor) to manipulate its driving volume in various configurations or operations, e.g., by manipulating at least one distance or at least one angle which may affect the driving volume. For example, the vane pump (or motor) may embody such movement synchronizing by manipulating a distance between the driving axis of the vane pump (or motor) and the outer cam ring such that the HAT may allow the discharging volume controller or the outer cam ring valve to move the same distance as the outer cam ring, as exemplified in FIGS. 3A to 3F, FIGS. 4A and 4B, and FIGS. 5A and 5B. Conversely, the HAT may allow the outer cam ring to move along a distance which is in proportion with a distance of travel of the discharging volume controller, where the proportional constant is a non-zero and non-negative number. In addition, the HAT may recruit the shift adjustor to allow the outer cam ring to move along a distance which is determined by a distance of travel of the discharging volume controller.

Various return springs and down springs of this exemplary Aspect 3 may exert different compression force or recoil force based upon its spring constant and its displacement. When the return spring or the down spring is incorporated into the HAT, the spring constant is still uniform, and such compression force or recoil force is generally proportional to the displacement. Accordingly, when the housing to which the return or down spring is incorporated may have a variable length (e.g., by extending or retracting a portion of the housing), a user may be able to adjust the length of the housing and the displacement of such a return or down spring. In one example, the housing may be configured that the length of such a spring may decrease as a user increases (or decreases) the length of the housing, whereas the length of the spring may increase as a user decreases (or increases) the length of the housing. Accordingly, a user may manipulate the recoil force or compression force of such springs, and may eventually manipulate the fluid pressure in or around the hydraulic pump (or motor) unit or its pump (or motor) at which the HAT may perform the automatic transmission according to physical conditions of a user or purposes of use of the HAT bicycle.

Various configurations or operations of the HAT including the vane pump (or motor) as its hydraulic pump (or motor) of this exemplary Aspect 3 may include other types of variable-volume pumps (or motors). Therefore, the flow direction controller, the discharging volume controller, or the shift adjustor operating with the vane pumps (or motors) may also be used with a variable gear pump (or motor), a variable piston pump (or motor), and the like.

Other configurational or operational characteristics of various HAT bicycles, their HATs, and their variations or modifications exemplified in this exemplary Aspect 3 may be similar or identical to those of other aspects or their variations or modifications. Accordingly, further details are omitted herein.

Various HAT bicycles, their HATs, units, parts, and configurational or operational characteristics of one of the exemplary embodiment 3-1 or 3-2 of this exemplary Aspect 3 may be [1] similar or identical to corresponding bicycles, HATs, units, parts, and characteristics of another of such exemplary embodiments 3-1 and 3-2 of the Aspect 3, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 3 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the fourth exemplary aspect (i.e., an Aspect 4) of this disclosure, a HAT of a HAT bicycle may include at least one control unit which may in turn include therein at least one flow direction controller, at least one discharging volume controller, and at least one shift adjustor, where each of such controller or adjustor may be an option. In addition, the shift adjustor may incorporate at least one hydraulic valve.

Figure 4A:
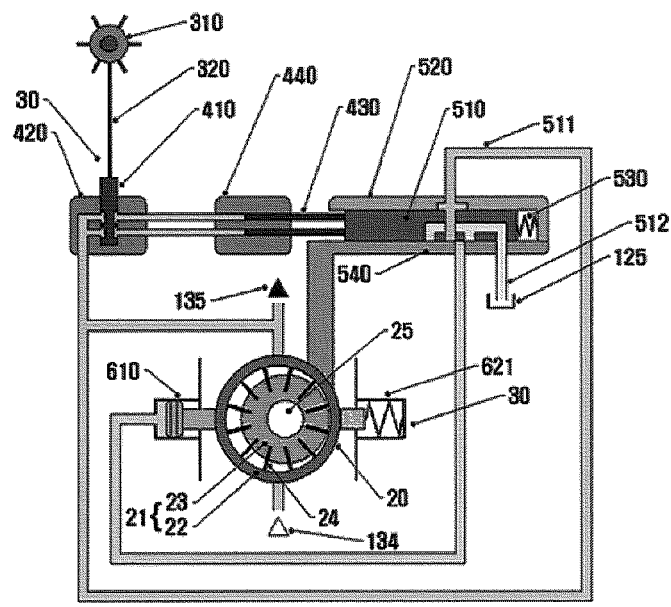
FIG. 4A is a cross-sectional view of a first embodiment of a fourth exemplary aspect of a HAT bicycle and its operation.
Figure 4B:
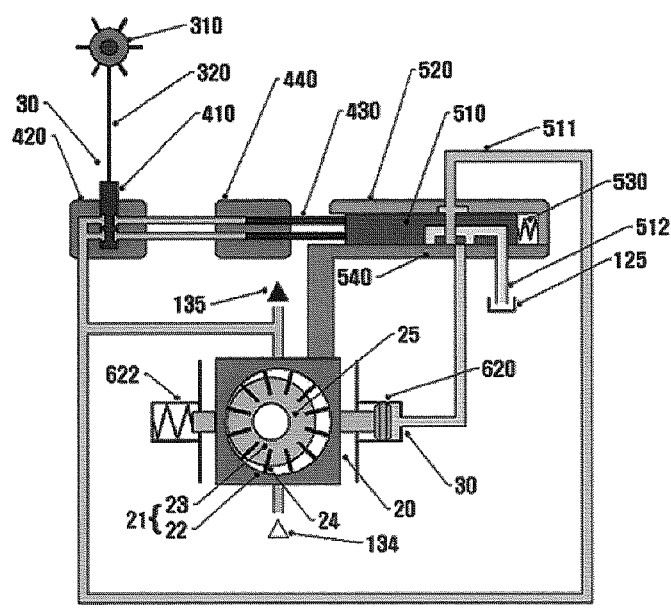
FIG. 4B is a cross-sectional view of a second embodiment of the fourth exemplary aspect.

FIGS. 4A and 4B are schematic diagrams of various exemplary embodiments of this Aspect 4, where FIG. 4A relates to configurational or operational features of the first exemplary embodiment 4-1 of this Aspect 4, and where FIG. 4B relates to configurational or operational features of the second exemplary embodiment 4-2 of this Aspect 4. It is noted that FIGS. 4A and 4B may only include various hydraulic pump units, their hydraulic pumps, and control units of various HATs for simplicity of illustration, and that such HATs may also include various hydraulic motor units or their hydraulic motors as explained hereinabove and hereinafter which may be readily incorporated into such HATs.

FIG. 4A is a schematic drawing of the first exemplary embodiment 4-1 of this Aspect 4, where the HAT (10) may include at least one hydraulic pump unit (20), at least one control unit (30), and at least one hydraulic motor unit (not included in the figure), where the control unit (30) may be identical to that of the Aspect 3 as described above, and where the control unit (30) may include therein at least one shift adjustor which in turn may include at least one valve. For example, the HAT (10) may include an adjusting valve (410) in or around a tube disposed between a fluid outlet (135) of a hydraulic pump (21) and an adjusting cylinder (410) and may control the fluid flow along such a tube. More particularly, the adjusting valve (410) may be installed inside an adjusting housing (420), and may be connected to the adjusting switch (310) by a wire. Therefore, as a user manipulates the wire, he or she can manipulate the adjusting valve (410) to open or to close, or can manipulate an extent of such opening of the adjusting valve (410).

The pressurized fluid discharged out of the fluid outlet (135) of the hydraulic pump (21) may lose its pressure (e.g., a pressure drop) while flowing in the adjusting valve (410) due to hydraulic resistance which is exerted by such a valve (410). Therefore, the pressure exerted onto the adjusting piston (430) may be lower than the pressure of the fluid discharged from the fluid outlet (135) by the pressure drop along the adjusting valve (410), and the fluid pressure pushing the outer cam ring valve (540) of the flow direction controller may also decrease. As a result, by simply manipulating the wire (320) with the adjusting switch (310), the HAT (10) may allow user to manipulate the movement of the outer cam ring valve (540) of the flow direction controller, to manipulate the driving volume of the hydraulic pump, and eventually to control a value of such mechanical load at which the HAT may perform such automatic transmission with infinitely variable gear ratios, to control an amount of the mechanical energy supplied by a user or an electrical motor for the automatic transmission. As a result, a user may readily control various features of the HAT based on his or her physical conditions or the purpose of uses.

FIG. 4B is a schematic drawing of the second exemplary embodiment 4-2 of this Aspect 4, where the HAT (10) may include at least one hydraulic pump unit (20), at least one control unit (30), and at least one hydraulic motor unit (not included in the figure), where the control unit (30) may be identical to that of the Aspect 3, but where the HAT may install a down spring (622) at the first cylinder-shaped bump formed on the exterior of the outer cam ring (22) of the vane pump (21) and install a return spring (620) at the second cylinder-shaped bump. Therefore, unlike those of the exemplary embodiment 4-1, the first bump of FIG. 4B of this embodiment is abutted by the down spring (622), while the second bump of FIG. 4B corresponds to the return piston (620).

It is appreciated that following modifications or variations of various examples and exemplary embodiments of the above Aspect 4 also belong to such an aspect and fall within the scope of this disclosure, and that such modifications or variations also fall within the scope of the HAT bicycle of this disclosure.

First of all, various HATs of the exemplary embodiments 4-1 and 4-2 of this Aspect 4 may include a variable-volume hydraulic pump in the hydraulic pump unit, and various HATs of the exemplary embodiments 4-1 and 4-2 may be applied to the hydraulic pumps of various types as well. Accordingly, the flow direction controller, the discharging volume controller, and the shift adjustor may be used in conjunction with a variable-volume gear pump, a variable-volume piston pump, and the like.

Secondly, the adjusting valve of this Aspect 4 may be installed into various locations of the HAT such as, e.g., between the adjusting cylinder (440) and a downstream of the hydraulic pump (21), or between the adjusting cylinder (440) and the valve housing (520). The adjusting valve (410) may instead be installed at various springs, at an upstream or a downstream of various pistons, thereby affecting movements of such springs or pistons.

The HAT may allow a user to manipulate the adjusting valve (410) using the aforementioned wire or using a different, prior art control mechanism. For example, the HAT may directly couple the adjusting switch (310) with the adjusting valve (410) such that a user may directly manipulate the latter (410) using the former (310) without requiring any wire. The HAT may include an auxiliary gear or an auxiliary gear assembly between the adjusting switch (310) and the adjusting valve (410) such that a user can manipulate the former (410) which may then manipulate the latter (310) indirectly through the auxiliary gear or its assembly.

When the adjusting valve (410) may include multiple tubes and when the HAT may also include multiple adjusting cylinders (440) or adjusting pistons (430), the HAT may manipulate at least one of such tubes in an on-off or shut-off mode, thereby manipulating a discharging volume of the pressurized fluid supplied to the adjusting cylinder (440). In this configuration, the volume of the pressurized fluid provided to the adjusting cylinder (440) may determine force applied onto a unit cross-sectional area of the adjusting piston (430) and, accordingly, that a user may control force applied onto the adjusting piston (430) even when the pressure of the fluid discharged from the hydraulic pump (21) may remain the same. As a result, a user may manipulate an extent of such automatic gear shifting (or changing) based on his or her physical conditions or purposes of use.

The HAT may configure the adjusting switch (310) to be manipulated by a remote controller either wirelessly or through wire. To this end, the HAT may install the remote controller in any location easily accessible by a user such that the HAT may receive a user command through the remote controller and may manipulate the adjusting switch (310) or the adjusting valve (410), thereby also manipulating the extent of gear shifting (e.g., an extent of changing gear ratios): When desirable, the HAT may provide the remote controller as a portable article which can be portably carried by a user.

The HAT may allow a user to manipulate the adjusting switch (310) mechanically or electrically. For example, a user may apply force to the adjusting switch (310) (e.g., pressing a button, rotating a knob, and the like) or may use an electrical motor or actuator to manipulate such a switch (310), where the HAT may also include a separate battery for this manipulation, may use a pre-existing battery, or may use electrical energy which is generated by an electrical generator which in turn operates on the rotation of the pedal or wheels.

Other configurational or operational characteristics of various HAT bicycles, their HATs, and their variations or modifications exemplified in this exemplary Aspect 4 may be similar or identical to those of other aspects or their variations or modifications. Accordingly, further details are omitted herein.

Various HAT bicycles, their HATs, units, parts, and configurational or operational characteristics of one of the exemplary embodiment 4-1 or 4-2 of this exemplary Aspect 4 may be [1] similar or identical to corresponding bicycles, HATs, units, parts, and characteristics of another of such exemplary embodiments 4-1 and 4-2 of the Aspect 4, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 4 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the fifth exemplary aspect (i.e., an Aspect 5) of this disclosure, a HAT of a HAT bicycle may include at least one control unit which may in turn include therein at least one flow direction controller, at least one discharging volume controller, and at least one shift adjustor, where each of such controller or adjustor may be an option. In addition, the shift adjustor may incorporate at least one hydraulic valve, at least one piston, and at least one cylinder.

Figure 5A:
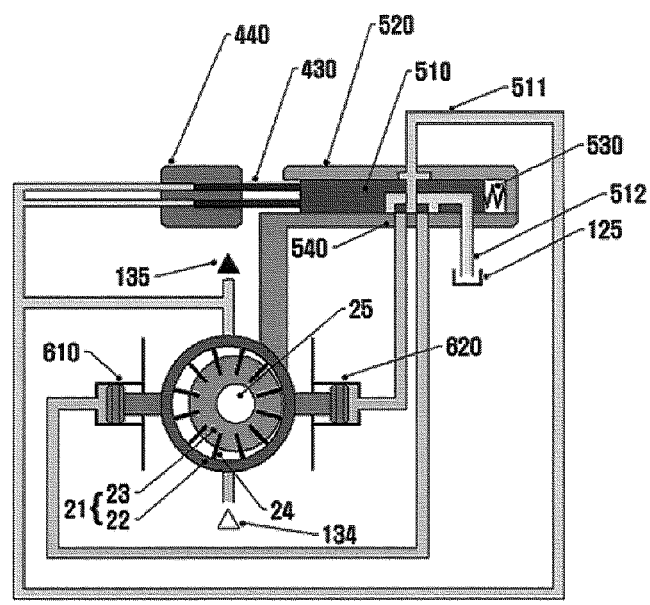
FIG. 5A is a cross-sectional view of a first embodiment of a fifth exemplary aspect of a HAT bicycle and its operation.
Figure 5B:
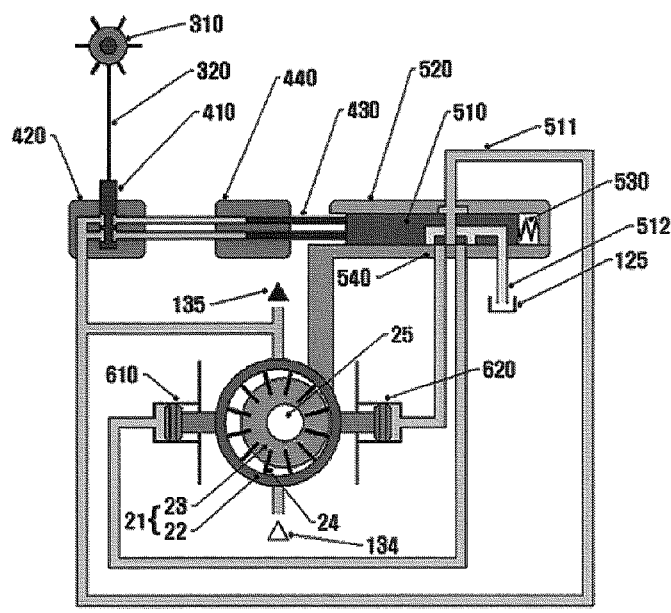
FIG. 5B is a cross-sectional view of a second embodiment of the fifth exemplary aspect.

FIGS. 5A and 5B are schematic diagrams of various exemplary embodiments of this Aspect 5, where FIG. 5A relates to configurational or operational features of the first exemplary embodiment 5-1 of this Aspect 5, and where FIG. 5B relates to configurational or operational features of the second exemplary embodiment 5-2 of this Aspect 5. It is noted that FIGS. 5A and 5B may only include various hydraulic pump units, their hydraulic pumps, and control units of various HATs for simplicity of illustration, and that such HATs may also include various hydraulic motor units or their hydraulic motors as explained hereinabove and hereinafter which may be readily incorporated into various HAT bicycles.

FIG. 5A is a schematic drawing of the first exemplary embodiment 5-1 of this Aspect 5, where the HAT (10) may include at least one hydraulic pump unit (20), at least one control unit (30), and at least one hydraulic motor unit (not included in the figure), where the control unit (30) may be identical to that of the Aspect 3 or that of FIG. 4A of the Aspect 4 as described above, but where, unlike the return springs exemplified in FIGS. 3A to 3E or FIG. 4A, the control unit (30) may employ at least one separate tube and at least one return piston (620) to serve as the return spring of the previous embodiments of the previous Aspects.

FIG. 5B is a schematic drawing of the second exemplary embodiment 5-2 of this Aspect 5, where the HAT (10) may include at least one hydraulic pump unit (20), at least one control unit (30), and at least one hydraulic motor unit (not included in the figure), where the control unit (30) may be identical to that of FIG. 3F of the Aspect 3, or that of FIG. 4B of the Aspect 5, where the control unit (30) may further include the shift adjustor on a left cylindrical bump of the hydraulic pump (21), but where a separate tube and a down piston (610) both of which may serve as the down spring (610) of FIG. 3F or 4b.

It is appreciated that following modifications or variations of various examples and exemplary embodiments of the above Aspect 5 also belong to such an aspect and fall within the scope of this disclosure, and that such modifications or variations also fall within the scope of the HAT bicycle of this disclosure.

First of all, various HATs of the exemplary embodiments 5-1 and 5-2 of this Aspect 5 may include a variable-volume hydraulic pump in the hydraulic pump unit, and various HATs of the exemplary embodiments 5-1 and 5-2 may be applied to the hydraulic pumps of various types as well. Accordingly, the flow direction controller, the discharging volume controller, and the shift adjustor may be used in conjunction with a variable-volume gear pump, a variable-volume piston pump, and the like.

Secondly, contrary to the return springs of FIGS. 3A to 3E and FIG. 4A which may exert variable return force according to their displacements, the return spring (621) of the embodiment 5-1 may exert relatively uniform return force regardless of the pressure of fluid in certain portions of the HAT (10) which may be connected to the return spring (621) through various tubes. In one example of FIG. 5A, the return piston (620) may be connected to a fluid tank (125) which maintains the atmospheric pressure when completing to change the gear ratios and, therefore, the down piston (610) may manipulate the discharging volume of the hydraulic pump (21) relative to the atmospheric pressure. As a result, in order to increase the return force of the return spring (621) or to increase the return force in proportion with the mechanical load, the HAT (10) may incorporate a safety valve which may remain closed but may open when the pressure exceeds a preset threshold, or may configure the fluid pressure inside the hydraulic pump (21) to vary according to the volume of the fluid taken in by the hydraulic pump (21), thereby embodying the return piston (620) which operates similar to the return spring of FIGS. 3A to 3E or FIG. 4A.

In addition, contrary to the down spring of FIGS. 3F and 4B which may exert different recoil force based upon its displacement, the down piston (610) of this embodiment 5-2 may similarly exert relatively uniform recoil force depending upon the fluid pressure in certain portions of the HAT (10) which may couple with the return spring (621) through various tubes. Therefore, such a down piston (610) may similarly manipulate the down spring (610) by employing at least one safety valve as explained in the above paragraph.

Other configurational or operational characteristics of various HAT bicycles, their HATs, and their variations or modifications exemplified in this exemplary Aspect 5 may be similar or identical to those of other aspects or their variations or modifications. Accordingly, further details are omitted herein.

Various HAT bicycles, their HATs, units, parts, and configurational or operational characteristics of one of the exemplary embodiment 5-1 or 5-2 of this exemplary Aspect 5 may be [1] similar or identical to corresponding bicycles, HATs, units, parts, and characteristics of another of such exemplary embodiments 5-1 and 5-2 of the Aspect 5, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 5 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the sixth exemplary aspect (i.e., an Aspect 6) of this disclosure, a HAT of a HAT bicycle may include at least one hydraulic pump unit, at least one hydraulic motor unit, and at least one control unit, where the hydraulic pump unit may include at least one hydraulic pump, where the hydraulic motor unit may include at least one hydraulic motor, where at least one of such hydraulic pump and hydraulic motor may be a variable-volume type, and where at least another one of such hydraulic pump and hydraulic motor may be a fixed-volume type. Alternatively, at least one hydraulic pump may be of a variable-volume type as well as at least one hydraulic motor may also be of a fixed-volume type.

In one exemplary embodiment 6-1 of this Aspect 6, only one of the hydraulic pump and the hydraulic motor is a variable-volume type, where the variable-volume pump (or motor) may be mechanically coupled to [1] a rotation axis of a front wheel, [2] a pedal axis, or [3] a rotation axis of a rear wheel, directly or indirectly.

In another exemplary embodiment 6-2 of this Aspect 6, both of the hydraulic pump and the hydraulic motor are of a variable-volume type, where the variable-volume hydraulic pump and the variable-volume hydraulic motor may mechanically couple with [1] the rotation axis of the front wheel and the pedal axis (or vice versa), [2] the pedal axis and the rotation axis of a rear wheel (or vice versa), or [3] the rotation axis of the front wheel and the rotation axis of the rear wheel (or vice versa), either directly or indirectly.

In another exemplary embodiment 6-3 of this Aspect 6, the hydraulic pump unit may include multiple hydraulic pumps of the same or different types, or the hydraulic motor unit may include multiple hydraulic motors of the same or different types. In one example, the hydraulic pump unit may include, e.g., [1] at least two vane pumps, [2] at least one vane pump and at least one gear pump, [3] at least one vane pump and at least one screw pump, and the like. Alternatively, the hydraulic motor unit may include, e.g., [1] at least two vane motors, [2] at least one vane motor and at least one gear motor, or [3] at least one vane motor and at least one piston motor. In another example, at least two hydraulic pumps (or motors) of the hydraulic pump (or motor) unit may fluidly couple with each other in a parallel mode, in a series mode, or in a hybrid mode. It is appreciated that, when at least two hydraulic pumps (or motors) are coupled to each other in a series mode, all of such hydraulic pumps (or motors) may be of a variable-volume type, or of a fixed-volume type. In the alternative, one of the hydraulic pumps (or motors) may be of a variable-volume type, while another of the hydraulic pumps (or motors) may be of a fixed-volume type. When at least two hydraulic pumps (or motors) are coupled to each other in a parallel mode, such hydraulic pumps (or motors) may be similarly configured as are the case of the above multiple hydraulic pumps (or motors) in the series mode. However, in the series mode, it may be desirable to provide all of such hydraulic pumps (or motors) to be of a variable-volume type or of a fixed-volume type. In another example, only one of multiple hydraulic pumps may be configured to receive the mechanical energy, at least one but not all of such hydraulic pumps may receive the mechanical energy, or all of such hydraulic pumps may receive the mechanical energy. Similarly, only one of multiple hydraulic motors may be configured to transmit the driving power to a driving wheel of the HAT bicycle, at least one but not all of such hydraulic motors may transmit the driving power to the driving wheel, or all of such hydraulic motors may transmit the driving power to the driving wheel.

Other configurational or operational characteristics of various HAT bicycles, their HATs, and their variations or modifications exemplified this exemplary Aspect 6 may be similar or identical to those of other aspects or their variations or modifications. Accordingly, further details are omitted herein.

Various HAT bicycles, their HATs, units, parts, and configurational or operational characteristics of one of the above exemplary embodiments 6-1 to 6-3 of this Aspect 6 may be [1] similar or identical to corresponding bicycles, HATs, units, parts, and characteristics of another of such exemplary embodiments 6-1 to 6-3 of the same Aspect 6, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 6 may replace, may be replaced by, may be combined into, or may be used in conjunction with at least one of other bicycles, HATS, units, parts, and characteristics of other exemplary embodiments of other exemplary aspects as described hereinabove or to be explained hereinafter.

In the seventh exemplary aspect (i.e., an Aspect 7) of this disclosure, a HAT bicycle may operate on the mechanical energy from various sources such as, e.g., the first mechanical energy supplied manually by a user, or the second mechanical energy supplied by an electrical motor which may operate on a battery or an electrical generator. In particular, the HAT bicycle may perform the automatic transmission providing infinitely variable gear ratios by using at least one of the first and second mechanical energy. Various HAT bicycle of this Aspect 7 may include at least one electrical motor which may be configured and operated in various embodiments which are provided below.

In one exemplary embodiment 7-1 of this Aspect 7, a HAT bicycle may configure an electrical motor to drive (e.g., rotate) a pedal axis directly. Accordingly, the electrical motor may directly drive the pedal axis instead of manual pedaling as exemplified in the exemplary Aspects 1 to 6 and, therefore, a HAT of this embodiment 7-1 may also operate similar to various HATs of the exemplary Aspects 1 to 6.

In another exemplary embodiment 7-2 of this Aspect 7, a HAT bicycle may configure an electrical motor to directly drive (e.g., rotate) a driving axis of a hydraulic pump or that of a hydraulic motor. Accordingly, a HAT of this embodiment may also operate similar to various HATs of the exemplary Aspects 1 to 6.

In another exemplary embodiment 7-3 of this Aspect 7, a HAT bicycle may configure an electrical motor to directly drive (e.g., rotate) a rotation axis of a front wheel or that of a rear wheel, while further performing the automatic transmission with the electrical motor. Accordingly, when a user selects to drive the rotation axis of the front (or rear) wheel with the electrical motor, the hydraulic pump or motor may not have to operate.

Other configurational or operational characteristics of various HAT bicycles, their HATs, and their variations or modifications exemplified this exemplary Aspect 7 may be similar or identical to those of other aspects or their variations or modifications. Accordingly, further details are omitted herein.

Various HAT bicycles, their HATs, units, parts, and configurational or operational characteristics of one of the above exemplary embodiments 7-1 to 7-3 of this Aspect 7 may be [1] similar or identical to corresponding bicycles, HATs, units, parts, and characteristics of another of such exemplary embodiments 7-1 to 7-3 of the same Aspect 7, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 7 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

In the eighth exemplary aspect (i.e., an Aspect 8) of this disclosure, a HAT bicycle may include at least one control unit which may be manipulated by a controller operating on a battery or an electrical generator. For example, the HAT may include therein at least one source of electrical energy such as, e.g., a battery or an electrical generator commonly used in a prior art bicycle, and may then use such electrical energy in order to manipulate the controller, the control unit, and the like.

Figure 6A:
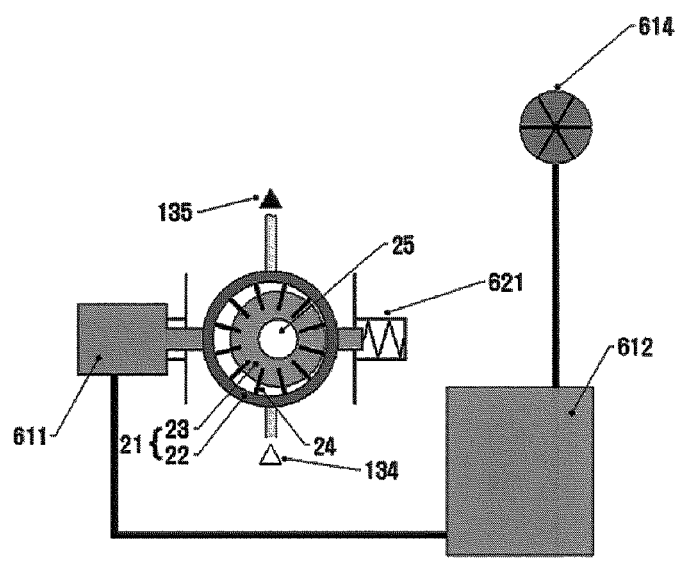
FIG. 6A is a cross-sectional view of a first embodiment of a sixth exemplary aspect of a HAT bicycle and its operation.

One exemplary embodiment 8-1 of this Aspect 8 is depicted in FIG. 6A, where a HAT may include at least one down electrical motor (611), at least one wheel rotation sensor (616), and at least one controller (612). The down electrical motor (611) may support a cylindrical bump provided on the left (in the figure) of an outer cam ring (22) of a hydraulic pump (21) against the return spring (621), while the wheel rotation sensor (614) may monitor an rpm of a front (or rear) wheel and may, therefore, be disposed in a location capable of monitoring such an rpm. The controller (612) may drive the down electrical motor (611) based on the rpm of the front (or rear wheel) monitored by the wheel rotation sensor (614), thereby pushing or pulling the outer cam ring (22). As described above, the down electrical motor (611) may operate on various sources such as, e.g., a battery, an electrical generator, a rechargeable battery, and the like.

Accordingly, when a user rides uphill, an rpm of the front wheel and the rear wheel may decrease through the load synchronizing with external mechanical load, and the controller (612) may adjust the down electrical motor (611) in order to push the left cylindrical bump of the outer cam ring (22) in a direction toward a return spring (621). As a result, a driving volume of the hydraulic pump (21) decreases, its discharging volume may decrease as well, and an rpm of a hydraulic motor may also decrease, for the hydraulic motor may only take a reduced volume of the pressurized fluid from the hydraulic pump (21), whereby the HAT (10) performs the automatic transmission from a high gear ratio to a lower gear ratio.

Conversely, when a user rides downhill, the load synchronizing may increase the rpm of the front (or rear) wheel, and the controller (612) may adjust the down electrical motor (611) in order to push the left cylindrical bump of the outer cam ring (22) in an opposite direction which is away from the return spring (621). As a result, a distance between a center of the outer cam ring (22) and a driving axis of the hydraulic pump (21) may increase, the driving volume of the hydraulic pump (21) may increase, its discharging volume may also increase, and the rpm of a hydraulic motor may then increase, for the hydraulic motor may take an increased volume of the pressurized fluid from the hydraulic pump (21), whereby the HAT (10) performs the automatic transmission from a lower gear ratio to a higher gear ratio.

It is appreciated that the wheel rotation sensor (614) of this embodiment 8-1 may be replaced by another sensor which may monitor any variable which may be synchronized with the external mechanical load which in turn is exerted on the driving wheel of the HAT bicycle while riding. For example, the HAT may employ a pedal axis rotation sensor instead of the wheel rotation sensor (614) such that the pedal axis rotation sensor may monitor the mechanical load exerted on the driving axis of the HAT bicycle as well as an rpm of the pedal axis load synchronized with such mechanical load, thereby enabling such automatic transmission. In another example, the HAT may employ a pressure sensor instead of the wheel rotation sensor (614) so that the pressure sensor may monitor the pressure of fluid in the hydraulic motor or the pressure of fluid which is discharged from the hydraulic motor, thereby increasing or decreasing the gear ratio. The HAT may include other sensors which may monitor other variables related to the load synchronizing for the same purpose.

Although not included in the figure, other parts of the shift adjustor as exemplified in the exemplary Aspects 3 to 5 may also be incorporated into the HAT of the embodiment 8-1 of this Aspect 8. In addition, various parts of the shift adjustor exemplified in the exemplary Aspects 3 to 8 may also be included in the HAT and may be manipulated by the down electrical motor (611).

Figure 6B:
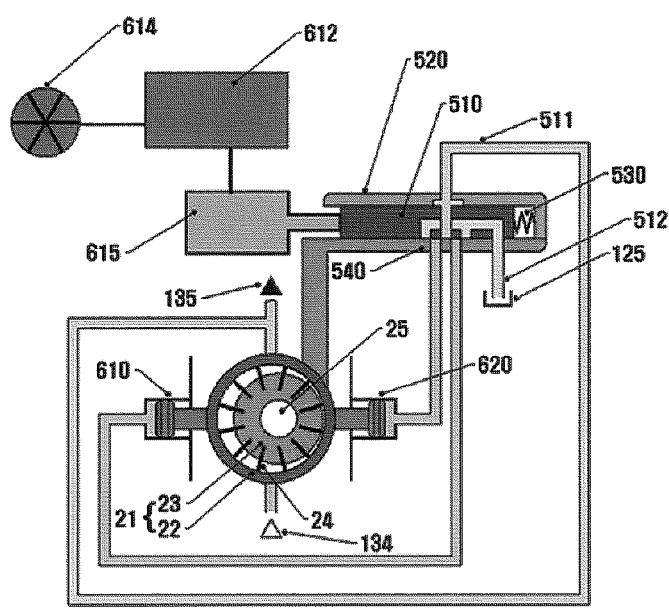
FIG. 6B is a cross-sectional view of a second embodiment of the sixth exemplary aspect.

Another exemplary embodiment 8-2 of this Aspect 8 is depicted in FIG. 6B, where a HAT may include at least one electrical motor (615) for controlling the main control valve, at least one wheel rotation sensor (614), and at least one controller (612). The main control valve of the electrical motor (615) may be configured to support the main control valve (510) in the valve housing (520) against the main control valve spring (510) disposed at one end of an interior of the valve housing (520), while the wheel rotation sensor (614) may be configured to monitor an rpm of a front (or rear) wheel and may, therefore, be disposed in a location capable of monitoring such an rpm. The controller (612) may also drive the main control valve og the electrical motor (615) based on the rpm of the front (or rear wheel) monitored by the wheel rotation sensor (614), thereby pushing or pulling the main control valve (510). Of course, the main control valve of the electrical motor (615) may operate on various sources such as, e.g., a battery, an electrical generator, a rechargeable battery, and the like.

Accordingly, when a user rides uphill (or downhill), the rpms of the front wheel and the rear wheel may decrease (or increase) through the load synchronizing with the mechanical load, and the controller (612) may adjust the main control vale of the electrical motor (615) in order to move the main control valve (510) to the left or right (in the figure). As a result, when a distance between the center of the outer cam ring (22) and the driving axis (25) of the hydraulic pump (21) may decrease (or increase) by pushing (or pulling) the down piston (610), a driving volume of the hydraulic pump (21) may decrease (or increase), its discharging volume may decrease (or increase), and an rpm of a hydraulic motor may decrease (or increase), for the hydraulic motor may only take a reduced volume of the pressurized fluid from the hydraulic pump (21), whereby the HAT (10) performs the automatic transmission while decreasing (or increasing) gear ratio.

The down electrical motor (611) of the embodiment 8-1 of this Aspect 8 may directly manipulate a position of the outer cam ring (22) and the discharging volume of the hydraulic pump (21), thereby directly manipulating the gear ratios. In contrary, the main control valve of the electrical motor (615) of the embodiment 8-2 of the Aspect 8 may directly manipulate the flow direction controller of the control unit (30) and manipulate a direction of the flow of the pressurized fluid, thereby indirectly manipulating the gear ratios.

The HAT may replace the wheel rotation sensor (614) of the embodiment 8-2 with another sensor capable of monitoring variables related to the mechanical load exerted on the front (or rear) wheel as exemplified in the embodiment 8-1. In addition, although not included in the figure, various parts of the shift adjustor described in the Aspects 3 to 5 may be included into the HAT of the embodiment 8-2. Furthermore, various parts of the shift adjustor described in the Aspects 3 to 5 may be employed to electrically control the down electrical motor (611) as well.

Figure 6C:
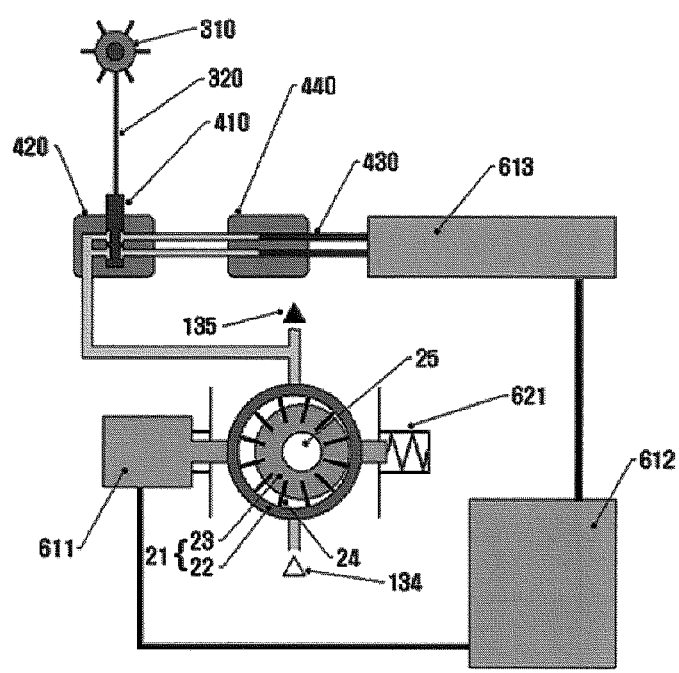
FIG. 6C is a cross-sectional view of a third embodiment of the sixth exemplary aspect.

Another exemplary embodiment 8-3 of this Aspect 8 is depicted in FIG. 6C, where a HAT may include at least one down electrical motor (611), at least one wheel pressure sensor (613), and at least one controller (612), where the down electrical motor (615) and the controller (612) are configured and operated as those of the embodiment 8-1, while the pressure sensor (613) may be incorporated into one end of the adjusting piston (430) to monitor the pressure of fluid discharged from the fluid outlet (135) of the hydraulic pump (21). The controller (612) may drive the down electrical motor (611) based on the monitored pressure, thereby pushing or pulling the outer cam ring (22). The down electrical motor (611) may operate on various sources such as, e.g., a battery, an electrical generator, a rechargeable battery, and the like.

The pressure sensor (613) of this embodiment may correspond to the wheel rotation sensor (614) of the above embodiment 8-1. In other words, the controller (612) of the embodiment 8-1 may manipulate the down electrical motor (611) and control the discharging volume of the hydraulic pump (21) by pushing or pulling the outer cam ring (22) based on the rpm of the front (or rear) wheel. Rather, the controller (612) of this embodiment may manipulate and control the same (21) by similarly pushing and pulling the outer cam ring (22) based on the pressure of the fluid discharged from the pump (21). However, considering the similarities between the load synchronizing and the pressure synchronizing, the HAT of this embodiment 8-3 and another HAT of the embodiment 8-1 may also have some similarities in their configurations and operations.

In addition, the HAT of this embodiment may include at least one adjusting switch (310), at least one wire (320), and at least one adjusting valve (410), as depicted in the upper left corner of FIG. 6C. Accordingly, a user may manipulate the adjusting switch (310) with the mechanical or electrical energy as explained in FIGS. 4A, 4B, and 5B, thereby controlling the pressure exerted onto the adjusting piston (430).

The pressure sensor (613) of this embodiment may also be replaced by another equivalent sensor capable of monitoring other variables which may be related to the mechanical load exerted onto the front (or rear) wheel, to the fluid pressure inside the hydraulic motor, or to the fluid pressure discharged from the hydraulic motor. Although not included in the figure, various parts of the shift adjustor of the exemplary Aspects 3 to 5 may be included into this embodiment. In addition, various parts of the shift adjustor of the Aspects 3 to 5 may electrically manipulate the down electrical motor (611) of this Aspect 8.

Other configurational or operational characteristics of various HAT bicycles, their HATs, and their variations or modifications exemplified this exemplary Aspect 8 may be similar or identical to those of other aspects or their variations or modifications. Accordingly, further details are omitted herein.

Various HAT bicycles, their HATs, units, parts, and configurational or operational characteristics of one of the above exemplary embodiments 8-1 to 8-3 of this Aspect 8 may be [1] similar or identical to corresponding bicycles, HATs, units, parts, and characteristics of another of such exemplary embodiments 8-1 to 8-3 of the same Aspect 8, or [2] similar or identical to corresponding bicycles, HATs, units, parts, and characteristics of other exemplary embodiments of other exemplary aspects of this disclosure as described hereinabove or to be explained hereinafter. In addition, at least a portion of the HAT bicycles, their HATs, units, parts, and characteristics of such exemplary embodiments of this Aspect 8 may replace, may be replaced by, may be combined into, or may be used in conjunction with at least one of other bicycles, HATs, units, parts, and characteristics of other exemplary embodiments of other exemplary aspects as described hereinabove or to be explained hereinafter.

As described in this disclosure hereinabove, various HAT bicycles may be constructed and operated as provided in various exemplary aspects, their exemplary embodiments, and their examples. However, such HAT bicycles, their various units, and their various parts may be varied, modified, or otherwise improved to the extent within the scope of one of ordinary skill in the relevant art, where such variations, modifications, or improvements may also fall within the scope of various HAT bicycles of this disclosure.

For example, the HAT bicycle of this disclosure may include [1] a "mechanical HAT bicycle" which operates on mechanical energy supplied to a pedal axis by a user who drives or rotates a pedal, and [2] an "electrical HAT bicycle" which operates on mechanical energy supplied to the pedal axis, a driving axis of a hydraulic pump (or motor) unit, or a driving axis of a hydraulic (or motor) of such a unit by an electrical motor which operates on a battery (whether rechargeable or not) or an electrical generator. It is appreciated that basic or fundamental characteristics of the HAT which includes a hydraulic pump (or motor) unit and a control unit may not change or may not be affected whether the HAT bicycle may operate on mechanical energy which is supplied by a user or by an electrical motor. In this context, the phrases "mechanical energy supplied by a user into the pedal," or "mechanical energy supplied by a user to a pedal axis (or a rotation axis of a pedal)," and "mechanical energy supplied to a pedal axis, a driving axis of a hydraulic pump, or a driving axis of a hydraulic motor" may be equivalents to each other or may be deemed to be identical to each other, as far as a certain amount of mechanical energy is supplied to at least one part of the HAT bicycle. Therefore, various exemplary aspects, their embodiments, and their examples regarding the HAT bicycle which operates on the mechanical energy manually supplied by a user may all be applicable to the HAT bicycle which operates on the mechanical energy electrically supplied by a battery or a generator through an electrical motor, except as to the energy supply aspect.

In another example, various control units exemplified in FIGS. 3A to 3H, FIGS. 4A and 4B, FIGS. 5A and 5B, and FIGS. 6A to 6C and various modifications thereof as exemplified heretofore may be provided in different mechanical configurations. In other words, various HATs of this disclosure operate based on at least one of the load synchronizing, the pressure synchronizing, and the movement synchronizing. Accordingly, various parts and elements of the HATs may be replaced by their mechanical or electrical equivalents as far as such equivalents may similarly perform at least one of the load synchronizing, the pressure synchronizing, and the movement synchronizing [1] by employing various mechanical configurations which may be different from those explained heretofore, [2] by employing various electrical configurations which may typically incorporate at least one electrical controller, or [3] by a combination of [1] and [2].

Therefore and in one case, instead of including the single outer cam ring valve, the control unit may include multiple sets of valves and tubes, where such sets may function as the single outer cam ring valve as has been explained above. This configuration may require the control unit to include a greater number of parts but may offer the benefit of dividing the single outer cam ring valve into multiple sets and then distribute such sets into different locations of the HAT, thereby enabling construction of a more compact HAT.

In another case, the adjusting piston and the adjusting cylinder may be replaced by a first electrical controller, at least one actuator, at least one pressure sensor, and so on. In this case, the pressure sensor may monitor the fluid pressure in (or out of) the hydraulic motor (or pump), and the first electrical controller may control the actuator and move the outer cam ring depending upon such fluid pressures, thereby varying the driving volume of the hydraulic pump (or motor), varying the discharging volume of the hydraulic pump (or motor), and changing the gear ratios accordingly. Because the adjusting piston and cylinder are no longer necessary, such a control unit may not require the valve housing either.

In another case, the control unit may include a second electrical controller which may manipulate positioning of the outer cam ring, e.g., based on the fluid pressure in (or out of) the hydraulic motor (or pump), directly based on the external mechanical load exerted onto the hydraulic motor or on the slope of the road, and the like. This configuration may require the control unit to further include various electrical parts, wires, and the like. However, because the second electrical controller determines the exact position of the outer cam ring, the driving volume, and discharging volume of the hydraulic pump (or motor), this configuration may offer the benefit of obviating the use of many mechanical parts or elements as described heretofore, where examples of such obviated parts may include the return spring, down spring, down piston, and the like.

It is again emphasized that various HATs explained in this disclosure operate based on at least one of the load synchronizing, the pressure synchronizing, and the movement synchronizing. It is appreciated that such synchronizing may be accomplished by many different mechanical configurations and that at least one of the above synchronizing may be accomplished by employing various electrical sensors, electrical actuators, and electrical controllers which can manipulate such electrical sensors or actuators. Accordingly, it is appreciated that mechanical and electrical counterparts or equivalents of various parts and elements of the control unit can be used to replace at least one unit or at least one part of such a unit of various HATs, where details of such counterparts or equivalents are generally a matter of designing selections or choices of one of ordinary skill in the art of hydraulic pumps and equipment, electrical control of hydraulic systems, and the like.

As described hereinabove, the pressure synchronizing in response to the external mechanical load (e.g., a road condition on which a user rides the HAT bicycle) or in response to the changes in such mechanical load may be accomplished by the incompressible and pressurized fluid between the hydraulic pump unit and the hydraulic motor unit and, accordingly, the response time for such pressure synchronizing is rather short. As a result, various HATs employed by such HAT bicycles of this disclosure may perform automatic transmission while providing infinitely variable gear ratios in (almost) real time in response to the external mechanical load or the changes in such mechanical load through the pressure synchronizing.

However, as the response time for such pressure synchronizing may decrease, the HAT may respond to the mechanical load (e.g., mechanical resistance to riding) and may change the gear ratios (almost) in real time. Accordingly, a user may feel uncomfortable or annoyed by such too frequent changes in the gear ratios. To overcome or at least minimize such uncomfortable experience, a HAT bicycle and its HAT may lengthen such a response time and, therefore, may manipulate the timing of the automatic transmission or may decrease the extent of such automatic transmission through, e.g., dampening such responses or, in other words, delaying the fluid flow related to such pressure synchronizing and decreasing the speed or sensitivity of the automatic transmission. For example, the HAT may manipulate a cross-sectional area, a length, or hydraulic resistance of at least one tube of the control unit. In another example, the HAT may install at least one valve in order to delay the fluid flow, thereby decreasing the response time of such automatic transmission or delaying the automatic transmission. Alternatively, the HAT may include at least one damper or at least one windkessel and manipulate the changes in the fluid pressure. As a result, a user may be able to manipulate the timing or extent of such automatic transmission.

As described hereinabove, the driving axis of the hydraulic pump (or motor) may mechanically couple with the rotation axis of the front (or rear) wheel or a pedal axis of the pedal either directly or indirectly in various means. In one example, the HAT may include a prior art chain, chain gear, auxiliary gear, or auxiliary gear assembly for such mechanical coupling. In another example, the HAT may include at least one belt capable of transmitting such power. In addition, the HAT may use at least two of the above chain, chain gear, gear, or gear assembly as a manufacturer sees it fit.

Various HATs exemplified throughout this disclosure may be incorporated into a prior art bicycle for children, for a juvenile, for a grown-up, or for a senior person and the prior art bicycle may be converted into a HAT bicycle for children, for a juvenile, for a grown-up, or for a senior person, where each of such HAT bicycles correspond to various HAT bicycles provided hereinabove.

Various HAT bicycles of this disclosure may be used for various purposes which may be identical or similar to those purposes of various conventional non-HAT bicycles. Accordingly, the HAT bicycles may be used for improving a user's physical condition, for racing, for transporting cargos, for commuting, and the like, where such HAT bicycles may employ various HATs which may provide suitable ranges of gear ratios. Such HAT bicycles may also employ the adjusting switches, the adjusting valves, the main control valve springs, the down pistons, the return pistons, or the down springs each of which may suit the purposes of a user. As a result, a manufacturer may manufacture and sell various HAT bicycles each of which is specifically tailored and designed for improving a user's physical condition, for racing, for transporting cargos, or for commuting. In the alternative, a manufacturer may manufacture and sell a universal HAT bicycle which may be tailored or modified by a user in such a way that, e.g., [1] a user may replace the adjusting switch or valve, the main control valve springs, the down piston or spring, the return piston or spring, or another part of the control unit based on the purpose of riding the HAT bicycle, [2] a user may select a certain setting from multiple settings based on such a purpose, where the HAT bicycle or its HAT may change or otherwise manipulate configurational or operational characteristics of at least one of its various units, motors, pumps, or parts, [3] a user may select one of the manual driving mode or the electrical driving mode, and the like.

Although not disclosed in this disclosure, various HAT bicycles of this disclosure may also be fabricated by incorporating various units, pumps, motors or parts of the HAT bicycles into a prior art non-HAT bicycle. To this end, such units, pumps, motors, or parts of the HAT bicycles may be fabricated to operate with prior art parts of the non-HAT bicycle. In addition, the HAT bicycle may include various parts of the prior art non-HAT bicycle such as, e.g., a handle bar, a grip, a seat, a suspension, a shock absorber, a dirt cover, a mechanical brake, a brake lever, a support, a headlight, a backlight, a front wheel rack, a rear wheel rack, a mirror, and the like.

The foregoing provides various exemplary aspects, their exemplary embodiments, and detailed examples of various HATs (i.e., "hydraulic automatic transmissions") and various HAT bicycles (i.e., "hydraulic automatic transmission bicycle") each of which incorporates therein at least one of such HATs. It is appreciated that the foregoing is only exemplary and not meant to restrict the scope of various HATs, and various HAT bicycles of this disclosure, and that the foregoing is not to limit the scope of claims appended below.

What is claimed is:

1. A hydraulic automatic transmission comprising:
   a hydraulic motor;
   a hydraulic pump capable of pressurizing fluid contained therein and capable of discharging said pressurized fluid to said hydraulic motor; and
   a control unit which includes a shift adjustor, wherein said hydraulic motor includes a motor driving axis and generates mechanical power for rotating said motor driving axis using said pressurized fluid received from said hydraulic pump, wherein a motor pressure is a pressure of said fluid inside said hydraulic motor, and wherein said hydraulic motor increases or decreases said motor pressure as external mechanical load respectively increases or decreases, wherein said hydraulic pump includes a pump driving axis, defines a pump driving volume, and discharges a pump discharging volume of said pressurized fluid to said hydraulic motor per a rotation of said pump driving axis, while pressurizing said fluid contained in said pump to a pump pressure which is higher than said motor pressure using mechanical energy supplied to said pump, and wherein said hydraulic pump changes said pump discharging volume in response to changes in said mechanical load, whereby a ratio of a first number of rotations of said pump driving axis to a second number of rotations of said motor driving axis automatically changes in response to said mechanical load, wherein said control unit is configured to manipulate said pump driving volume in response to changes in said mechanical load and, therefore, manipulate said ratio of said first number to said second number by manipulating at least one of said pump pressure at which said pump discharging volume is changed, said motor pressure at which said pump discharging volume is changed, and said mechanical load at which said pump discharging volume is changed, and wherein said shift adjustor is configured to manipulate at least one of a maximum value of said external mechanical load at which said transmission changes its gear ratio, a minimum value of said external mechanical load at which said transmission changes said gear ratio, a maximum value of said motor pressure at which said transmission changes said gear ratios, and a minimum value of said motor pressure at which said transmission changes said gear ratio.

2. The hydraulic automatic transmission of claim 1, wherein said control unit is configured to manipulate at least one of a first amount of said mechanical energy required for discharging a preset amount of said pressurized fluid by said hydraulic motor and a second amount of said mechanical energy required for discharging said pump discharging volume by said hydraulic pump.

3. The hydraulic automatic transmission of claim 1,
wherein said hydraulic pump defines a center axis and changes said pump driving volume by changing an eccentricity between said center axis and said pump driving axis in response to changes in said mechanical load, thereby changing said pump discharging volume, and wherein said control unit is configured to manipulate at least one of said pump pressure at which said eccentricity changes, said motor pressure at which said eccentricity changes, and said mechanical load at which said eccentricity changes.

4. The hydraulic automatic transmission of claim 1, wherein said hydraulic motor is one of a vane motor, a piston motor, a gear motor, and a screw motor, and wherein said hydraulic pump is one of a vane pump, a piston pump, a gear pump, and a screw pump.

5. The hydraulic automatic transmission of claim 1, wherein said hydraulic motor is one of a fixed-volume hydraulic motor and a variable-volume hydraulic motor.

6. The hydraulic automatic transmission of claim 1, wherein said transmission is incorporated into a bicycle which includes at least one pedal in such a way that said hydraulic pump operationally couples to said pedal and that said hydraulic pump receives said mechanical energy from a user rotating said pedal.

7. The hydraulic automatic transmission of claim 1, wherein said transmission is incorporated into a bicycle which includes at least one electrical motor and at least one source of electrical energy in such a way that said hydraulic pump receives said mechanical energy from said at least one electrical motor which in turn operates on said electrical energy supplied from said source.

8. The hydraulic automatic transmission of claim 1, wherein said hydraulic pump decreases or increases said pump discharging volume as said mechanical load respectively increases or decreases.

9. The hydraulic automatic transmission of claim 8, wherein said control unit is configured to manipulate an extent of a decrease or an increase in said pump discharging volume when said mechanical load respectively increases or decreases by a certain extent.

10. A hydraulic automatic transmission comprising:
a hydraulic motor including a motor driving axis;
a hydraulic pump including a pump driving axis, capable of pressurizing fluid contained in said pump, and capable of discharging said pressurized fluid to said hydraulic motor; and
a shift adjustor,
wherein a motor pressure is a pressure of said fluid contained in said hydraulic motor, and wherein said hydraulic motor pressurizes said fluid contained in said hydraulic motor to a motor pressure while increasing and decreasing said motor pressure as external mechanical load exerted onto said hydraulic motor respectively increases and decreases;

wherein a pump pressure is a pressure of said fluid contained in said hydraulic pump, wherein said hydraulic pump pressurizes said fluid contained in said hydraulic pump using mechanical energy supplied thereto to a pump pressure which is higher than said motor pressure, and discharges a pump discharging volume of said fluid to said hydraulic motor, and wherein said pump discharging volume decreases and increases as said external mechanical load increases and decreases, respectively, whereby said hydraulic automatic transmission automatically changes gear ratios in response to changes in said external load and in response to changes in said pump discharging volume which is caused by said changes in said external load, wherein said gear ratios are ratios of a number of rotations of said pump driving axis to a number of rotations of said motor driving axis; and at least one shift adjustor which is configured to manipulate at least one of a maximum external load at which said gear ratios change, a minimum external mechanical load at which said gear ratios change, a maximum motor pressure at which said gear ratios change, and a minimum motor pressure at which said gear ratios change.

11. The hydraulic automatic transmission of claim 10, wherein said hydraulic pump includes an outer cam ring, and a pump driving part,
wherein said outer cam ring encompasses therein a substantial portion of said pump driving part and at least a portion of said pump driving axis;

wherein said pump driving axis performs rotation as said mechanical energy is supplied thereto, wherein said pump discharging volume per said rotation is proportional to a pump driving volume which is in turn an internal volume of said outer cam ring minus a volume of said pump driving part minus another volume of said at least a portion of said pump driving axis, and wherein said outer cam ring is configured to move back and forth and to one of decrease and increase said pump discharging volume by disposing a center of said outer cam ring one of closer to and away from said pump driving axis, respectively.

12. The hydraulic automatic transmission of claim 10, wherein said hydraulic motor is one of a vane motor, a piston motor, a gear motor, and a screw motor, and wherein said hydraulic pump is one of a vane pump, a piston pump, a gear pump, and a screw pump.

13. The hydraulic automatic transmission of claim 10, wherein said hydraulic motor is one of a fixed-volume hydraulic motor and a variable-volume hydraulic motor.

14. The hydraulic automatic transmission of claim 10,
wherein said transmission is incorporated into a bicycle which includes at least one pedal in such a way that said hydraulic pump operationally couples to said pedal and that said hydraulic pump receives said mechanical energy from a user rotating said pedal.

15. The hydraulic automatic transmission of claim 10,
wherein said transmission is incorporated into a bicycle which includes at least one electrical motor and at least one source of electrical energy in such a way that said hydraulic pump receives said mechanical energy from said at least one electrical motor which in turn operates on said electrical energy supplied from said source.

16. The hydraulic automatic transmission of claim 10,
wherein said transmission is incorporated into a bicycle with a cover in such a way that said cover encompass therein one of:

an entire portion of said hydraulic motor;
an entire portion of said hydraulic pump;
at least one half portion of said hydraulic motor; and
at least one half portion of said hydraulic pump.

17. The hydraulic automatic transmission of claim 10,
wherein said transmission is incorporated into a bicycle including a pedal and a rear wheel in such a way that said hydraulic motor operationally couples to said rear wheel and that said hydraulic pump operationally couples to said pedal.

\* \* \* \* \*